United States Patent
Mercardo

(10) Patent No.: US 12,204,076 B2
(45) Date of Patent: Jan. 21, 2025

(54) FOLDED TELEPHOTO CAMERA LENS SYSTEM

(71) Applicant: Apple Inc., Cupertino, CA (US)

(72) Inventor: Romeo I. Mercardo, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/460,454

(22) Filed: Sep. 1, 2023

(65) Prior Publication Data

US 2023/0418029 A1 Dec. 28, 2023

Related U.S. Application Data

(63) Continuation of application No. 17/466,626, filed on Sep. 3, 2021, now Pat. No. 11,782,240, which is a (Continued)

(51) Int. Cl.
*G02B 13/00* (2006.01)
*G02B 9/56* (2006.01)
(Continued)

(52) U.S. Cl.
CPC ............ *G02B 13/004* (2013.01); *G02B 9/56* (2013.01); *G02B 13/002* (2013.01);
(Continued)

(58) Field of Classification Search
None
See application file for complete search history.

(56) References Cited

U.S. PATENT DOCUMENTS

| 3,588,229 A | 6/1971 | Woltche et al. |
| 4,744,641 A | 5/1988 | Vanderwerf |

(Continued)

FOREIGN PATENT DOCUMENTS

| CN | 1797060 | 7/2006 |
| CN | 102004303 | 4/2011 |

(Continued)

OTHER PUBLICATIONS

International Search Report and Written Opinion from PCT/US2015/015753, Dated Apr. 28, 2015, Apple Inc., pp. 1-13.
(Continued)

*Primary Examiner* — Robert E. Tallman
(74) *Attorney, Agent, or Firm* — Robert C. Kowert; Kowert, Hood, Munyon, Rankin & Goetzel, P.C.

(57) ABSTRACT

A folded telephoto lens system may include multiple lenses with refractive power and a light path folding element. Light entering the camera through lens(es) on a first path is refracted to the folding element, which changes direction of the light on to a second path with lens(es) that refract the light to form an image plane at a photosensor. At least one of the object side and image side surfaces of at least one of the lens elements may be aspheric. Total track length (TTL) of the lens system may be 14.0 mm or less. The lens system may be configured so that the telephoto ratio (TTL/f) is less than or equal to 1.0. Materials, radii of curvature, shapes, sizes, spacing, and aspheric coefficients of the optical elements may be selected to achieve quality optical performance and high image resolution in a small form factor camera.

20 Claims, 47 Drawing Sheets

Related U.S. Application Data continuation of application No. 16/586,798, filed on Sep. 27, 2019, now Pat. No. 11,112,582, which is a continuation of application No. 15/130,492, filed on Apr. 15, 2016, now Pat. No. 10,429,614, which is a continuation of application No. 14/291,544, filed on May 30, 2014, now Pat. No. 9,316,810.

(60) Provisional application No. 61/949,861, filed on Mar. 7, 2014.

(51) Int. Cl.
*G02B 13/02* (2006.01)
*H04N 23/00* (2023.01)
*H04N 23/56* (2023.01)
*G02B 9/36* (2006.01)

(52) U.S. Cl.
CPC ......... *G02B 13/0065* (2013.01); *G02B 13/02* (2013.01); *H04N 23/00* (2023.01); *H04N 23/56* (2023.01); *G02B 9/36* (2013.01)

(56) References Cited

U.S. PATENT DOCUMENTS

| | | |
|---|---|---|
| 6,445,513 B2 | 9/2002 | Sato |
| 7,295,386 B2 | 11/2007 | Taniyama |
| 7,345,830 B2 | 3/2008 | Shinohara |
| 7,453,654 B2 | 11/2008 | Shinohara |
| 7,502,181 B2 | 3/2009 | Shinohara |
| 7,554,597 B2 | 6/2009 | Scherling |
| 7,663,814 B2 | 2/2010 | Kitahara |
| 7,692,869 B2 | 4/2010 | Yamaguchi et al. |
| 9,223,118 B2 | 12/2015 | Mercado |
| 9,316,810 B2 | 4/2016 | Mercado |
| 2004/0257677 A1 | 12/2004 | Matsusaka |
| 2009/0244720 A1* | 10/2009 | Yamaguchi .......... G02B 27/646 359/690 |
| 2011/0051257 A1 | 3/2011 | Wada et al. |
| 2012/0249815 A1 | 10/2012 | Bohn et al. |
| 2013/0021677 A1 | 1/2013 | Kubota |
| 2015/0198784 A1* | 7/2015 | Bone .................. G02B 13/0065 359/708 |
| 2015/0253647 A1 | 9/2015 | Mercado |
| 2022/0057602 A1 | 2/2022 | Mercado |

FOREIGN PATENT DOCUMENTS

| | | |
|---|---|---|
| CN | 102338928 | 2/2012 |
| JP | H10186227 | 7/1998 |
| JP | 2006078854 | 3/2006 |
| JP | 2008089690 | 4/2008 |
| JP | 2008176185 | 7/2008 |
| JP | 2011-53295 | 3/2011 |
| KR | 20070122018 | 12/2007 |

OTHER PUBLICATIONS

Office Action from Chinese Application No. 201510090748.X, Dated Mar. 10, 2017 (English translation and Chinese version), Apple Inc., pp. 1-32.

Notice of Preliminary Rejection from Korean Application No. 10-2016-7023713, Dated Jul. 20, 2017, Apple Inc., pp. 1-14.

Extended European Search Report from Application No. 21184544. 1-1020, dated Aug. 11, 2021, pp. 1-13.

* cited by examiner

FOLDED TELEPHOTO CAMERA LENS SYSTEM

PRIORITY INFORMATION

This application is a continuation of U.S. patent application Ser. No. 17/466,626, filed Sep. 3, 2021, which is a continuation of U.S. patent application Ser. No. 16/586,798, filed Sep. 27, 2019, now U.S. Pat. No. 11,112,582, which is continuation of U.S. patent application Ser. No. 15/130,492, filed Apr. 15, 2016, now U.S. Pat. No. 10,429,614, which is a continuation of U.S. patent application Ser. No. 14/291,544, filed May 30, 2014, now U.S. Pat. No. 9,316,810, which claims benefit of priority of U.S. Provisional Application Ser. No. 61/949,861, filed Mar. 7, 2014, the contents of which are incorporated by reference herein in their entirety.

BACKGROUND

Technical Field

This disclosure relates generally to camera systems, and more specifically to lens systems for small form factor cameras.

Description of the Related Art

The advent of small, mobile multipurpose devices such as smartphones and tablet or pad devices has resulted in a need for high-resolution, small form factor cameras for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of a photosensor with small pixel size and a good, compact imaging lens system. Advances in technology have achieved reduction of the pixel size in photosensors. However, as photosensors become more compact and powerful, demand for compact imaging lens system with improved imaging quality performance has increased.

SUMMARY OF EMBODIMENTS

Embodiments of the present disclosure may provide a high-resolution telephoto camera in a small package size. A camera is described that includes a photosensor and a compact folded telephoto lens system. In embodiments, folding the optical path of the camera lens system may facilitate achieving a small form factor for the camera lens assembly, and may also facilitate achieving a high resolution optical lens system using a relatively small number of lens elements in the small form factor. Embodiments of folded telephoto lens system are described that may provide a larger image and with longer effective focal length than has been realized in conventional small form factor cameras. Embodiments of a telephoto camera including the folded telephoto lens system may be implemented in a small package size while still capturing sharp, high-resolution images, making embodiments of the camera suitable for use in small and/or mobile multipurpose devices such as cell phones, smartphones, pad or tablet computing devices, laptop, netbook, notebook, subnotebook, and ultrabook computers. In some embodiments, a telephoto camera as described herein may be included in a device along with a wider-field small format camera, which would for example allow the user to select between the different camera formats (telephoto or wide-field) when capturing images with the device.

Embodiments of a folded telephoto lens system are described that may include four lens elements with refractive power. However, more or fewer lens elements may be used in some embodiments. In various embodiments, a light path folding element such as a plane mirror or a prism element may be used to fold the light optical path by redirecting or reflecting the light from a first optical axis on to a second optical axis. In at least some embodiments, at least one of the object side and image side surfaces of at least one of the lens elements is aspheric.

In at least some embodiments, the folded telephoto lens system includes a folded optical axis (referred to herein as AX) that includes a first (object side) optical axis and a second (image side) optical axis, a first group (referred to herein as GR1) of refractive elements, a light path folding element (e. g., a prism or plane mirror) that folds the light optical path by redirecting or reflecting the light from the first optical axis on to the second optical axis, a second group (referred to herein as GR2) of refractive elements, and a photosensor at the image plane. At least some embodiments may also include an infrared filter. At least some embodiments of a folded telephoto lens system may include zooming capabilities for focusing an object scene at infinity (object distance from camera ≥20 meters) to near object distance (<1 meter). For example, in various embodiments, the first group (GR1), the second group GR2, and/or the photosensor at the image plane may be zoomed, moved or translated for focusing an object scene from far distance (≥20 meters) to near distance (<1 meter).

In at least some embodiments, the lens system may be a fixed folded telephoto lens system configured such that the absolute value of the effective focal length f of the lens system is at or about 14 millimeters (mm) (e. g., within a range of 8 mm to about 14 mm), the F-number (focal ratio) is within a range from about 2.4 to about 10, the field of view (FOV) is at or about 26 degrees, and the total track length (TTL) of the unfolded lens system is within a range of 8 mm to 14 mm. The total track length (TTL) of a telephoto lens system is the distance on the optical axis (AX) between the front vertex at the object side surface of the first (object side) lens element and the image plane. In embodiments of the folded telephoto lens system, the unfolded total track length (TTL) of the lens system may be defined as the distance on the folded optical axis (AX) between the front vertex at the object side surface of the first (object side) lens element and the image plane. In other words, the TTL for the folded telephoto lens system is the sum of the absolute values of the distances on the folded axis, AX, between the front vertex at the object side surface of the first (object side) lens element and the reflecting surface of light path folding element (mirror or prism) and the absolute value of the distance between the reflecting surface and the image plane. The sum of the absolute values of the distances may be used here since by optical design convention, the algebraic signs of the optical parameters (such as radii of curvatures, distances, focal length, etc.) change signs following a reflecting surface. More generally, the lens system may be configured such that the telephoto absolute value ratio (TTL/f) of the folded lens system satisfies the relation, $$0.8 < TTL/f \leq 1.0,$$

where f is the absolute value of the effective focal length. To be classified as a telephoto lens system, TTL/f is less than or equal to 1. Thus, embodiments may provide telephoto lens systems. However, note that in some embodiments a folded lens system may be configured or may be adjustable so that the telephoto ratio is greater than one (TTL/f>1.0), and thus embodiments may encompass non-telephoto folded lens systems and/or folded lens systems that are adjustable between the telephoto range and the non-telephoto range.

In at least some embodiments, the folded telephoto lens system may be configured such that the effective focal length f of the lens system is 14 mm, and the F-number is 2.8. However, note that the focal length (and/or other parameters) may be scaled or adjusted to meet specifications of optical, imaging, and/or packaging constraints for other camera system applications, for example for larger form factor camera applications. In addition, in some embodiments, the folded telephoto lens system may be adjustable. For example, in some embodiments, the folded telephoto lens system may include an adjustable iris or aperture stop. Using an adjustable aperture stop, the F-number (focal ratio, or f/#) may be dynamically varied within a range of 2.8 to 10 or higher. Moreover, in some embodiments, the folded lens system may also include a zooming mechanism for dynamically focusing an object scene from far distance at infinity (i.e., ≥20 meters) to near object distance (i.e., <1 meter).

The refractive lens elements in the various embodiments may be composed of plastic materials. In at least some embodiments, the refractive lens elements may be composed of injection molded optical plastic materials. The fold mirror and prism elements in the various embodiments may be composed of glass or plastic materials. However, other suitable transparent optical materials may be used. Also note that, in a given embodiment, different ones of the lens elements may be composed of materials with different optical characteristics, for example different Abbe numbers and/or different refractive indices. Also note that, while the lens elements in the various embodiments are generally illustrated as being circular lenses, in some embodiments one or more of the lenses may be of other shapes, for example oval, rectangular, square, or rectangular with rounded corners.

In at least some embodiments of the folded telephoto lens system, the lens element materials may be selected and the refractive power distribution of the lens elements may be calculated to satisfy a lens system focal length requirement and to correct the chromatic aberrations and the field curvature or Petzval sum. The monochromatic and chromatic variations of the optical aberrations may be reduced by adjusting the radii of curvature and aspheric coefficients or geometric shapes of the lens elements and axial separations to produce well-corrected and balanced minimal residual aberrations, as well as to reduce the total track length (TTL) and to achieve image quality optical performance and high resolution in a small form factor lens system camera.

Figure 1A:
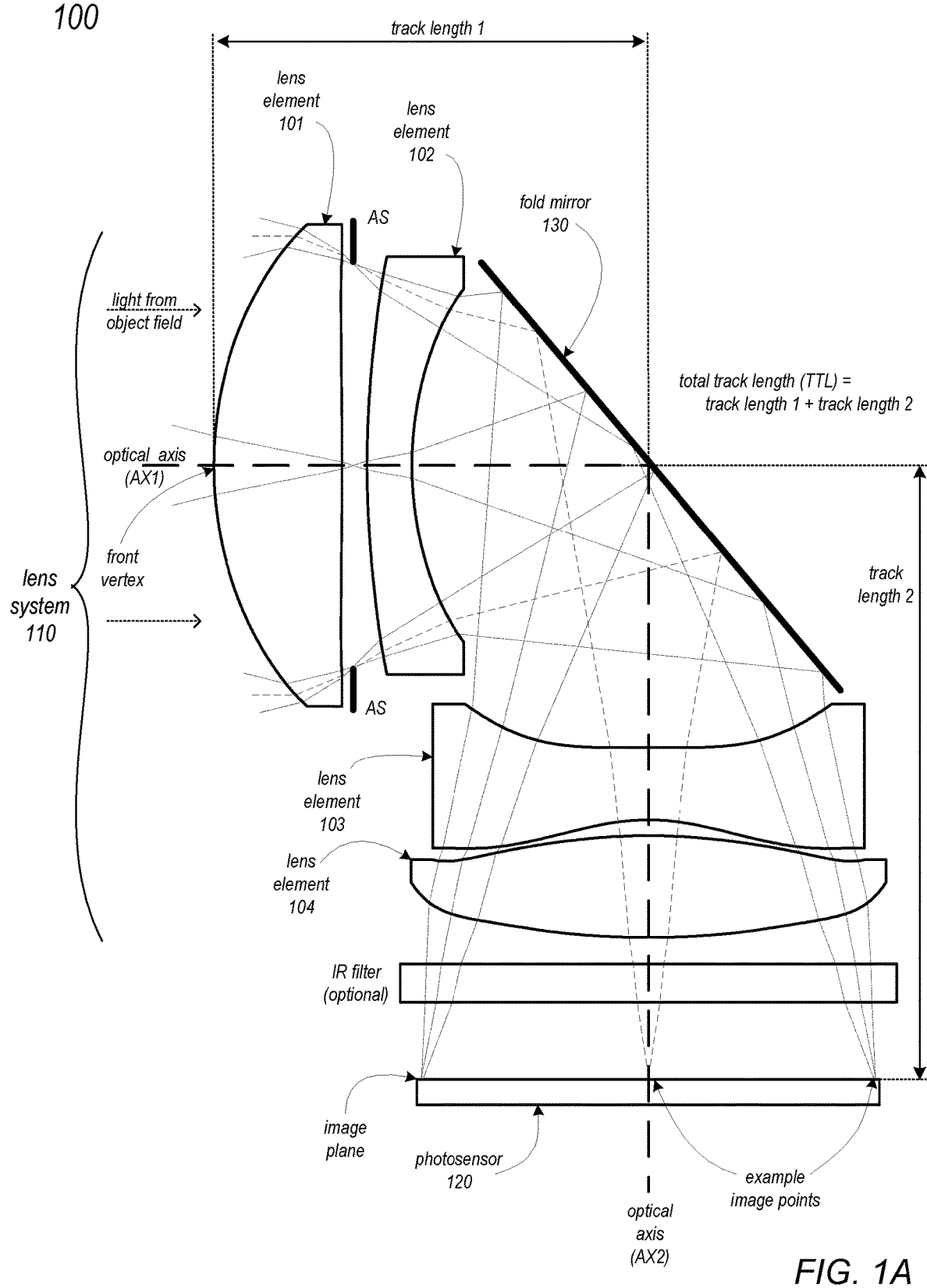
FIGS. 1A and 1B are cross-sectional illustrations of an example embodiment of a compact telephoto camera including a folded telephoto lens system that includes four refractive lens elements and a fold mirror that acts to fold the optical path.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of small form factor cameras including a photosensor and a compact folded telephoto lens system are described. Various embodiments of a compact folded telephoto lens system including four lens elements are described that may be used in the camera and that provide a larger image and with longer effective focal length than has been realized in conventional compact cameras. The camera may be implemented in a small package size while still capturing sharp, high resolution images, making embodiments of the camera suitable for use in small and/or mobile multipurpose devices such as cell phones, smartphones, pad or tablet computing devices, laptop, netbook, notebook, subnotebook, ultra book computers, surveillance devices, and so on. However, note that the aspects of the camera (e.g., the lens system and photosensor) may be scaled up or down to provide cameras with larger or smaller package sizes. In addition, embodiments of the camera system may be implemented as stand-alone digital cameras. In addition, to still (single frame capture) camera applications, embodiments of the camera system may be adapted for use in video camera applications.

Several example embodiments of compact folded telephoto lens systems are described, including embodiments with a plane mirror or a prism and four refracting lens elements. FIGS. 1A-1B, 3A-3B, 7A-7B, and 17A-17B show variations on an example embodiment that includes a plane mirror element for folding the light optical path and four refracting lens elements. FIGS. 5A-5B, 9A-9B, 11A-11B, 13A-13B, 19A-19B, and 21A-21B show variations on an example embodiment that includes a prism for folding the light optical path and four refracting lens elements. Note, however, that these examples are not intended to be limiting, and that variations on the various parameters given for the lens system are possible while still achieving similar results.

The refractive lens elements in the various embodiments may be composed of plastic materials. In at least some embodiments, the refractive lens elements may be composed of injection molded plastic material. The fold mirror and prism elements in the various embodiments may be composed of glass or plastic materials. However, other transparent optical materials may be used. Also note that, in a given embodiment, different ones of the lens elements may be composed of materials with different optical characteristics, for example different Abbe numbers and/or different refractive indices. Also note that, while the lens elements in the various embodiments are generally illustrated as being circular lenses, in some embodiments one or more of the lenses may be of other shapes, for example oval, rectangular, square, or rectangular with rounded corners.

In each of the example cameras illustrated in the Figures, the example camera includes at least a folded telephoto lens system and a photosensor. The photosensor may be an integrated circuit (IC) technology chip or chips implemented according to any of various types of photosensor technology. Examples of photosensor technology that may be used are charge-coupled device (CCD) technology and complementary metal-oxide-semiconductor (CMOS) technology. In at least some embodiments, pixel size of the photosensor may be 1.2 microns or less, although larger pixel sizes may be used. In a non-limiting example embodiment, the photosensor may be manufactured according to a 1280×720 pixel image format to capture 1 megapixel images. However, other larger or smaller pixel formats may be used in embodiments, for example 5 megapixel, 10 megapixel, or larger or smaller formats.

Figure 11A:
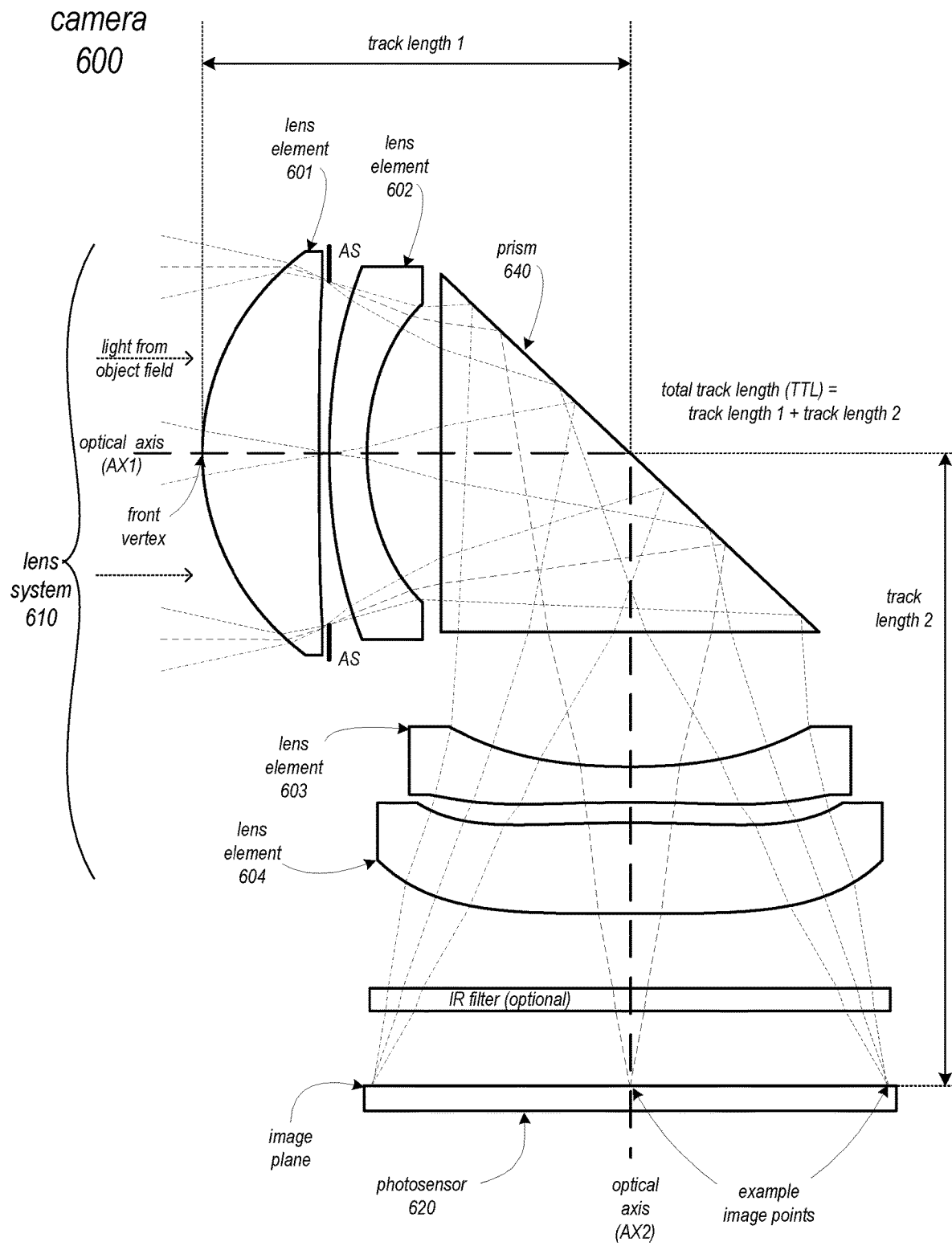
FIGS. 11A and 11B are cross-sectional illustrations of another example embodiment of a compact camera including a folded telephoto lens system that includes four lens elements with refractive power and a prism that acts to fold the optical path.
Figure 13A:
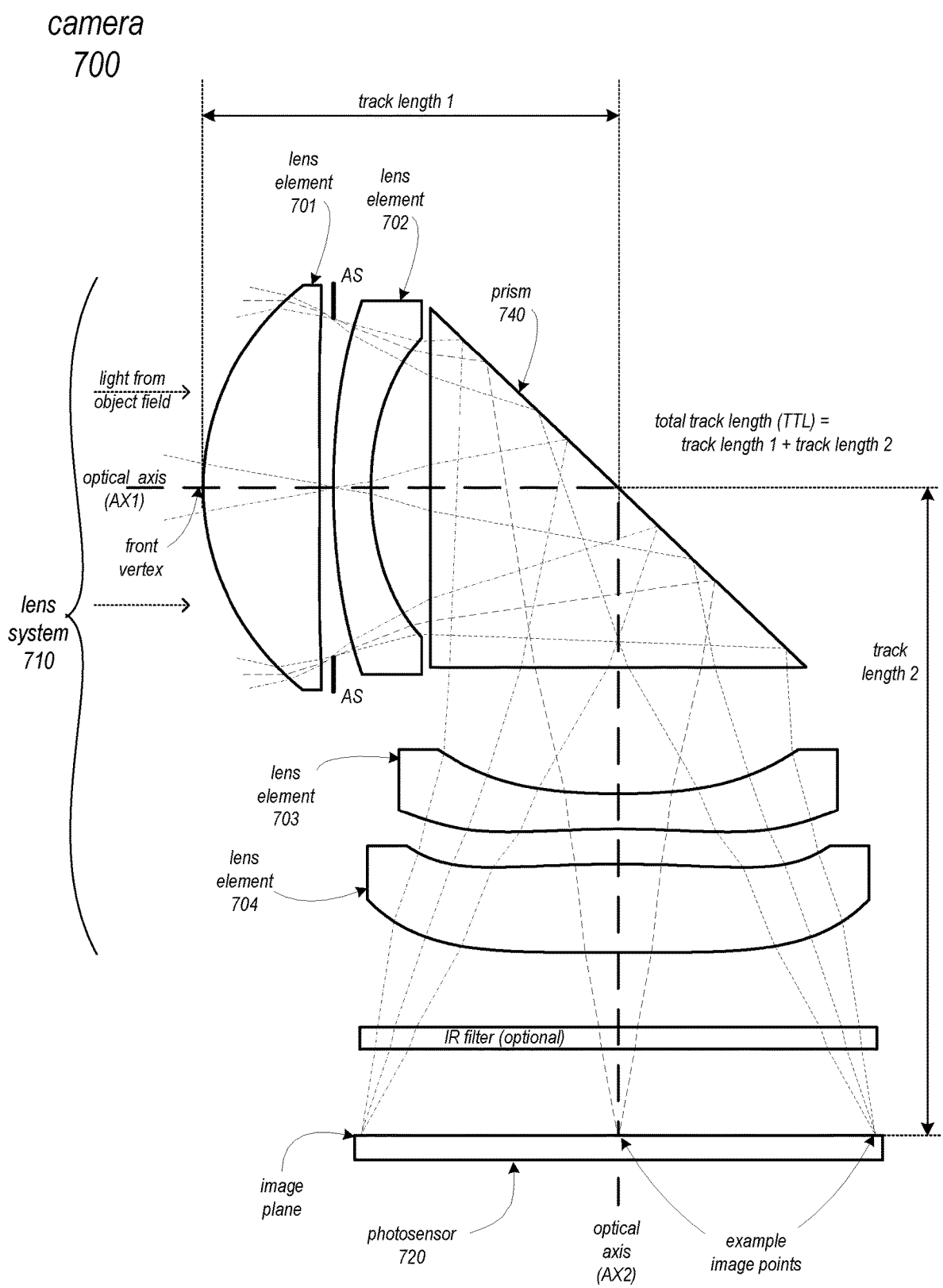
FIGS. 13A and 13B are cross-sectional illustrations of another example embodiment of a compact camera including a folded telephoto lens system that includes four lens elements with refractive power and a prism that acts to fold the optical path.
Figure 21A:
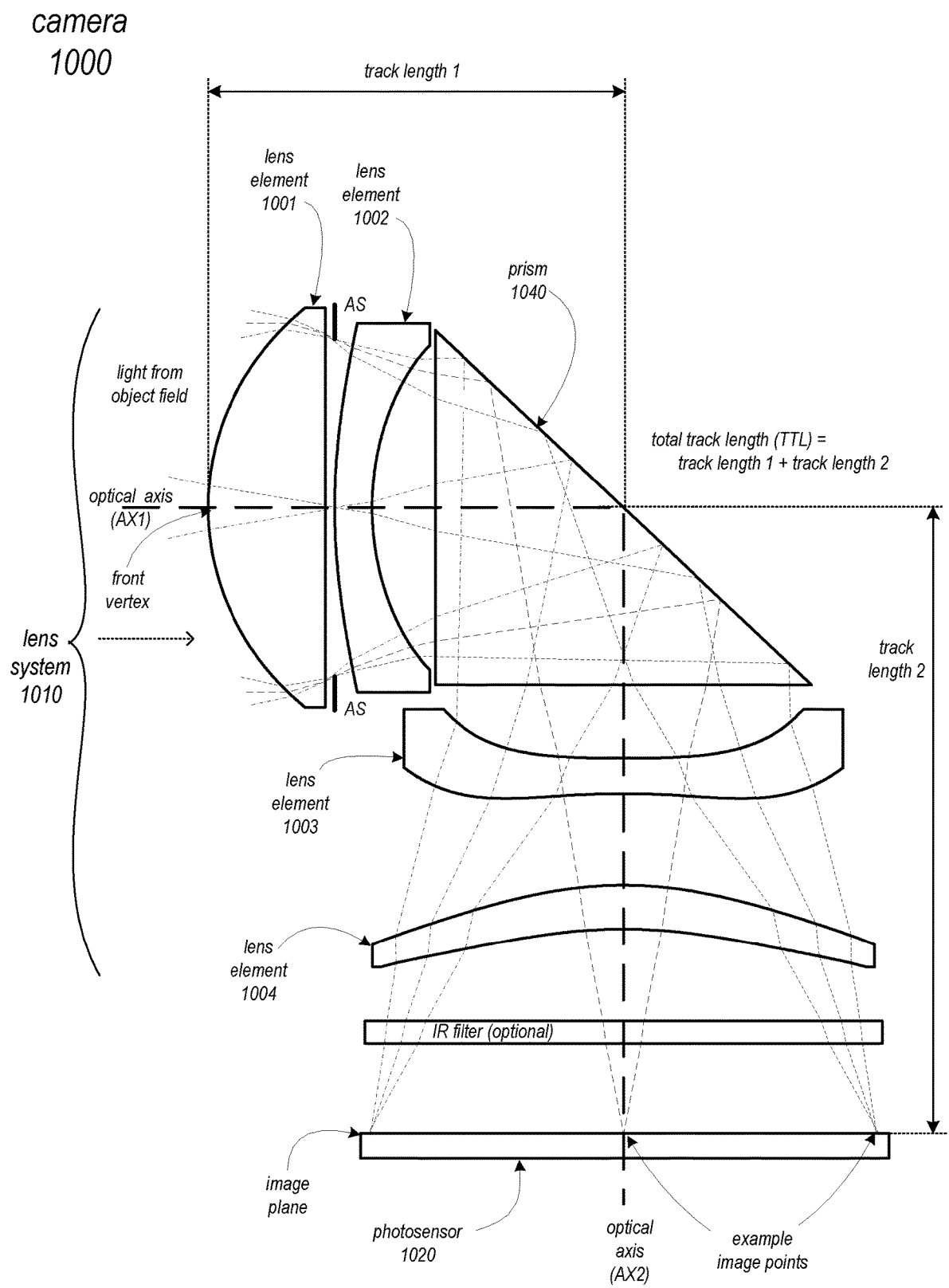
FIGS. 21A and 21B are cross-sectional illustrations of another example embodiment of a compact camera including a folded telephoto lens system that includes four lens elements with refractive power in which the first lens element is plano-convex in shape and in which the aperture stop is located between the first and second lens elements.

The camera may also include a frontal aperture stop (AS) located in front of (i.e., on the object side of) a first lens element. While FIGS. 3A, 5A, 7A, 9A, 17A, and 19A show the frontal aperture stop located at or near the front vertex of the lens system, location of the aperture stop may be closer to or farther away from the vertex of the lens element. Further, in some embodiments, the aperture stop may be located elsewhere in the folded telephoto lens system. For example, the aperture stop may be located between the first and second lens elements as shown in FIGS. 11A, 13A, and 21A.

The camera may also, but does not necessarily, include an infrared (IR) filter located between a last lens element of the telephoto lens system and the photosensor. The IR filter may, for example, be composed of a glass material. However, other materials may be used. Note that the IR filter does not affect the effective focal length f of the telephoto lens system. Further note that the camera may also include other components than those illustrated and described herein.

In the camera, the folded telephoto lens system forms an image at an image plane (IP) at or near the surface of the photosensor. The image size for a distant object is directly proportional to the effective focal length f of a lens system. The total track length (TTL) of the telephoto lens system is the distance on the optical axis (AX) between the front vertex at the object side surface of the first (object side) lens element and the image plane. For a telephoto lens system, the total track length (TTL) is less than the lens system effective focal length (f), and the ratio of the total track length to the focal length (TTL/f) is the telephoto ratio. To be classified as a telephoto lens system, TTL/f is less than or equal to 1.

In a folded telephoto lens system, the light path folding element (e.g. a mirror or prism) with a reflecting surface changes a direction of the incoming light from a first optical axis (AX1) to a second optical axis (AX2). The incoming light from the object field passes through the refracting optical surfaces of the optical elements located on a first optical axis, AX1. A reflecting surface changes the direction of the incoming light from the first optical axis AX1 to a second optical axis, AX2, and the incoming light on the second optical axis passes through the refracting elements to the image plane on the second optical axis. The second optical axis AX2 may be oriented at an angle by the reflecting surface of the fold mirror or prism relative to the first optical axis AX1 to accommodate a desired compact form factor camera system. The angle may generally be 90 degrees to thus provide a right angle fold of the optical axis, but other angles less than or greater than 90 degrees may be used in some embodiments. In the following discussion, the total track length of the folded telephoto lens system (TTL) may be defined to be equal to the sum of the distance on AX1 between the front vertex at the object side surface of the first (object side) lens element and the reflecting surface of the fold mirror or prism (track length 1, denoted by TL1), and the distance on AX2 between the reflecting surface of the fold mirror or prism to the image plane denoted (track length 2, denoted by TL2); i.e., TTL=TL1+TL2. Due to the change in algebraic sign of the parameters following a reflecting surface, the absolute value of the distance TL2 will be used to determine the TTL in the above-mentioned definition.

In at least some embodiments, the folded telephoto lens system may be a fixed telephoto lens system configured such that the effective focal length f of the lens system is at or about 14 millimeters (mm), the F-number (focal ratio, or f/#) is 2.8, the field of view (FOV) is at or about 26 degrees (although narrower or wider FOVs may be achieved), and the total track (TTL) is within the range of about 10 mm to about 14 mm. More generally, the telephoto lens system may be configured such that the telephoto ratio (TTL/f) satisfies the relation:

$$0.80 < |TTL/f| \leq 1.0.$$

However, note that in some embodiments a folded lens system may be configured or may be adjustable so that the telephoto ratio is greater than one (|TTL/f|>1.0), and thus embodiments may encompass non-telephoto folded lens systems and/or folded lens systems that are adjustable between the telephoto range and the non-telephoto range. In at least some embodiments, the folded telephoto lens system may be configured such that the effective focal length f of the lens system is 14 mm at reference wavelength 555 nm and the F-number is 2.8. The lens system may, for example, be configured with focal length f of 14 mm and F-number of 2.8 to satisfy specified optical, imaging, and/or packaging constraints for particular camera system applications. Note that the F-number, also referred to as the focal ratio or f/# is defined by f/D, where D is the diameter of the entrance pupil, i.e., the effective aperture. As an example, at f=14 mm, an F-number of 2.8 is achieved with an effective aperture of 5.0 mm. At least some embodiments may also be configured with a field of view (FOV) at or about 26 degrees. In example embodiments, total track length (TTL) may vary from about 13.6 mm to about 14 mm. In example embodiments, telephoto ratio (TTL/f) may vary within the range of about 0.97 to about 1.0.

Figure 1B:
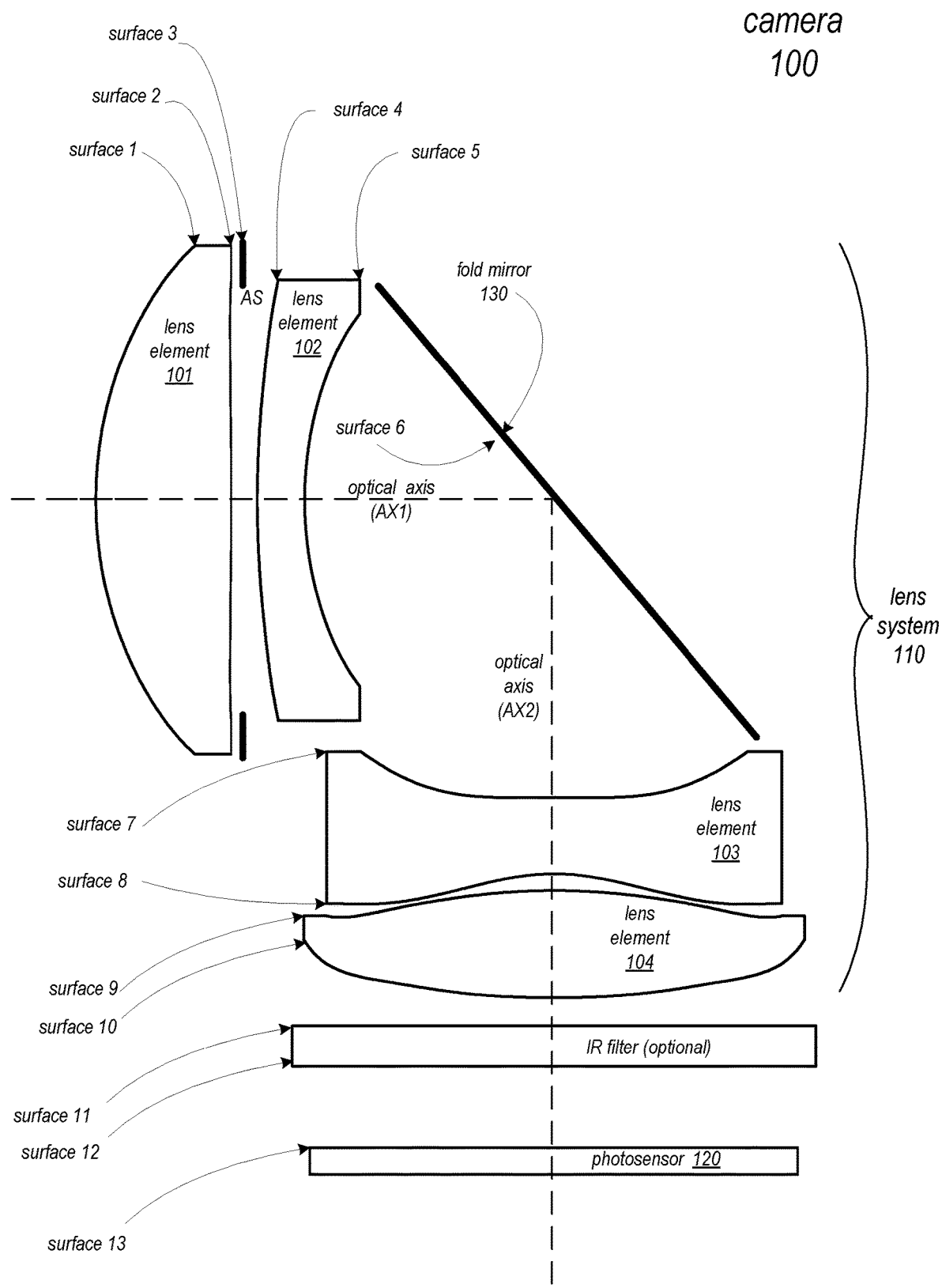

However, note that the focal length f, F-number, and/or other parameters may be scaled or adjusted to meet various specifications of optical, imaging, and/or packaging constraints for other camera system applications. Constraints for a camera system that may be specified as requirements for particular camera system applications and/or that may be varied for different camera system applications include but are not limited to the focal length f, effective aperture, F-number, field of view (FOV), imaging performance requirements, and packaging volume or size constraints. For example, in an embodiment as illustrated in FIGS. 1A and 1B, the folded telephoto lens system may be configured such that the effective focal length f of the lens system is 10 mm at reference wavelength 555 nm, F-number of 2.8 and with a field of view (FOV) at or about 24 degrees. The total track length (TTL) of this example embodiment is about 8.8 mm and with a telephoto ratio (|TTL/f|) of about 0.88.

In some embodiments, the folded telephoto lens system may be adjustable. For example, in some embodiments, a folded telephoto lens system as described herein may include an adjustable iris (entrance) pupil or aperture stop. Using an adjustable aperture stop, the F-number (focal ratio, or f#) may be dynamically varied within a range. For example, if the lens is well-corrected at f/2.8, at a given focal length f and FOV, then the focal ratio may be varied within the range of 2.8 to 10 (or higher) by adjusting the aperture stop, assuming that the aperture stop can be adjusted to the desired F-number setting. In some embodiments, the lens system may be used at faster focal ratios (f#<2.8) by adjusting the aperture stop with degraded image quality performance at the same FOV (e. g. 26 degrees), or with reasonably good performance at a smaller FOV.

In some embodiments, the folded telephoto lens system may also include a manual and/or automatic focusing mechanism to provide zooming capabilities for focusing an object scene at infinity (object scene distance from camera ≥20 meters) to near object distance (≤1 meter). For example, in some embodiments, folded telephoto lens systems as described herein (see FIGS. 3A, 5A, and 7A) may include an adjustable focusing mechanism to translate or move a group of lens elements to focus objects at distances ranging from infinity (≥20 meters) to (≤1 meter). In some embodiments, the folded telephoto lens system (see FIGS. 13A, 17A, 19A, and 21A) may include an adjustable focus mechanism via which the photosensor at the image plane may be zoomed or moved or actuated for focusing an object scene at distances ranging from greater than 20 meters to less than 1 meter. Note that some embodiments may be configured to move or translate the photosensor and one or more lens elements to achieve focus.

While ranges of values may be given herein as examples for adjustable cameras and folded telephoto lens systems in which one or more optical parameters may be dynamically varied (e.g., using an adjustable aperture stop and/or adjustable focus), embodiments of camera systems that include fixed (non-adjustable) folded telephoto lens systems in which values for optical and other parameters are within these ranges may be implemented.

Referring first to embodiments as illustrated in FIGS. 1A-1B, 3A-3B, 7A-7B, and 17A-17B, a compact folded telephoto lens system (110, 210, 410, or 810) of a camera (100, 200, 400, or 800) may include a light path folding element (e.g., a mirror), four lens elements (101-104 in lens system 110 of FIGS. 1A-1B, 201-204 in lens system 210 of FIGS. 3A-3B, 401-404 in lens system 410 of FIGS. 7A-7B, and 801-804 in lens system 810 of FIGS. 17A-17B) with refractive power, and lens system focal length off, arranged along a folded optical axis AX from an object side (AX1) to an image side (AX2):
  a first lens element L1 (101, 201, 401, or 801) with positive refractive power having a convex object side surface;
  a second lens element L2 (102, 202, 402, or 802) with negative refractive power;
  a light path folding mirror (130, 230, 430, or 830) that folds the optical axis from AX1 to AX2;
  a third lens element L3 (103, 203, 403, or 803) with negative refractive power; and
  a fourth lens element L4 (104, 204, 404, or 804) with positive refractive power.

In addition, in at least some embodiments, at least one of the object side and image side surfaces of at least one of the four lens elements is aspheric. In addition, at least some embodiments may include an IR filter, for example located between the fourth lens element and the photosensor.

The lens systems 110, 210, 410, and 810 may be configured such that the telephoto ratio (TTL/f) satisfies the relation:

$$0.8 < |TTL/f| \leq 1.0. \tag{1}$$

The first lens element L1 of the lens system 110, 210, 410, and 810 may have positive refractive power and focal length f1 and may satisfy the relation:

$$0.4 < |f1/f| < 0.8. \tag{2}$$

In at least some embodiments of the lens system 110, 210, 410, and 810, L1 may have a shape with vertex radii of curvature R1 and R2 and with shape satisfying the condition, $$0 \leq |R1/R2| < 6.1, \tag{3}$$

where R1 is an object side vertex radius of L1, and R2 is an image side vertex radius of curvature of L1.

The first lens element L1 may have a positive refractive power and may have a positive meniscus or biconvex in shape. An example embodiment where L1 is a positive meniscus in shape and having a convex object side surface is illustrated by the lens element L1 in folded telephoto lens system 410 of FIG. 7A. An example embodiment where L1 is biconvex in shape is illustrated by the lens element L1 in lens system 810 of FIG. 17A.

The lens systems 110, 210, 410, and 810 may be configured such that the dioptric power distribution of the lens elements L2, L3, and L4 may have refractive powers or focal lengths f2, f3, and f4, and may satisfy the following conditions:

$$0.5 < |f2/f| < 1.5, \text{ and } 0.02 < |R3/R4| < 3.3, \tag{4}$$

$$0.4 < |f3/f| < 2.0, \text{ and } 0.05 < |R5/R6| < 12.1, \tag{5}$$

$$0.5 < |f4/f| < 10.0, \text{ and } 0.04 < |R7/R8| < 1.1, \tag{6}$$

where:
  R3 is an object side surface vertex radius of curvature of the second lens element L2 and R4 is the vertex radius of curvature of an image side surface of L2;
  R5 is the vertex radius of curvature of an object side surface of the third lens element L3 and R6 is the vertex radius of curvature of an image side surface of L3; and
  R7 is the vertex radius of curvature of an object side surface of the fourth lens element L4 and R8 is the vertex radius of curvature of an image side surface of L4.

The second lens element L2 may have a negative refractive power and may be a negative meniscus in shape. An example embodiment where L2 is a negative meniscus in shape and having a convex object side surface is illustrated by the lens element L2 in folded telephoto lens system 110 of FIG. 1A.

The third lens element L3 may have a negative refractive power and may be a negative meniscus in shape. Example embodiments where L3 is a negative meniscus in shape and having a convex object side surface is illustrated by the lens element L3 in folded telephoto lens systems 210 of FIG. 3A, and lens system 410 of FIG. 7A.

The fourth lens element L4 may have a positive refractive power and may be a positive meniscus or biconvex in shape.

Figure 17A:
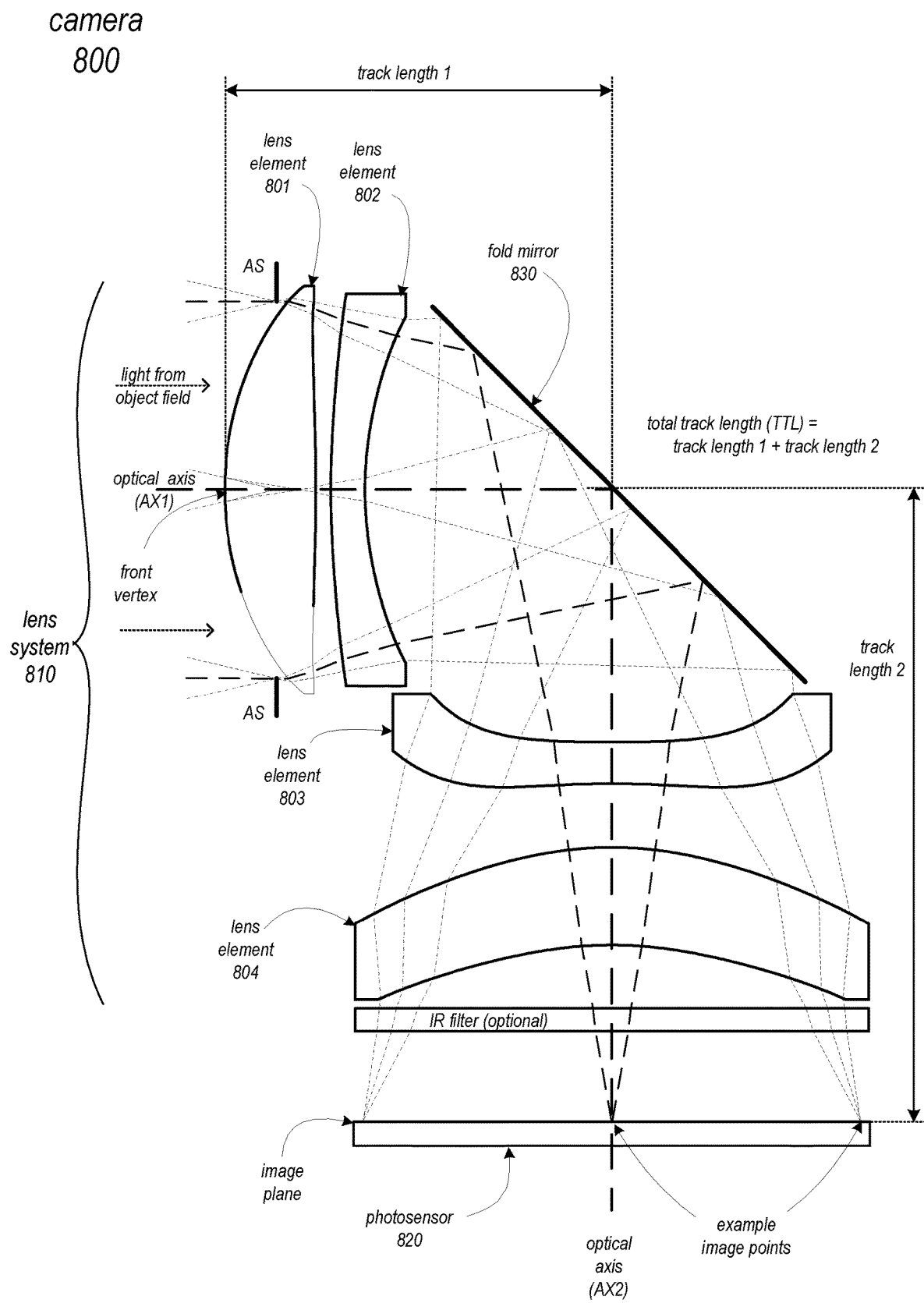
FIGS. 17A and 17B are cross-sectional illustrations of another example embodiment of a compact camera including a folded telephoto lens system that includes four lens elements with refractive power and a fold mirror that acts to fold the optical path

Example embodiments where L4 is a positive meniscus in shape and having a convex object side surface is illustrated by the lens element L4 in folded telephoto lens systems 810 of FIG. 17A. An example embodiment where L4 is biconvex in shape is illustrated by the lens element L4 in folded telephoto lens system 110 of FIG. 1A.

In at least some embodiments of lens systems 110, 210, 410, and 810, the first lens element L1, and the third lens element L3 may be composed of a material (e.g., a plastic material) having an Abbe number of V1. The second, and fourth lens elements L2 and L4 may be composed of a material (e.g., plastic material) having an Abbe number of V2. The Abbe numbers of the lens materials for the lens elements may satisfy the condition:

$$30 < V1 - V2 < 35. \quad (7)$$

In at least some embodiments of lens systems 110, 210, 410, and 810, the lens element L1 and L2 may be arranged in close proximity such that the combination of L1 and L2 may be considered as an air-spaced doublet lens L12 of positive refractive power or positive focal length f12. In at least some embodiments of lens systems 110, 210, 410, and 810, the lens element L3 and L4 may be arranged in close proximity such that the combination of L3 and L4 may be considered as an air-spaced doublet lens L34 having negative refractive power or negative focal length f34.

Referring now to embodiments as illustrated in FIGS. 5A-5B, 9A-9B, 11A-11B, 13A-13B, 19A-19B, and 21A-21B a compact folded telephoto lens system (310, 510, 610, 710, 910 or 1010) of a camera (300.500, 600, 700, 900 or 1000) may include a light path folding element and four lens elements (301-304 in lens system 310 of FIG. 5A, 501-504 in lens system 510 of FIG. 9A, 601-604 in lens system 610 of FIG. 11A, 701-704 in lens system 710 of FIG. 13A, 901-904 in FIG. 19A, 1001-1004 in lens system 1010 of FIG. 21A) with refractive power, and lens system focal length off, arranged along a folded optical axis AX from an object side (AX1) to an image side (AX2):

a first lens element L1 (301, 501, 601, 701, 901 or 1001) with positive refractive power having a convex object side surface;

a second lens element L2 (302, 502, 602, 702, 902, or 1002) with negative refractive power having a convex object side surface;

a light path folding prism (340, 540, 640, 740, 940 or 1040) that folds the optical axis from AX1 to AX2;

a third lens element L3 (303, 503, 603, 703, 903 or 1003) with negative refractive power; and a fourth lens element L4 (304, 504, 604, 704, 904 or 1004) with positive refractive power.

In addition, in at least some embodiments, at least one of the object side and image side surfaces of at least one of the four lens elements is aspheric. In addition, at least some embodiments may include an IR filter, for example located between the fourth lens element and the photosensor.

The lens systems 310, 510, 610, 710, 910, and 1010 are configured such that the telephoto ratio (TTL/f) satisfies the relation (1) given by:

$$0.8 < |TTL/f| \leq 1.0.$$

Moreover, the lens systems 310, 510, 610, 710, 910, and 1010 are configured such that the refractive power distribution of the lens elements L1, L2, L3, and L4, as well as the vertex radii of curvature of the lens elements, satisfy the relations given by conditions (2), (3), (4), (5), and (6).

The first lens element L1 may have a positive refractive power and may have a biconvex or plano-convex in shape. Example embodiments where L1 is biconvex in shape are illustrated by the lens elements 501 and 601 in lens system 510 of FIG. 9A and lens system 610 of FIG. 11A, respectively. Two example embodiments where L1 is plano-convex in shape are illustrated by lens element 901 and 1001 in lens systems 910 and 1010 of FIGS. 19A and 21A, respectively.

The second lens element L2 may have a negative refractive power and may be a negative meniscus in shape. Example embodiments where L2 is a negative meniscus in shape and having a convex object side surface is illustrated by the lens element L2 in folded telephoto lens systems 510 of FIG. 9A, 610 of FIG. 11A, 710 of FIG. 13A, 910 of FIG. 19A, and 1010 of FIG. 21A.

The fourth lens element L4 may have a positive refractive power and may be a positive meniscus or biconvex in shape. Example embodiments where L4 is a positive meniscus in shape and having a convex object side surface is illustrated by the lens element L4 in folded telephoto lens systems 910 of FIG. 19A and 1010 of FIG. 21A. An example embodiment where L4 is biconvex in shape is illustrated by the lens element L4 in folded telephoto lens system 710 of FIG. 13A.

In at least some embodiments of lens systems 310, 510, 610, 710, 910, and 1010, the first lens element L1, and the third lens element L3 may be composed of a material (e.g., a plastic material) having an Abbe number of V1. The second, and fourth lens elements L2 and L4 may be composed of a material (e.g., plastic material) having an Abbe number of V2. The Abbe numbers of the lens materials for the lens elements may satisfy the condition (7):

$$30 < V1 - V2 < 35.$$

In at least some embodiments of lens systems 310, 510, 610, 710, 910, and 1010, the lens element L1 and L2 may be arranged in close proximity such that the combination of L1 and L2 may be considered as an air-spaced doublet lens L12 of positive refractive power or positive focal length f12. In at least some embodiments of lens systems 310, 510, 610, 710, and 1010, the lens element L3 and L4 may be arranged in close proximity such that the combination of L3 and L4 may be considered as an air-spaced doublet lens L34 having negative refractive power or negative focal length f34.

The following provides further details of various embodiments of a compact folded telephoto lens system that may be used in a small form factor telephoto camera in reference to FIGS. 1A through 22B.

FIGS. 1A and 1B are cross-sectional illustrations of an example embodiment of a compact telephoto camera 100 including a compact folded telephoto lens system 110. Lens system 110 includes four lens elements (101-104) with refractive power. Arranged along an optical axis AX of the camera 100 from an object side (AX1) to an image side (AX2) are a first lens element L1 (101) with positive refractive power having a convex object side surface and focal length f1, an aperture stop AS, a second lens element L2 (102) with negative refractive power having a convex object side surface and focal length f2, a planar fold mirror 130 that is oriented to change the direction of the incoming light path and thus to fold the optical axis from AX1 to AX2, a third lens element L3 (103) with negative refractive power and focal length f3, and a fourth lens element L4 (104) with positive refractive power having a convex image side surface and focal length f4. The lens system 110 forms an image at the surface of a photosensor 120. In some embodiments, an infrared (IR) filter may be located between the fourth lens element L4 and the photosensor 120.

The effective focal length of the lens system 110 is given by f. The total track length (TTL) of the compact folded telephoto lens system 110 is the distance along the optical axes AX1 and AX2 between the object side surface of the first element L1 and the image plane. Referring to FIGS. 1A and 1B, the TTL is the sum of TL1 and TL2, where TL1 is the axial distance between the front vertex of the object side surface of L1 and the reflecting surface of the fold mirror 130, and TL2 is the axial distance between the reflecting surface of fold mirror 130 and the image plane. The lens system 110 is configured such that the telephoto ratio (TTL/f) of the lens system 110 satisfies the relation:

$0.8 < |TTL/f| \leq 1.0$.

An aperture stop AS, which may be located at the front surface of lens element L1, determines the entrance pupil of the lens system 110. The lens system 110 focal ratio of f-number f# is defined as the lens system 110 effective focal length f divided by the entrance pupil diameter. The IR filter may act to block infrared radiation that could damage or adversely affect the photosensor, and may be configured so as to have no effect on f.

Tables 1A-1D provide example values for various optical and physical parameters of an example embodiment of a camera 100 and lens system 110 as illustrated in FIGS. 1A and 1B. Table 1A-1D may be referred to as providing an optical prescription for the lens system 110.

Referring to Tables 1A-1D, embodiments of lens system 110 cover applications in the visible region of the spectrum from 470 nanometers (nm) to 650 nm with reference wavelength at 555 nm. The optical prescription in Tables 1A-1D provides high image quality at f/2.8 over 470 nm to 650 nm spectrum, for an effective focal length f of 10 millimeters (mm), covering 24 degrees field of view (FOV) (12 degrees half FOV). The folded telephoto lens system 110, illustrated in FIGS. 1A and 1B and with optical prescription as shown in Tables 1A-1D, has total track length (TTL=TL1+TL2) of 8.8 mm and a telephoto ratio (TTL/f) of 0.88.

Figure 2:
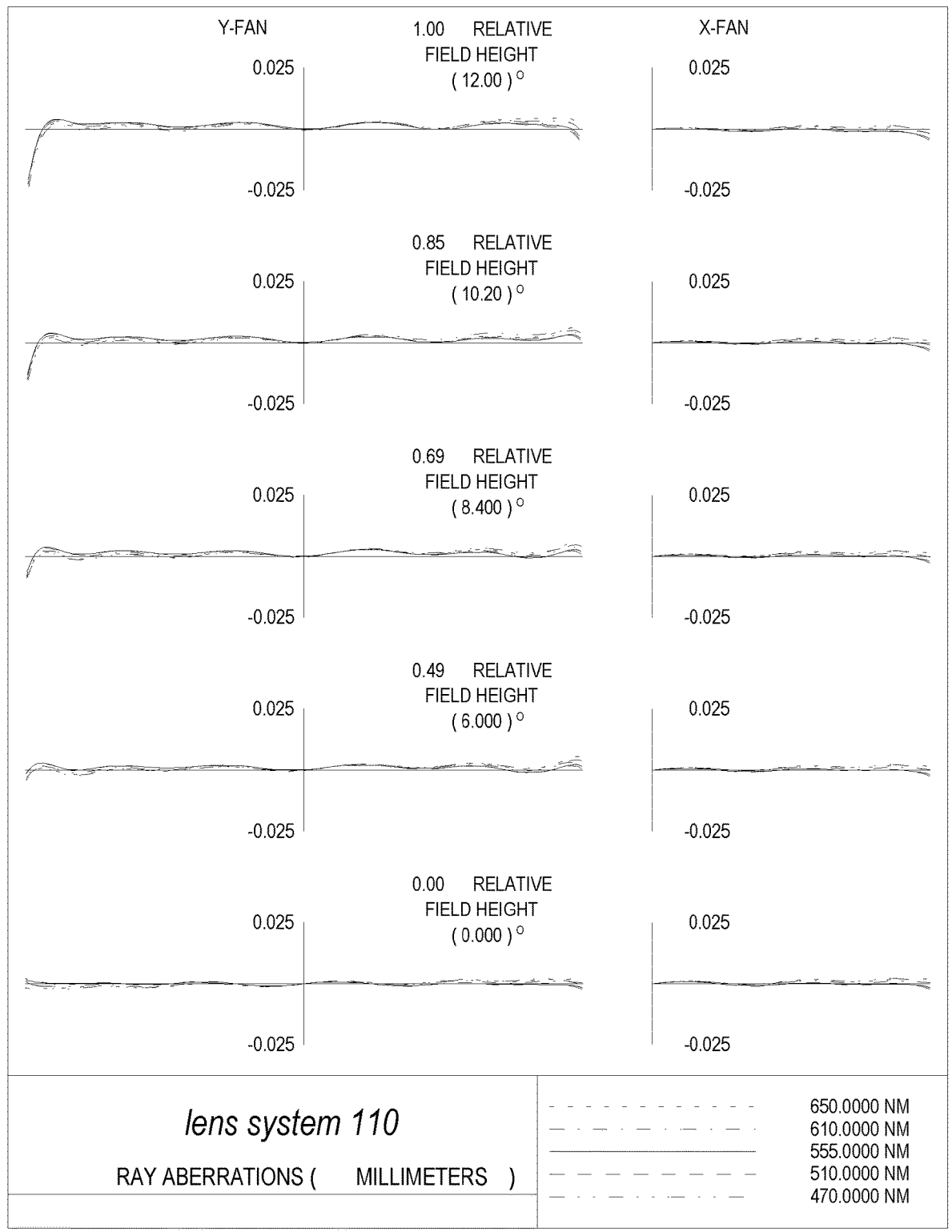
FIG. 2 illustrates a plot of the polychromatic ray aberration curves over the half field of view and over the visible spectral band ranging 470 nm to 650 nm for a folded telephoto lens system as illustrated in FIGS. 1A and 1B.

The four lens elements L1, L2, L3, and L4 of lens system 110 may be composed of plastic materials with refractive indices and Abbe numbers as listed in Table 1B. As shown in Table 1B, in at least some embodiments of lens system 110, two types of plastic materials may be used for the lens elements. Lens element L1 and L3 may be composed of the same plastic material with an Abbe number V1 of 56.1, and lens elements L2 and L4, may be composed of another plastic material with an Abbe number V2 of 23.3. The application of these two plastic materials for the lens elements in lens system 110 enables lens system 110 to be optimized and corrected for chromatic aberrations over the visible region. The lens element materials may be chosen and the refractive power distribution of the lens elements may be calculated to satisfy the effective focal length f and correction of the field curvature or Petzval sum. The monochromatic and chromatic variations of optical aberrations may be reduced by adjusting the radii of curvature and aspheric coefficients or geometrical shapes of the lens elements and axial separations as illustrated in Table 1C to produce well-corrected and balanced minimal residual aberrations. FIG. 2 illustrates a plot of the polychromatic ray aberration curves over the half field of view (HFOV=12 degrees) over the visible spectral band ranging from 470 nm to 650 nm for a folded telephoto lens system 110 as illustrated in FIGS. 1A and 1B and described in Tables 1A-1D.

The optical prescription in Tables 1A-1D describes an example embodiment of a compact folded telephoto lens system 110 as illustrated in FIGS. 1A and 1B that includes four lens elements with refractive power and effective focal length f, and in which a second lens element L2 has negative refractive power or negative focal length f2 and a convex object side surface. In addition, lens element L2 of lens system 110 is negative meniscus in shape and has positive vertex radii of curvature R3 and R4, where R3>R4, and R3/R4 is about 2.865.

In the example embodiment of lens system 110 as described by the optical prescription in Tables 1A-1D, the refractive powers of the lens elements are distributed such that the ratios of the focal lengths of the lens elements relative to the system focal length f are |f1/f|=0.430, |f2/f|=0.570, |f3/f|=0.471, and |f4/f|=0.671. Lens element L1 is a biconvex lens with vertex radii of curvature R1/R2=−0.061, and L2 has vertex radii of curvature R3/R4=2.865. Lens element L3 has vertex radii of curvature R5/R6=12.00, and lens element L4 is biconvex in shape with vertex radii of curvature R7/R8=−0.561. The aspheric coefficients for the surfaces of the lens elements in lens system 110 in the example embodiment are listed in Table 1C. Configuring lens system 110 according to the arrangement of the power distribution of the lens elements, and adjusting the radii of curvature and aspheric coefficient as shown in Tables 1A-1D, the total track length (TTL), of the lens system 110 may be reduced (e.g., to 8.8 mm as shown in Table 1A) and aberration of the system may effectively be corrected to obtain optical performance of high image quality resolution in a small form factor camera 100.

Figure 3A:
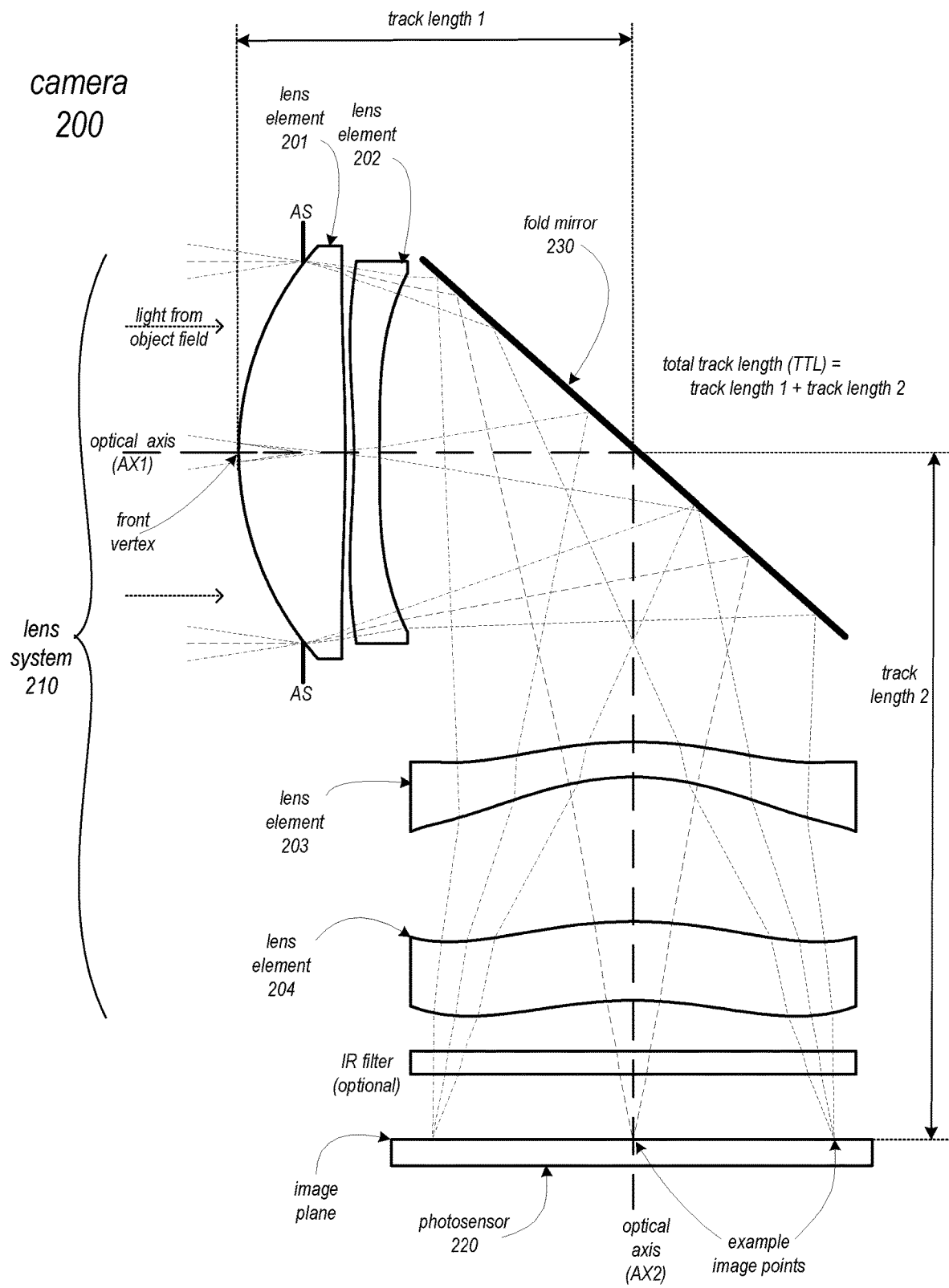
FIGS. 3A and 3B are cross-sectional illustrations of another example embodiment of a compact telephoto camera including a folded telephoto lens system that includes four refractive lens elements and a fold mirror that acts to fold the optical path.
Figure 3B:
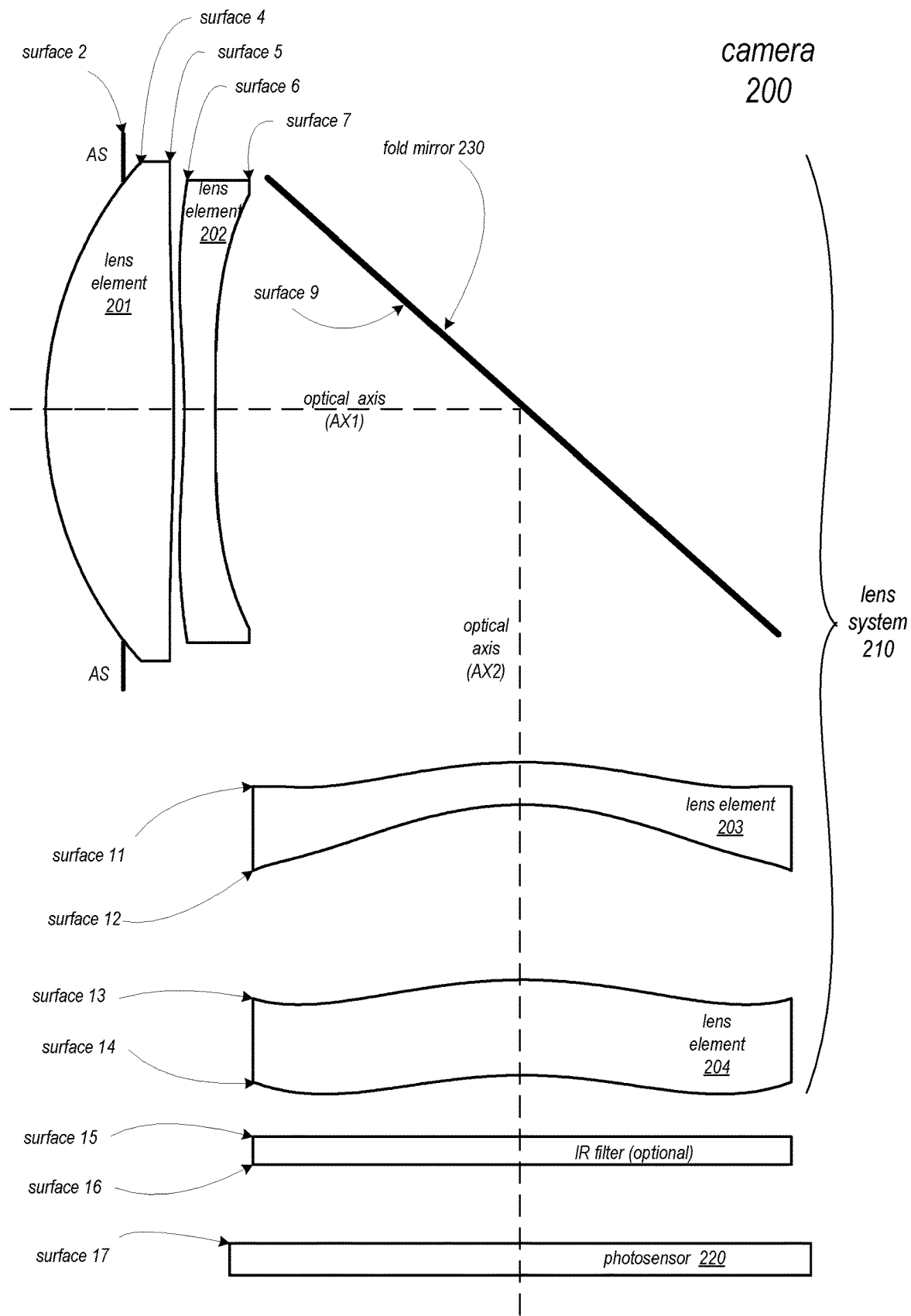

FIGS. 3A and 3B are cross-sectional illustrations of another example embodiment of a compact telephoto camera 200 including a compact folded telephoto lens system 210. Lens system 210 includes four lens elements (201-204) with refractive power. Lens system 210 may be viewed as a variation of lens system 110 of FIGS. 1A and 1B and elements of the two systems 110 and 210 may be similar. However, in lens system 210, the third element L3 (203) is a negative meniscus lens with convex object side surface.

Tables 2A-2E provide example values of various optical and physical parameters of an example embodiment of a camera 200 and lens system 210 as illustrated in FIGS. 3A and 3B. In at least some embodiments, system 210 may include a zooming mechanism for dynamically focusing an object scene from infinity (object distance ≥20 meters) to near object distance, <500 mm. Tables 2A-2E may be referred to as providing an optical prescription for a zoom lens system 210. In this example embodiment, lens system 210 may include a focusing lens group GR1 including lens elements L1 and L2 that may be translated or actuated, together with the aperture stop along AX1, for focusing an object scene located at <500 mm. The zoom parameters for system 210 are listed in Table 2E. The zoom parameters shown in Table 2E for position 1 are the axial thickness or space separation on surface #7 (along AX1) between lens element L2 from the fold mirror 230 when the object scene distance is at infinity (the optical prescription as listed in Table 2B). The corresponding optical prescription for an object scene at 500 mm (position 2) is the same as the prescription listed in Table 2B, except that the object distance in surface #0 is replaced by 500 mm, and the space separation of L2 on surface #7 is replaced by 0.7756 mm. As shown in Table 2E, the lens group GR1 moves by about 0.316 mm for the lens system 210 to zoom and focus object scene from >20 meters away from the camera to near object scene at <500 mm distance.

The optical prescription in Tables 2A-2E is for a zoom lens system 210 with an effective focal length f of 14 mm at 555 nm wavelength, a focal ratio of f/2.8, with 19 degrees FOV, TTL of 13.6 mm, and with TTL/f equal to 0.971. Lens system 210 is a compact folded imaging system designed for visible spectrum covering 470 nm to 650 nm.

The lens elements L1, L2, L3, and L4 of lens system 210 may be composed of plastic materials with refractive indices and Abbe numbers as listed in Table 2B. In this example embodiment of lens system 210, the choice of lens materials are the same as in the optical prescription for the lens system 110 as listed in Tables 1A-1D. Referring to the lens system 210, the lens element L1 and L3 may be composed of a plastic material having an Abbe number of V1=56.1. The lens elements L2 and L4 may be composed of a plastic material with Abbe number V2=23.3.

Figure 4A:
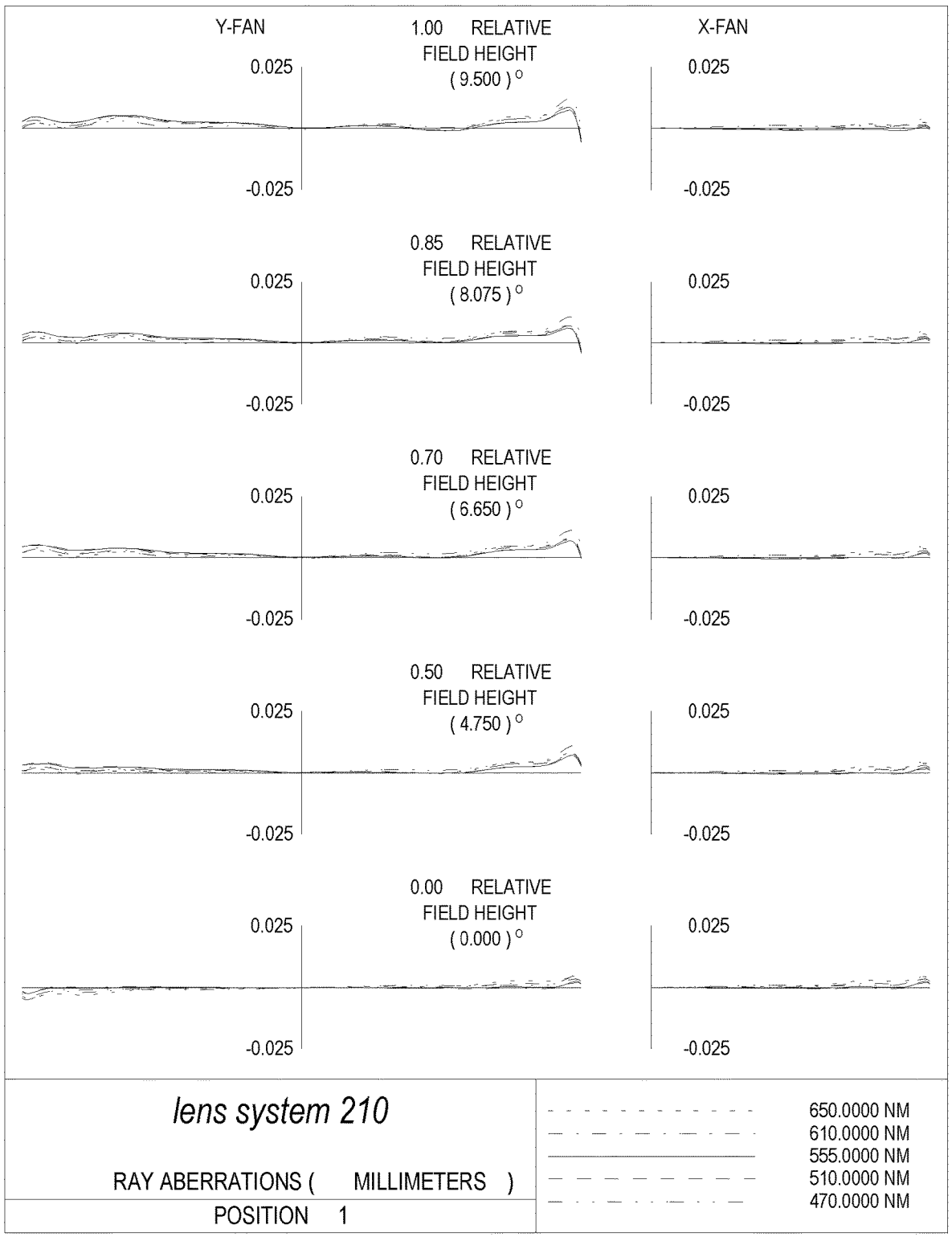
FIGS. 4A and 4B illustrate plots of the polychromatic ray aberration curves over the half field of view and over the visible spectral band ranging 470 nm to 650 nm for a folded telephoto lens system as illustrated in FIGS. 3A and 3B.
Figure 4B:
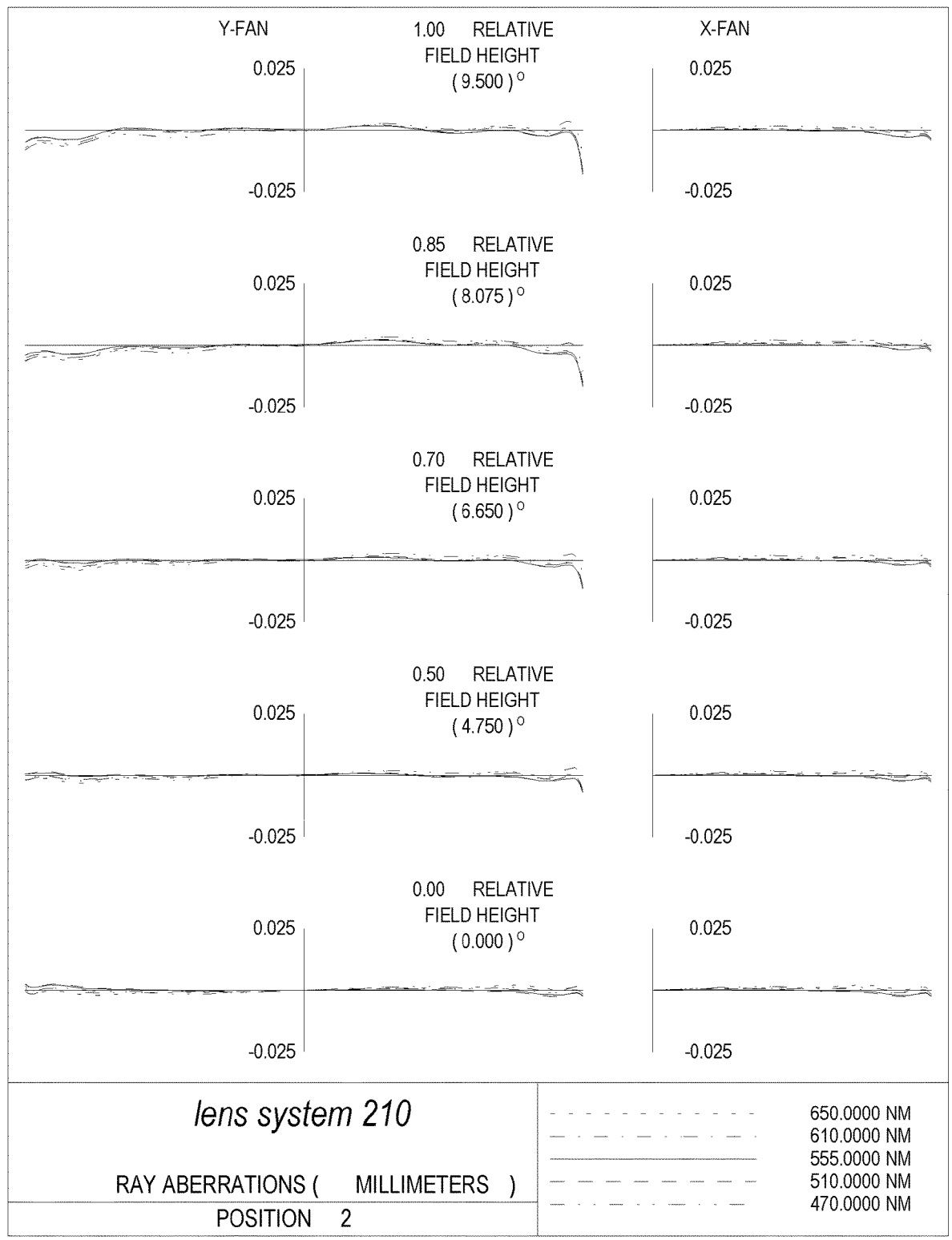

Lens system 210 as specified in Tables 2A-2E is configured to correct optical aberrations as described in reference to lens system 110 and Tables 1A-1D. FIGS. 4A and 4B illustrate plots of the polychromatic ray aberration curves over the half field of view (HFOV=9.5 degrees) for an object point on-axis (at 0 degrees) to an off-axis field point at 9.5 degrees, and over the visible band ranging from 470 nm to 650 nm for a compact folded telephoto lens system 210 as illustrated in FIGS. 3A and 3B and described in Tables 2A-2E. Note that the plots illustrated in FIGS. 4A and 4B show the well-corrected aberrations for both focus positions 1 and 2 (i.e., the optical performance of lens system 210 for an object scene located at infinity, and for an object scene located at <500 mm distance).

The optical prescription in Tables 2A-2E describes an example embodiment of a folded telephoto lens system as illustrated in FIGS. 3A and 3B that includes four lens elements with refractive power and effective focal length f, and with refractive powers of the lens elements distributed such that the ratios of the focal lengths of the lens elements relative to the system focal length f are |f1/f|=0.518, |f2/f|=1.09, |f3/f|=1.214, and |f4/f|=9.552. Lens element L1 is a biconvex lens with vertex radii of curvature R1/R2=−0.145, and L2 has vertex radii of curvature R3/R4=−0.026. Lens element L3 is negative meniscus in shape and has vertex radii of curvature R5/R6=1.530, and lens element L4 with vertex radii of curvature R7/R8=1.040. The aspheric coefficients for the surfaces of the lens elements in lens system 210 in the example embodiment are listed in Table 2C. Configuring lens system 210 according to the arrangement of the power distribution of the lens elements, and adjusting the radii of curvature and aspheric coefficient as shown in Tables 2A-2E, the total track length (TTL), of the lens system 210 may be reduced (e.g., to 13.6 mm as shown in Table 2A) and aberration of the system may effectively be corrected to obtain optical performance of high image quality resolution, for an object scene at infinity and for an object scene located <500 mm distance, in a small form factor camera 200.

Figure 5A:
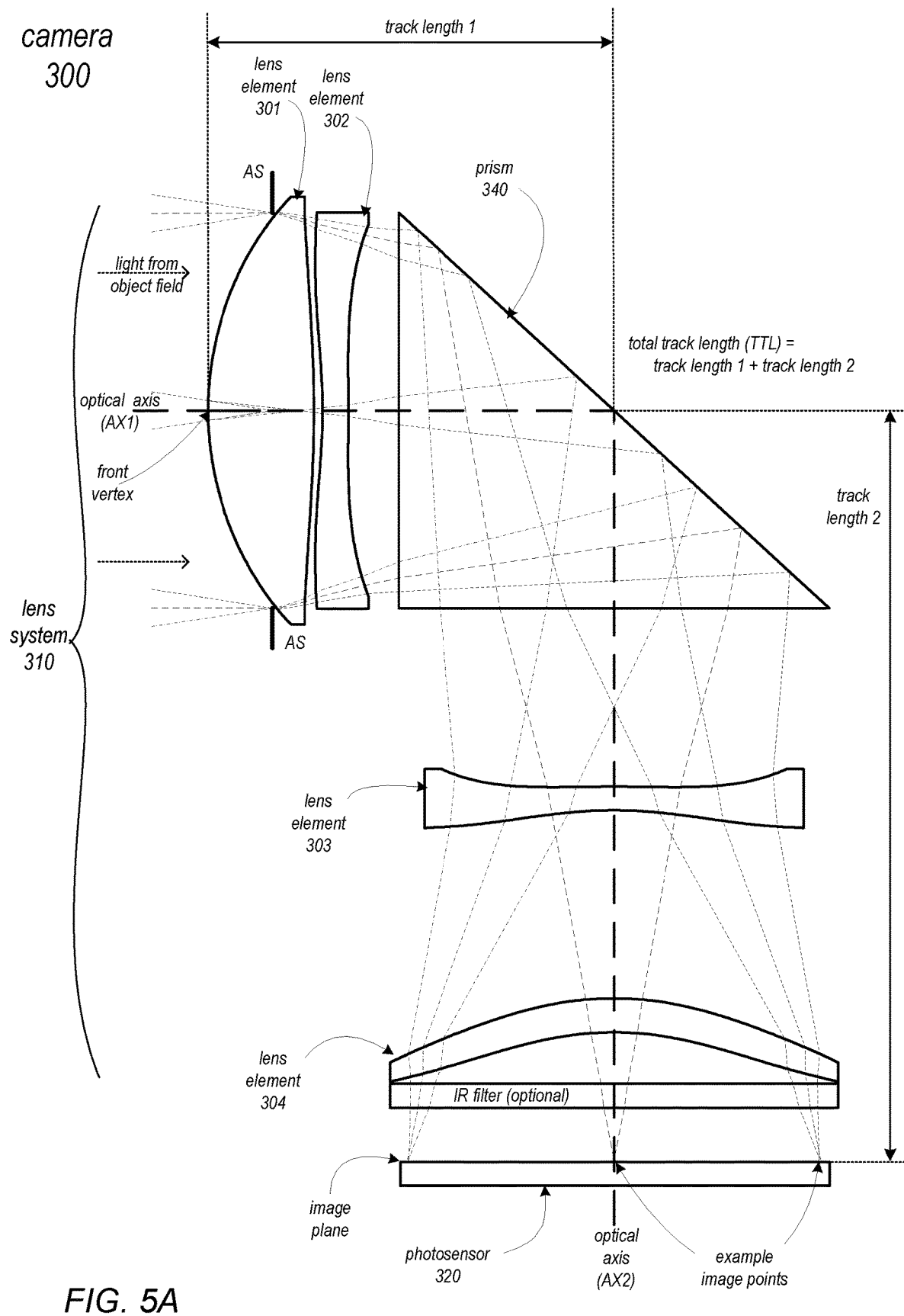
FIGS. 5A and 5B are cross-sectional illustrations of another example embodiment of a compact telephoto camera including a folded telephoto lens system that includes four refractive lens elements and a prism that acts to fold the optical path.
Figure 5B:
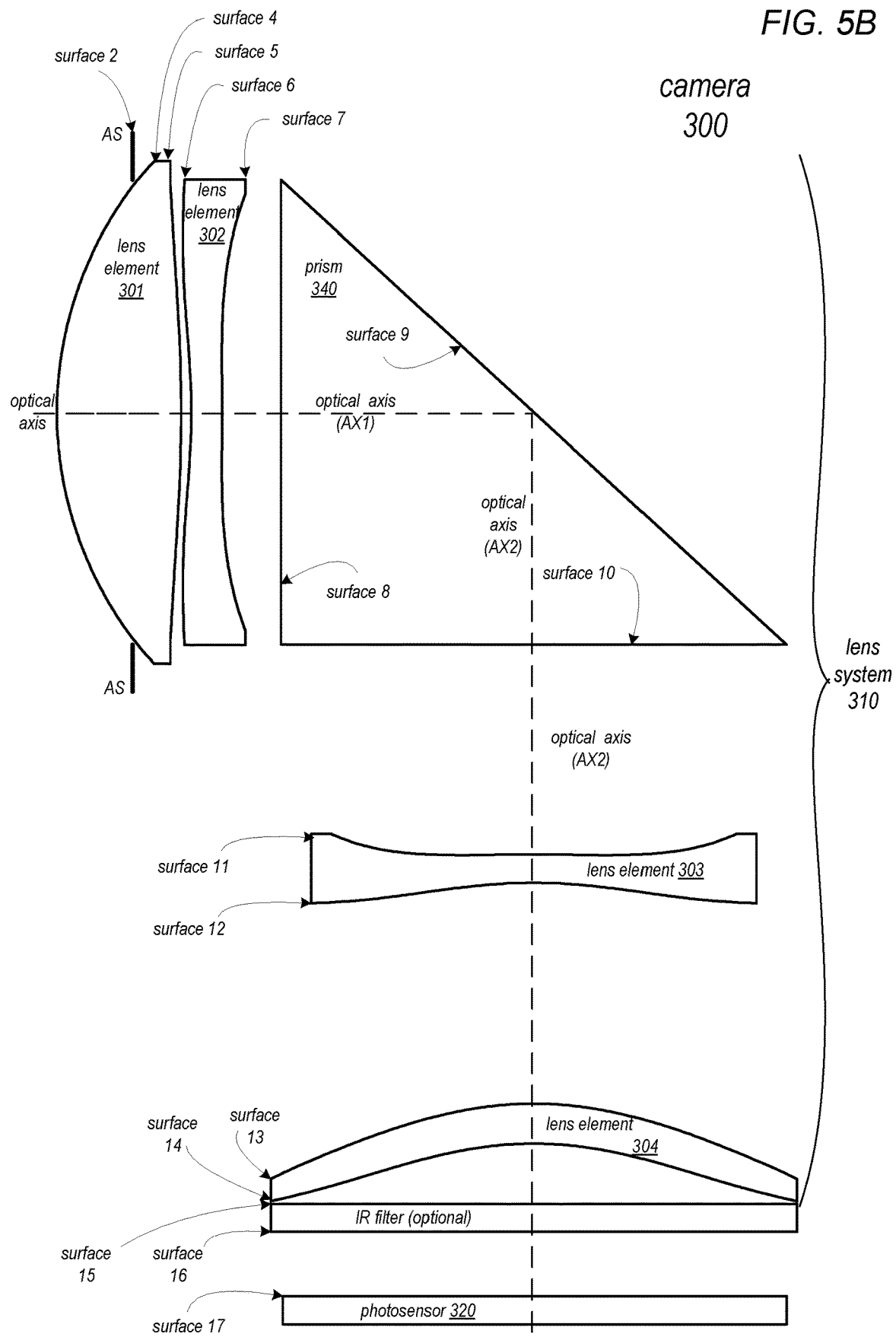

FIGS. 5A and 5B are cross-sectional illustrations of another example embodiment of a compact telephoto camera 300 including a compact folded telephoto lens system 310. Lens system 310 includes four lens elements (301-304) with refractive power. Arranged along an optical axis AX of the camera 300 from an object side (AX1) to an image side (AX2) are a first lens element L1 (301) with positive refractive power having a convex object side surface and focal length f1, an aperture stop AS, a second lens element L2 (302) with negative refractive power and focal length f2, a prism 340 oriented to change the direction of the incoming light path and thus to fold the optical axis from AX1 to AX2, a third lens element L3 (303) with negative refractive power and focal length f3, and a fourth lens element L4 (304) with positive refractive power having a convex object side surface and focal length f4. The lens system 310 forms an image at the surface of a photosensor 320. In some embodiments, an infrared (IR) filter may be located between the fourth lens element L4 and the photosensor 320.

The effective focal length of the lens system 310 is given by f. The total track length (TTL) of the compact folded telephoto lens system 310 is the distance along the optical axes AX1 and AX2 between the object side surface of the first element L1 and the image plane. Referring to FIGS. 5A and 5B, the TTL is the sum of the track lengths TL1 and TL2, where TL1 is the axial distance between the front vertex of the object side surface of L1 and the reflecting surface of the prism 340, and TL2 is the axial distance between the reflecting surface of PR and the image plane. The lens system 310 is configured such that the telephoto ratio (TTL/f) of the lens system 310 satisfies the relation:

$$0.8 < |TTL/f| \leq 1.0.$$

An aperture stop AS, which may be located at the front surface of lens element L1, determines the entrance pupil of the lens system 310. The lens system 310 focal ratio or f-number f# is defined as the lens system 310 effective focal length f divided by the entrance pupil diameter. The IR filter may act to block infrared radiation that could damage or adversely affect the photosensor, and may be configured so as to have no effect on f.

Tables 3A-3E provide example values of various optical and physical parameters of an example embodiment of a camera 300 and lens system 310 as illustrated in FIGS. 5A and 5B. In at least some embodiments, system 310 may include a zooming mechanism for dynamically focusing an object scene from infinity (object distance ≥20 meters) to near object distance, <500 mm. Tables 3A-3E may be referred to as providing an optical prescription for a zoom lens system 310. In this example embodiment, lens system 310 may include a focusing lens group GR1 including lens elements L1 and L2 that may be translated or actuated, together with the aperture stop along AX1, for focusing an object scene located at <500 mm. The zoom parameters for system 310 are listed in Table 3E. The zoom parameters shown in Table 3E for position 1 are the axial thickness or space separation on surface #7 (along AX1) of lens element L2 from the reflecting surface of prism 340 when the object scene distance is at infinity (the optical prescription as listed in Table 3B). The corresponding optical prescription for an object scene at 500 mm (position 2) is the same as the prescription listed in Table 3B, except that the object distance in surface #0 is replaced by 500 mm, and the space separation of L2 on surface #7 is replaced by 0.5841 mm. As shown in Table 3E, the lens group GR1 moves by about 0.215 mm for the lens system 310 to zoom and focus object scene from >20 meters away from the camera to near object scene at <500 mm distance.

The optical prescription in Tables 3A-3E is for a zoom lens system 310 with an effective focal length f of 14 mm at 555 nm wavelength, a focal ratio of f/2.8, with 19 degrees FOV, TTL of 14.0 mm, and with TTL/f equal to 1.0. Lens system 310 is a compact folded imaging system designed for visible spectrum covering 470 nm to 650 nm.

The lens elements L1, L2, L3, and L4 of lens system 310 may be composed of plastic materials with refractive indices and Abbe numbers as listed in Table 3B. In this example embodiment of lens system 310, the choice of lens materials are the same as in the optical prescription for the lens system 110 as listed in Tables 1A-1D. Referring to the lens system 310, the lens element L1 and L3 may be composed of a plastic material having an Abbe number of V1=56.1. The lens elements L2 and L4 may be composed of a plastic material with Abbe number V2=23.3.

Figure 6A:
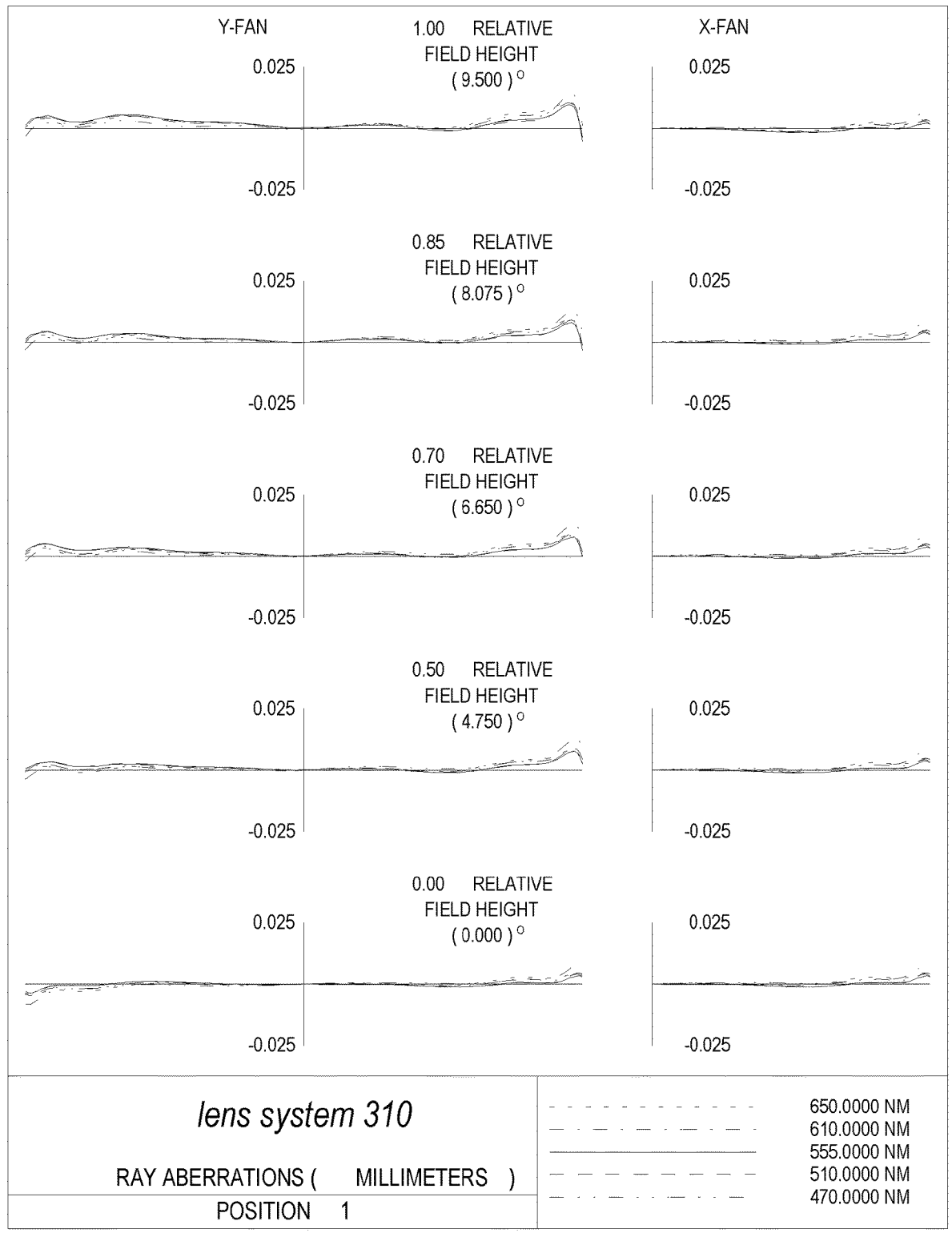
FIGS. 6A and 6B illustrate plots of the polychromatic ray aberration curves over the half field of view and over the visible spectral band ranging 470 nm to 650 nm for a folded telephoto lens system as illustrated in FIGS. 5A and 5B.
Figure 6B:
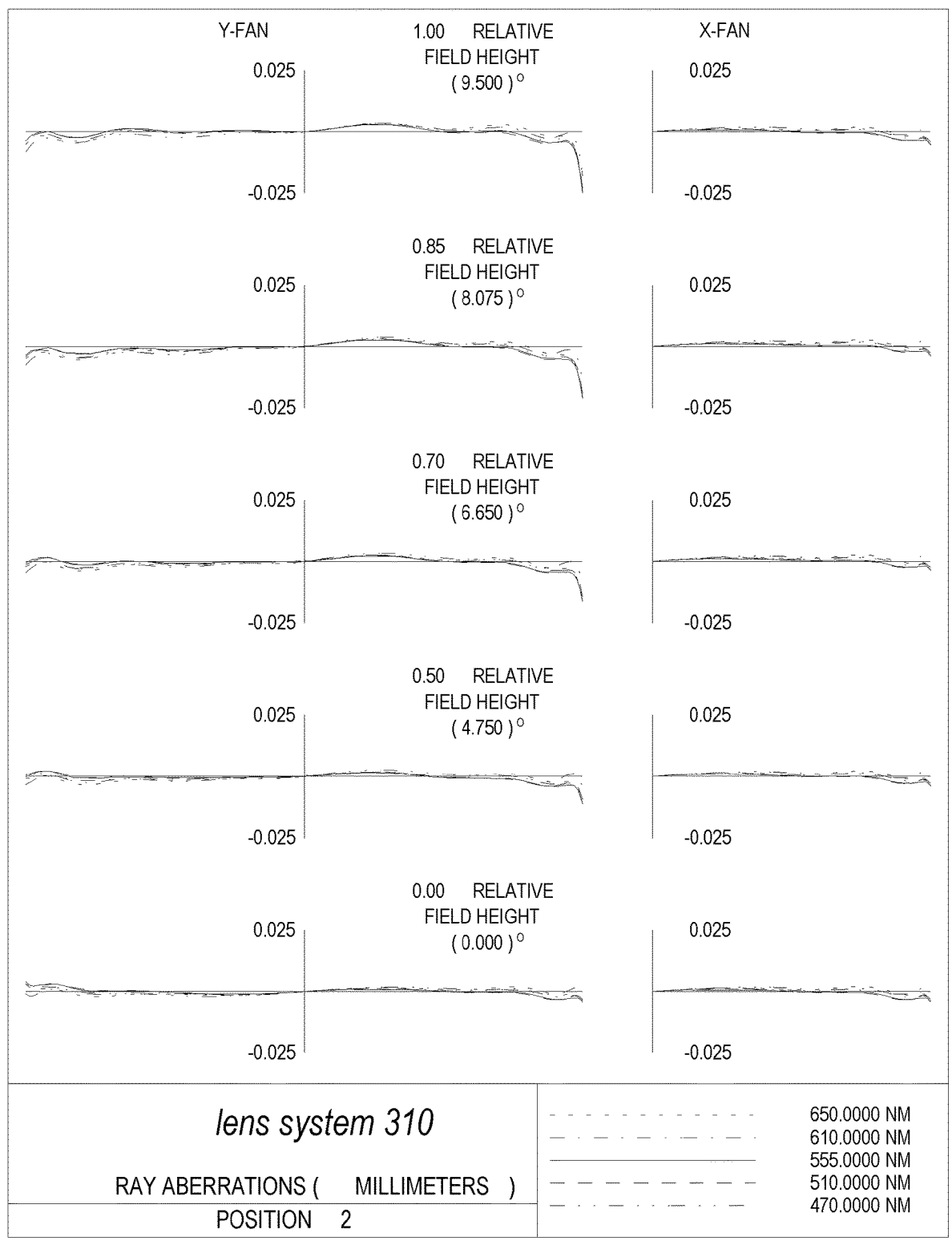

Lens system 310 as specified in Tables 3A-3E is configured to correct optical aberrations as described in reference to lens system 110 and Tables 1A-1D. FIGS. 6A and 6B illustrate plots of the polychromatic ray aberration curves over the half field of view (HFOV=9.5 degrees) for an object point on-axis (at 0 degrees) to an off-axis field point at 9.5 degrees, and over the visible band ranging from 470 nm to 650 nm for a compact folded telephoto lens system 310 as illustrated in FIGS. 5A and 5B and described in Tables 3A-3E. Note that the plots illustrated in FIGS. 6A and 6B show the well-corrected aberrations for both focus positions 1 and 2 (i.e., the optical performance of lens system 310 for an object scene located at infinity, and for an object scene located at <500 mm distance).

The optical prescription in Tables 3A-3E describes an example embodiment of a folded telephoto lens system as illustrated in FIGS. 5A and 5B that includes four lens elements with refractive power and effective focal length f, and with refractive powers of the lens elements distributed such that the ratios of the focal lengths of the lens elements relative to the system focal length f are |f1/f|=0.468, |f2/f|=1.09, |f3/f|=0.768, and |f4/f|=8.754. Lens element L1 is a biconvex lens with vertex radii of curvature R1/R2=−0.236, and L2 has vertex radii of curvature R3/R4=0.189. Lens element L3 has vertex radii of curvature R5/R6=5.241, and lens element L4 with vertex radii of curvature R7/R8=1.009. The aspheric coefficients for the surfaces of the lens elements in lens system 310 in the example embodiment are listed in Table 3C. Configuring lens system 310 according to the arrangement of the power distribution of the lens elements, and adjusting the radii of curvature and aspheric coefficient as shown in Tables 3A-3E, the total track length (TTL), of the lens system 310 may be reduced (e.g., to 14.0 mm as shown in Table 3A) and aberration of the system may effectively be corrected to obtain optical performance of high image quality resolution, for an object scene at infinity and for an object scene located <500 mm distance, in a small form factor camera 300.

Figure 7A:
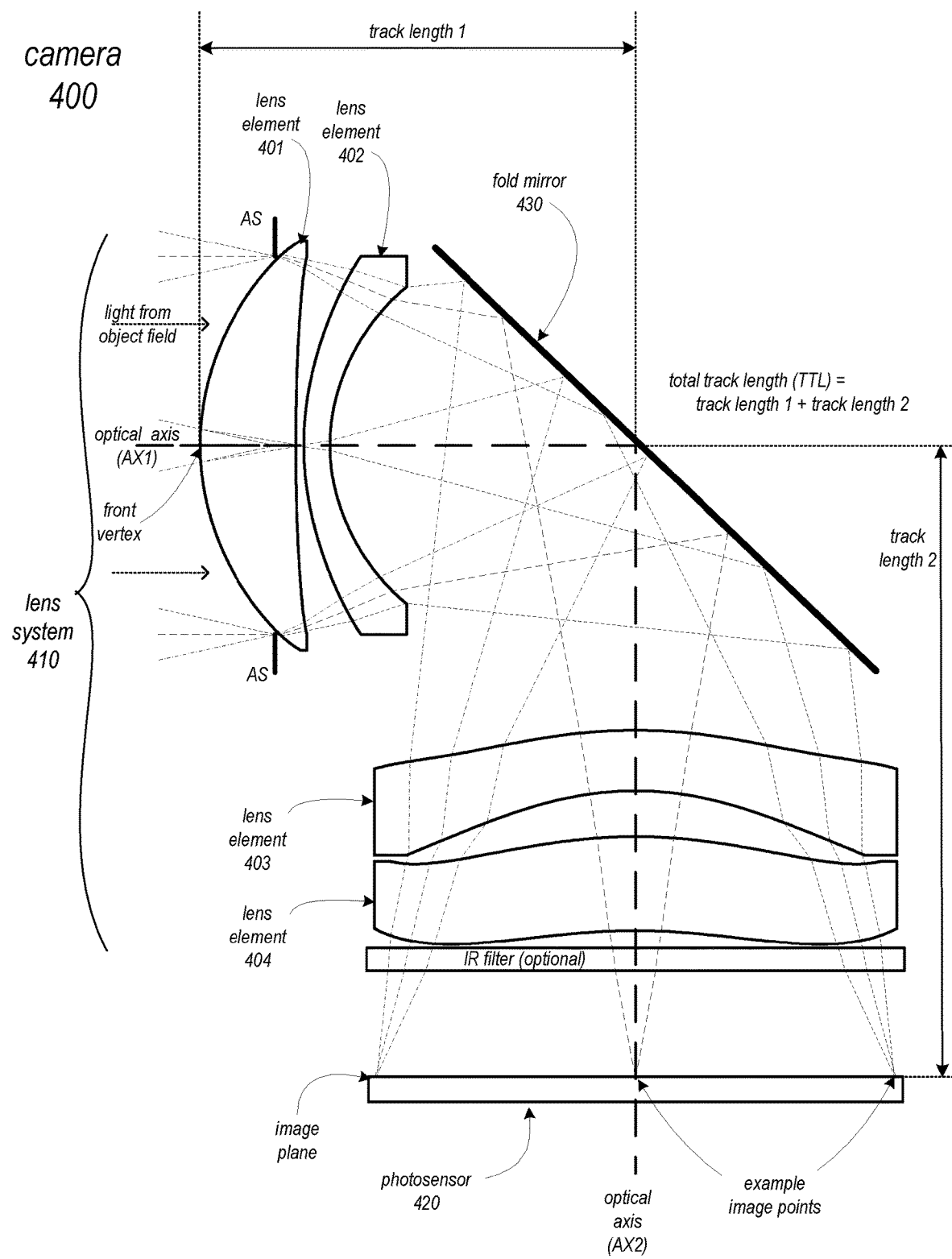
FIGS. 7A and 7B are cross-sectional illustrations of another example embodiment of a compact telephoto camera including a folded telephoto lens system that includes four lens elements with refractive power and a fold mirror that acts to fold the optical path.
Figure 7B:
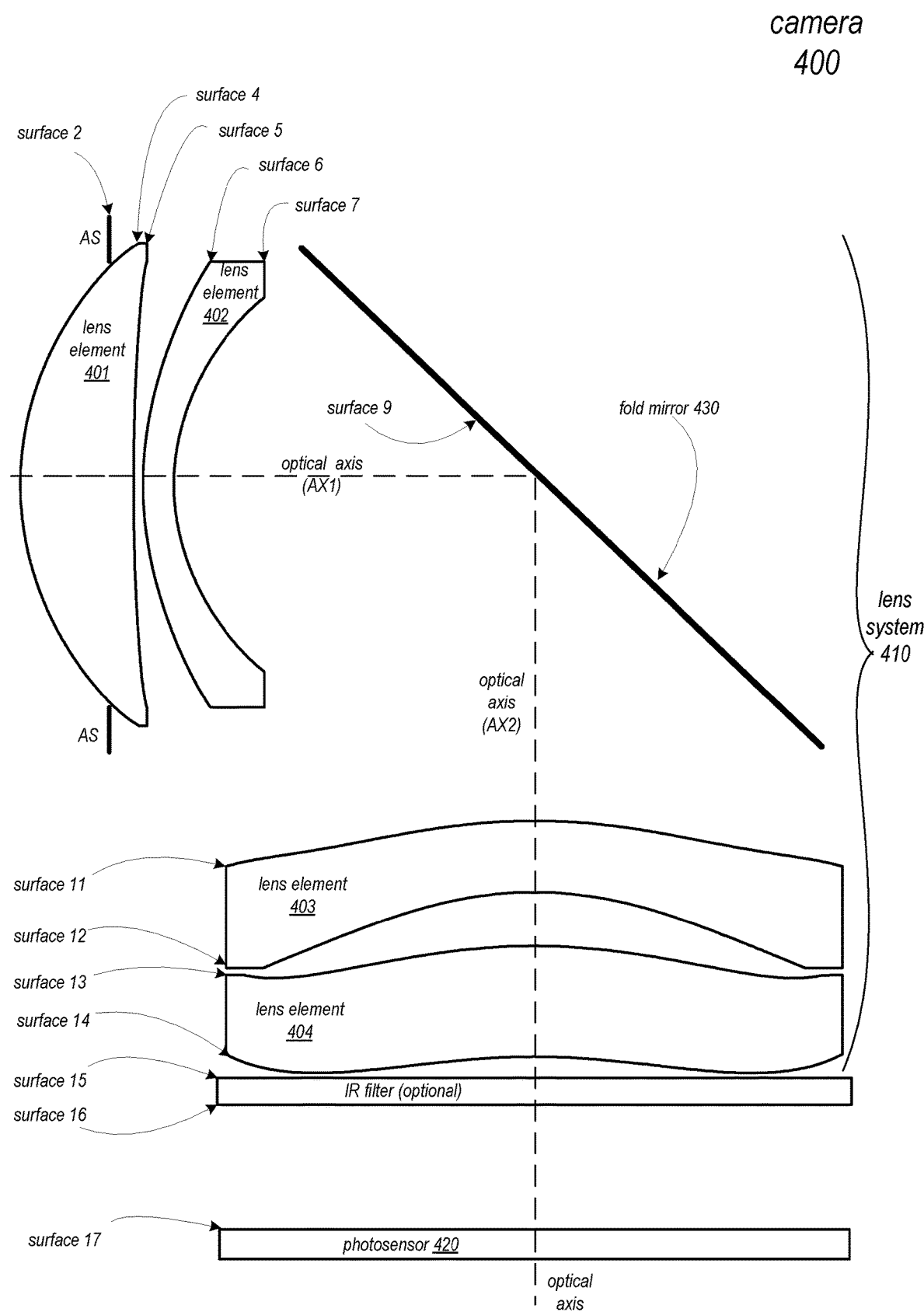

FIGS. 7A and 7B are cross-sectional illustrations of another example embodiment of a compact telephoto camera 400 including a folded telephoto lens system 410. Lens system 410 includes four lens elements (401-404) with refractive power. Lens system 410 may be viewed as a variation of lens system 210 of FIGS. 3A and 3B and the elements of the two systems 410 and 210 may be similar. However, in lens system 410, the first lens element L1 has positive refractive power or positive focal length f1 and has positive meniscus shape with convex object side surface.

Tables 4A-4E provide example values of various optical and physical parameters of an example embodiment of a camera 400 and lens system 410 as illustrated in FIGS. 7A and 7B. In at least some embodiments, system 410 may include a zooming mechanism for dynamically focusing an object scene from infinity (object distance ≥20 meters) to near object distance, <1 meter. Tables 4A-4E may be referred to as providing an optical prescription for a zoom lens system 410. In this example embodiment, lens system 410 may include a focusing lens group GR1 including lens elements L1 and L2 that may be translated or actuated, together with the aperture stop along AX1, for focusing an object scene located at <1 meter. The zoom parameters for system 410 are listed in Table 4E. The zoom parameters shown in Table 4E for position 1 are the axial thickness or space separation on surface #7 (along AX1) between lens element L2 from the fold mirror 430 when the object scene distance is at infinity (the optical prescription as listed in Table 4B). The corresponding optical prescription for an object scene at 1 meter (position 2) is the same as the prescription listed in Table 2B, except that the object distance in surface #0 is replaced by 1000 mm, and the space separation of L2 on surface #7 is replaced by 1.2608 mm. As shown in Table 4E, the lens group GR1 moves by about 0.203 mm for the lens system 410 to zoom and focus object scene from >20 meters away from the camera to near object scene at <1 meter distance.

The optical prescription in Tables 4A-4E is for a zoom lens system 410 with an effective focal length f of 14 mm at 555 nm wavelength, a focal ratio of f/2.8, with 26 degrees FOV, TTL of 13.65 mm, and with TTL/f equal to 0.975. Lens system 410 is a compact folded imaging system designed for visible spectrum covering 470 nm to 650 nm.

The lens elements L1, L2, L3, and L4 of lens system 410 may be composed of plastic materials with refractive indices and Abbe numbers as listed in Table 4B. In this example embodiment of lens system 410, the choice of lens materials are the same as in the optical prescription for the lens system 110 as listed in Tables 1A-1D. Referring to the lens system 410, the lens element L1 and L3 may be composed of a plastic material having an Abbe number of V1=56.1. The lens elements L2 and L4 may be composed of a plastic material with Abbe number V2=23.3.

Figure 8A:
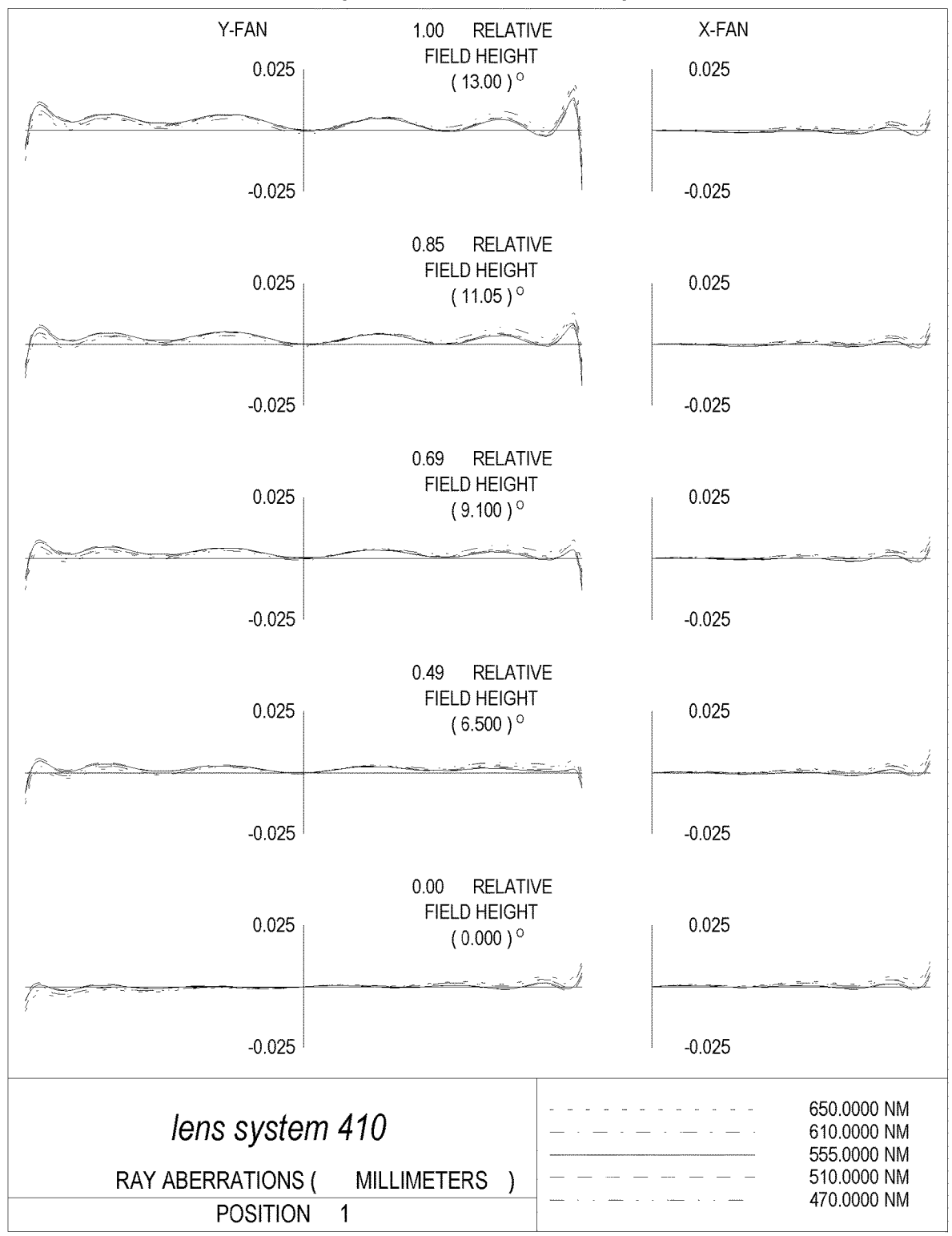
FIGS. 8A and 8B illustrate plots of the polychromatic ray aberration curves over the half field of view and over the visible spectral band ranging 470 nm to 650 nm for a folded telephoto lens system as illustrated in FIGS. 7A and 7B.
Figure 8B:
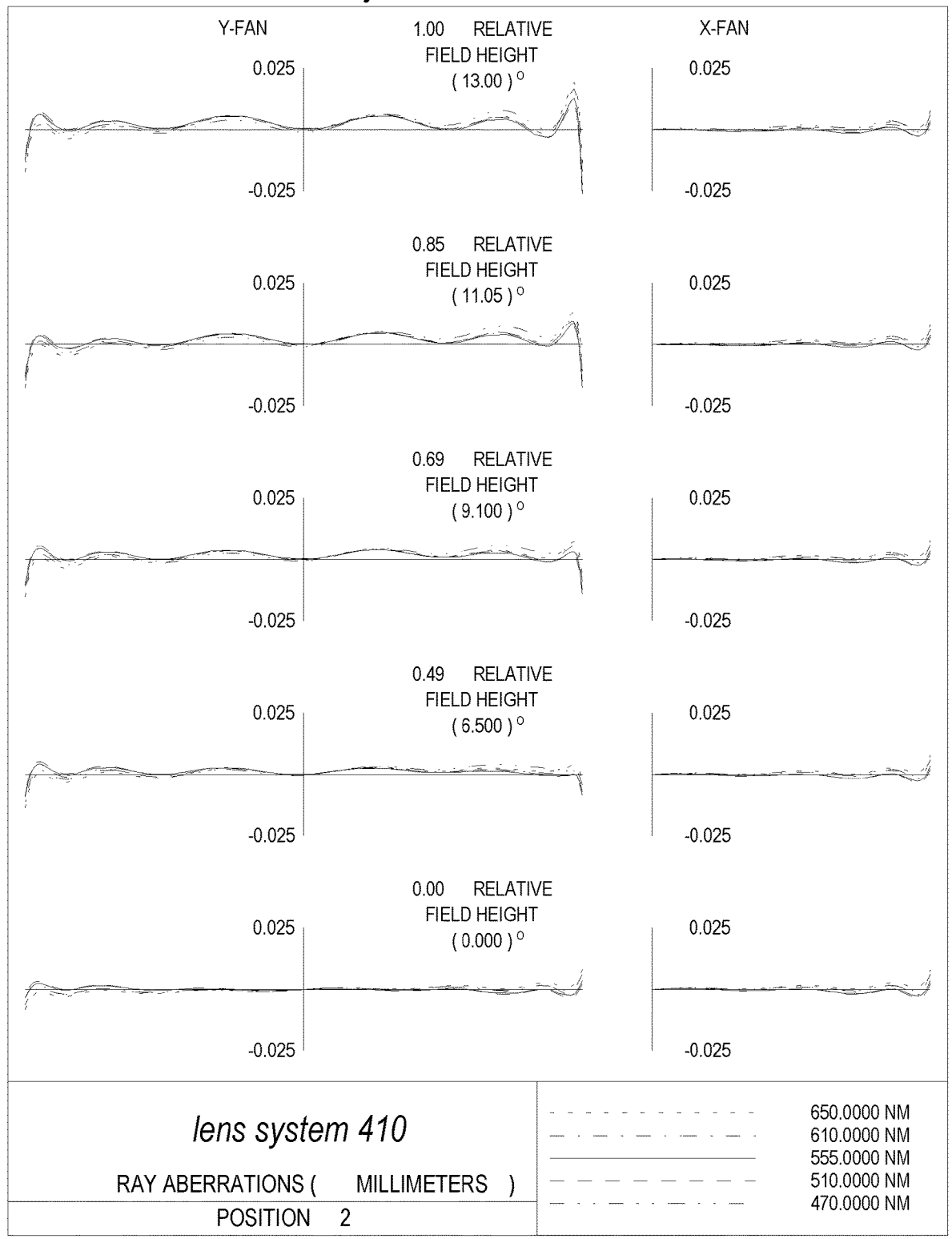

Lens system 410 as specified in Tables 4A-4E is configured to correct optical aberrations as described in reference to lens system 110 and Tables 1A-1D. FIGS. 8A and 8B illustrate plots of the polychromatic ray aberration curves over the half field of view (HFOV=13.0 degrees) for an object point on-axis (at 0 degrees) to an off-axis field point at 13.0 degrees, and over the visible band ranging from 470 nm to 650 nm for a compact folded telephoto lens system 410 as illustrated in FIGS. 7A and 7B and described in Tables 4A-4E. Note that the plots illustrated in FIGS. 8A and 8B show the well-corrected aberrations for both focus positions 1 and 2 (i.e., the optical performance of lens system 410 for an object scene located at infinity, and for an object scene located at <1000 mm distance).

The optical prescription in Tables 4A-4E describes an example embodiment of a folded telephoto lens system as illustrated in FIGS. 7A and 7B that includes four lens elements with refractive power and effective focal length f, and with refractive powers of the lens elements distributed such that the ratios of the focal lengths of the lens elements relative to the system focal length f are |f1/f|=0.510, |f2/f|=0.810, |f3/f|=1.534, and |f4/f|=3.145. Lens element L1 is positive meniscus lens with vertex radii of curvature R1/R2=0.102, and L2 is negative meniscus lens with vertex radii of curvature R3/R4=1.628. Lens element L3 is negative meniscus in shape and has vertex radii of curvature R5/R6=1.596, and lens element L4 with vertex radii of curvature R7/R8=0.848. The aspheric coefficients for the surfaces of the lens elements in lens system 410 in the example embodiment are listed in Table 4C. Configuring lens system 410 according to the arrangement of the power distribution of the lens elements, and adjusting the radii of curvature and aspheric coefficient as shown in Tables 4A-4E, the total track length (TTL), of the lens system 410 may be reduced (e.g., to 13.65 mm as shown in Table 4A) and aberration of the system may effectively be corrected to obtain optical performance of high image quality resolution, for an object scene at infinity and for an object scene located <1 meter distance, in a small form factor camera 400.

Figure 9A:
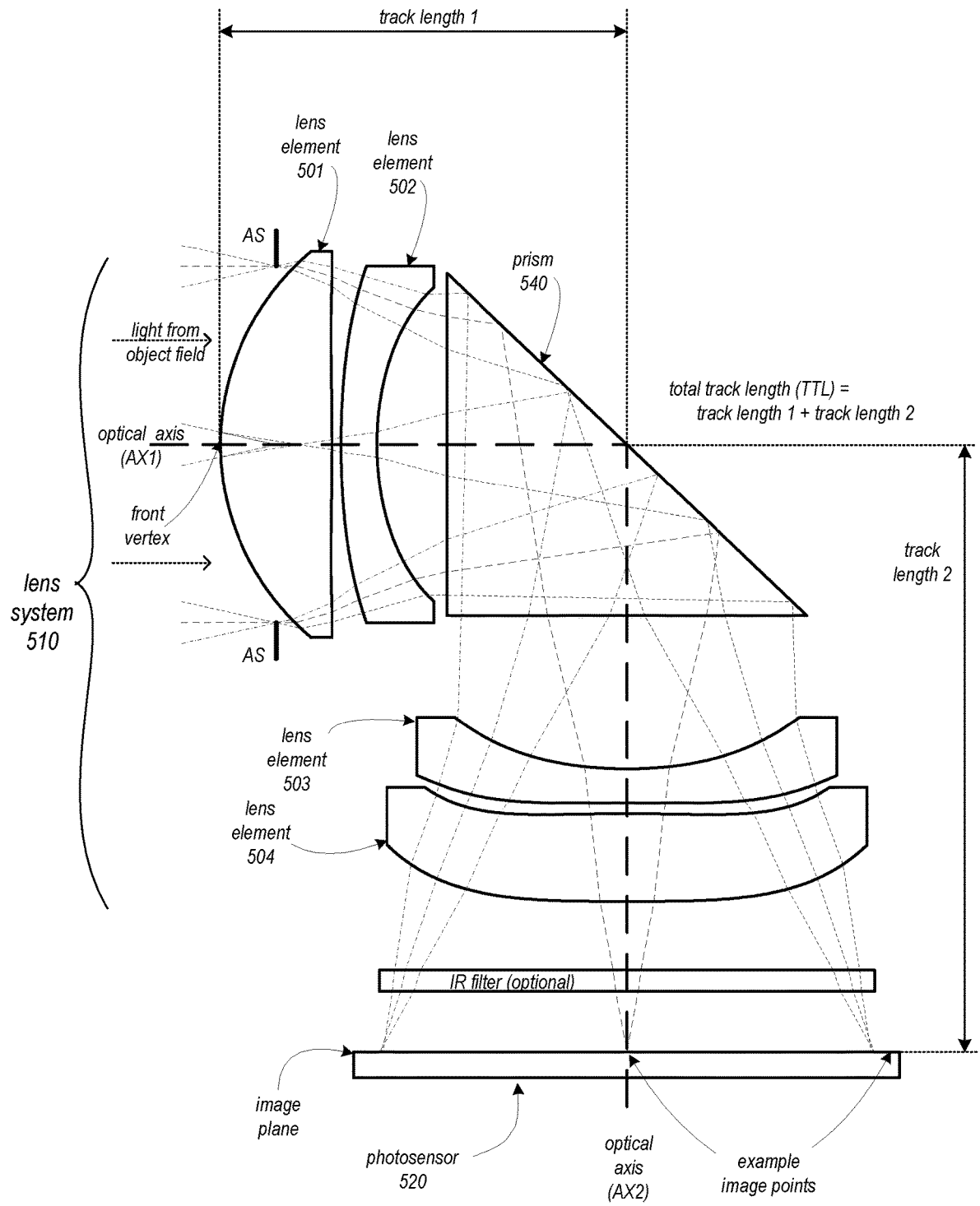
FIGS. 9A and 9B are cross-sectional illustrations of another example embodiment of a compact telephoto camera including a folded telephoto lens system that includes four lens elements with refractive power and a prism that acts to fold the optical path.
Figure 9B:
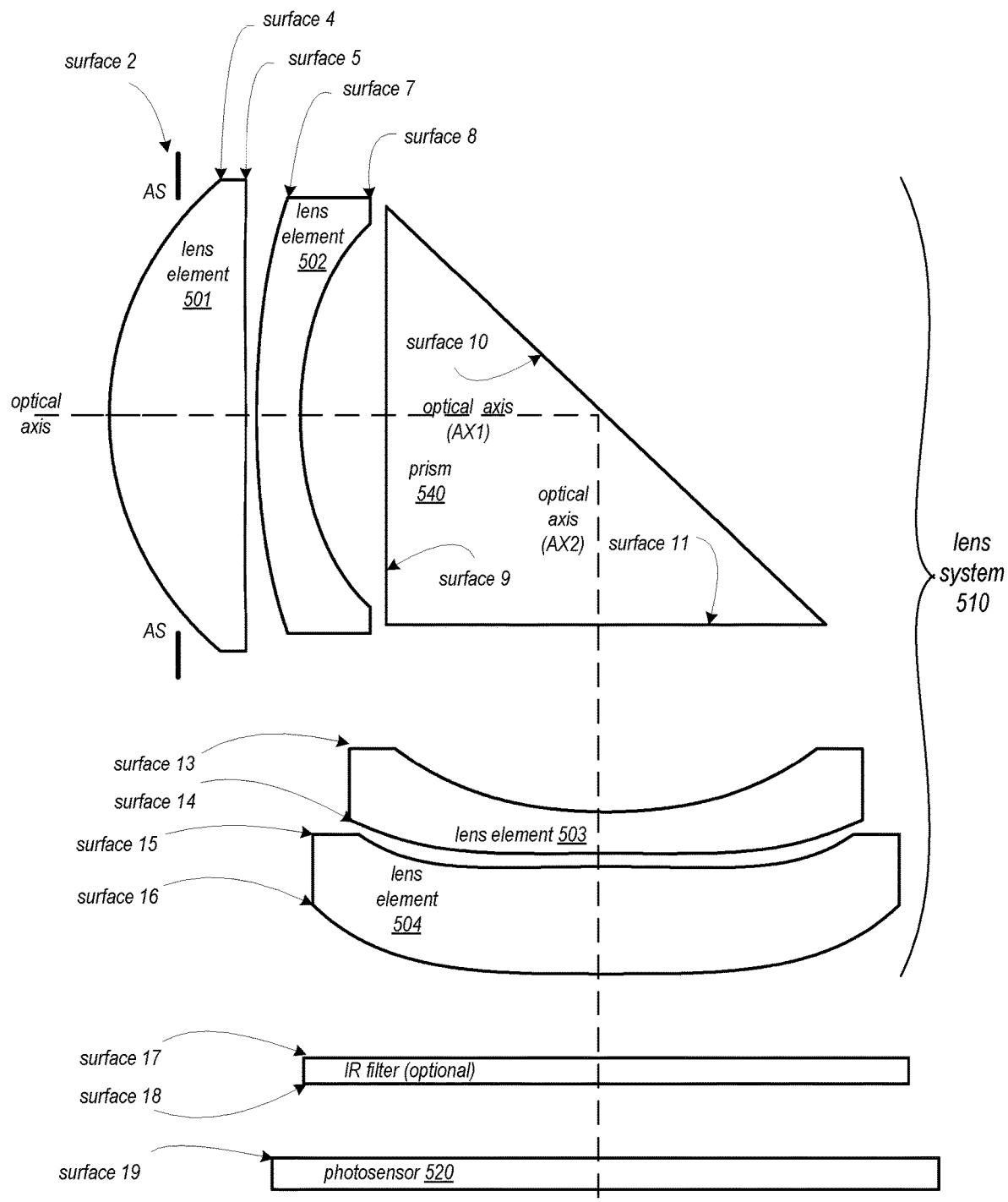

FIGS. 9A and 9B are cross-sectional illustrations of another example embodiment of a compact telephoto camera 500 including a folded telephoto lens system 510. Lens system 510 includes four lens elements (501-504) with refractive power. Lens system 510 may be viewed as a variation of lens system 310 of FIGS. 5A and 5B since the light path folding optical element is a prism 540 and the elements of the two systems 510 and 310 may be similar. However, in lens system 510, the second lens element L2 has negative refractive power or negative focal length f2 and has negative meniscus shape with convex object side surface. Moreover, the first lens group GR1 (including L1 and L2) and the second lens group GR2 (including L3 and L4) may have lens elements in close proximity that may be considered as air-spaced doublets Tables 5A-5E provide example values of various optical and physical parameters of an example embodiment of a camera 500 and lens system 510 as illustrated in FIGS. 9A and 9B. In at least some embodiments, system 510 may include a zooming mechanism for dynamically focusing an object scene from infinity (object distance ≥20 meters) to near object distance, <1 meter. Tables 5A-5E may be referred to as providing an optical prescription for a zoom lens system 510. In this example embodiment, lens system 510 may include a focusing lens group GR1 including lens elements L1 and L2 that may be translated or actuated, together with the aperture stop along AX1, for focusing an object scene located at <1 meter. The zoom parameters for system 510 are listed in Table 5E. The zoom parameters shown in Table 5E for position 1 are the axial thickness or space separation on surface #7 (along AX1) of lens element L2 from the reflecting surface of prism 540 when the object scene distance is at infinity (the optical prescription as listed in Table 5B). The corresponding optical prescription for an object scene at 1 meter (position 2) is the same as the prescription listed in Table 5B, except that the object distance in surface #0 is replaced by 1000 mm, and the space separation of L2 on surface #7 is replaced by 0.9337 mm. As shown in Table 5E, the lens group GR1 moves by about 0.121 mm from its nominal position 1 to position 2 for the lens system 510 to zoom and focus object scene from >20 meters away from the camera to near object scene at <1000 mm distance The optical prescription in Tables 5A-5E is for a zoom lens system 510 with an effective focal length f of 14 mm at 555 nm wavelength, a focal ratio of f/2.8, with 26 degrees FOV, TTL of 13.8 mm, and with TTL/f equal to 0.986. Lens system 510 is a compact folded imaging system designed for visible spectrum covering 470 nm to 650 nm.

The lens elements L1, L2, L3, and L4 of lens system 510 may be composed of plastic materials with refractive indices and Abbe numbers as listed in Table 5B. In this example embodiment of lens system 510, the choice of lens materials are the same as in the optical prescription for the lens system 110 as listed in Tables 1A-1D. Referring to the lens system 510, the lens element L1 and L3 may be composed of a plastic material having an Abbe number of V1=56.1. The lens elements L2 and L4 may be composed of a plastic material with Abbe number V2=23.3.

Figure 10A:
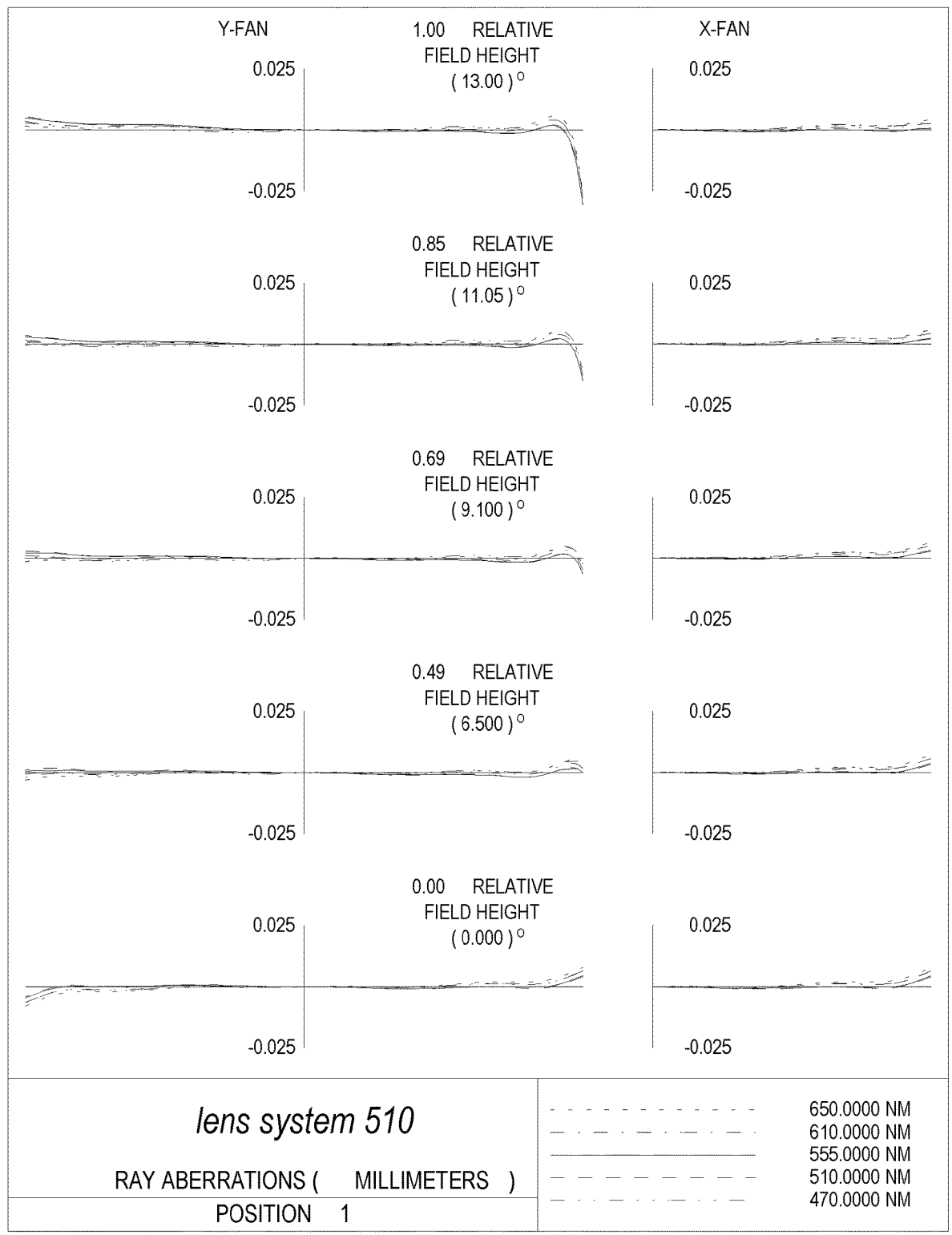
FIGS. 10A and 10B illustrate plots of the polychromatic ray aberration curves over the half field of view and over the visible spectral band ranging 470 nm to 650 nm for a folded telephoto lens system as illustrated in FIGS. 9A and 9B.
Figure 10B:
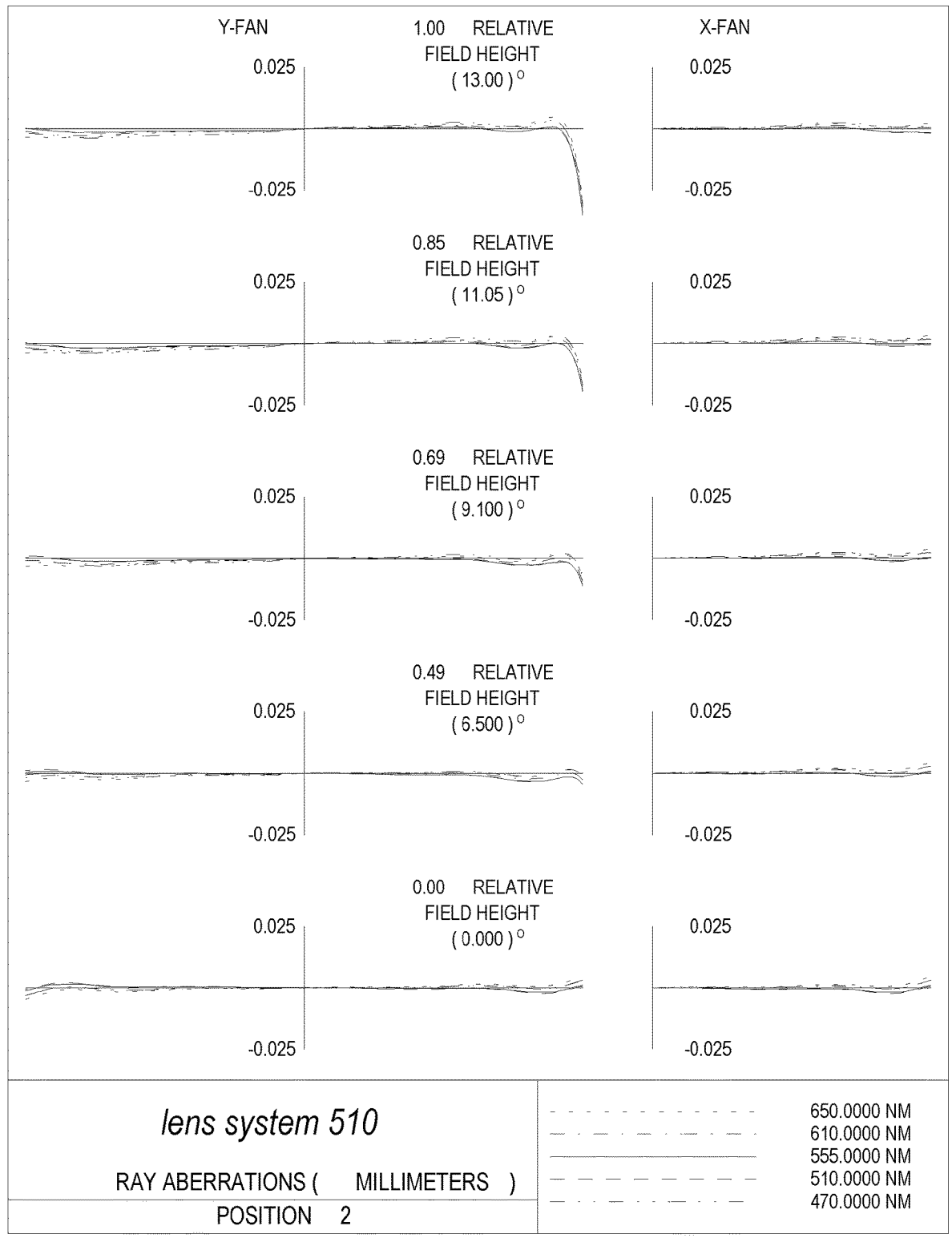

Lens system 510 as specified in Tables 5A-5E is configured to correct optical aberrations as described in reference to lens system 110 and Tables 1A-1D. FIGS. 10A and 10B illustrate plots of the polychromatic ray aberration curves over the half field of view (HFOV=13.0 degrees) for an object point on-axis (at 0 degrees) to an off-axis field point at 13.0 degrees, and over the visible band ranging from 470 nm to 650 nm for a compact folded telephoto lens system 510 as illustrated in FIGS. 9A and 9B and described in Tables 5A-5E. Note that the plots illustrated in FIGS. 10A and 10B show the well-corrected aberrations for both focus positions 1 and 2 (i.e., the optical performance of lens system 510 for an object scene located at infinity, and for an object scene located at <1000 mm distance).

The optical prescription in Tables 5A-5E describes an example embodiment of a folded telephoto lens system as illustrated in FIGS. 9A and 9B that includes four lens elements with refractive power and effective focal length f, and with refractive powers of the lens elements distributed such that the ratios of the focal lengths of the lens elements relative to the system focal length f are |f1/f|=0.450, |f2/f|=0.791, |f3/f|=0.644, and |f4/f|=2.061. Lens element L1 is a biconvex lens with vertex radii of curvature R1/R2=−0.061, and L2 is negative meniscus shape and has vertex radii of curvature R3/R4=2.738. Lens element L3 has vertex radii of curvature R5/R6=−0.051, and lens element L4 is biconvex and with vertex radii of curvature R7/R8=−0.451. The aspheric coefficients for the surfaces of the lens elements in lens system 510 in the example embodiment are listed in Table 5C. Configuring lens system 510 according to the arrangement of the power distribution of the lens elements, and adjusting the radii of curvature and aspheric coefficient as shown in Tables 5A-5E, the total track length (TTL), of the lens system 510 may be reduced (e.g., to 13.80 mm as shown in Table 5A) and aberration of the system may effectively be corrected to obtain optical performance of high image quality resolution, for an object scene at infinity and for an object scene located <1000 mm distance, in a small form factor camera 500.

Figure 11B:
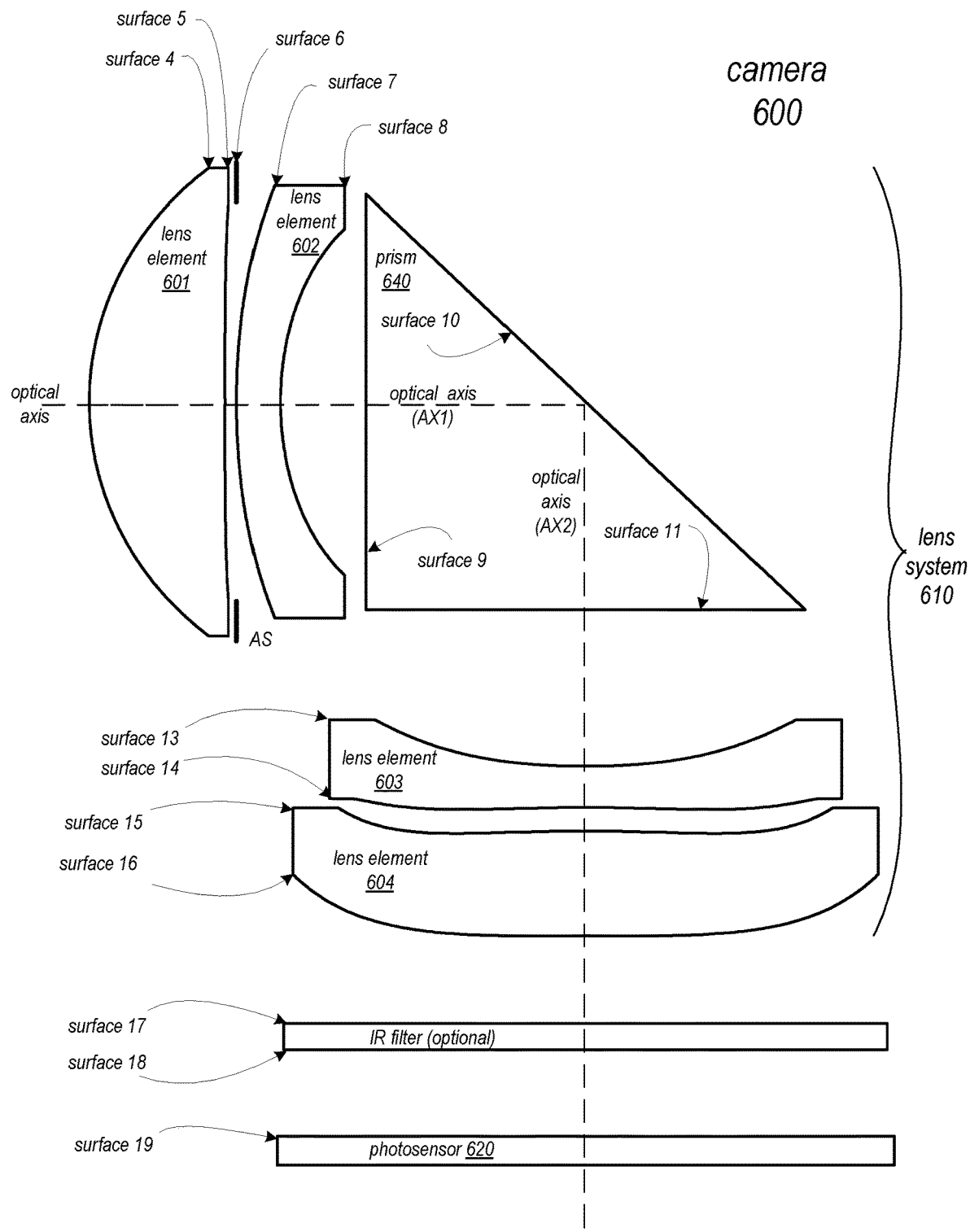

FIGS. 11A and 11B are cross-sectional illustrations of another example embodiment of a compact telephoto camera 600 including a folded telephoto lens system 610. Lens system 610 includes four lens elements (601-604) with refractive power. Lens system 610 may be viewed as a variation of lens system 510 of FIGS. 9A and 9B since the light path folding optical element is a prism 640 and the elements of the two systems 610 and 510 may be similar. However, in lens system 610, the aperture stop AS is located in the air space between the first lens element L1 and second lens element L2. Moreover, in FIGS. 11A and 11B as in FIGS. 9A and 9B, the first lens group GR1 (including L1 and L2) and the second lens group GR2 (including L3 and L4) may have lens elements in close proximity that may be considered as air-spaced doublets.

Tables 6A-6E provide example values of various optical and physical parameters of an example embodiment of a camera 600 and lens system 610 as illustrated in FIGS. 11A and 11B. In at least some embodiments, system 610 may include a zooming mechanism for dynamically focusing an object scene from infinity (object distance ≥20 meters) to near object distance, <1 meter. Tables 6A-6E may be referred to as providing an optical prescription for a zoom lens system 610. In this example embodiment, lens system 610 may include a focusing lens group GR1 including lens elements L1 and L2 that may be translated or actuated, together with the aperture stop along AX1, for focusing an object scene located at <1 meter. The zoom parameters for system 610 are listed in Table 6E. The zoom parameters shown in Table 6E for position 1 are the axial thickness or space separation on surface #5 (along AX1) of lens element L2 from the reflecting surface of prism 640 when the object scene distance is at infinity (the optical prescription as listed in Table 6B). The corresponding optical prescription for an object scene at 1 meter (position 2) is the same as the prescription listed in Table 6B, except that the object distance in surface #0 is replaced by 1000 mm, and the space separation of L2 on surface #5 is replaced by 0.9353 mm. As shown in Table 6E, the lens group GR1 moves by about 0.125 mm from its nominal position 1 to position 2 for the lens system 610 to zoom and focus object scene from >20 meters away from the camera to near object scene at <1000 mm distance.

The optical prescription in Tables 6A-6E is for a zoom lens system 610 with an effective focal length f of 14 mm at 555 nm wavelength, a focal ratio of f/2.8, with 26 degrees FOV, TTL of 13.8 mm, and with TTL/f equal to 0.986. Lens system 610 is a compact folded imaging system designed for visible spectrum covering 470 nm to 650 nm.

The lens elements L1, L2, L3, and L4 of lens system 610 may be composed of plastic materials with refractive indices and Abbe numbers as listed in Table 6B. In this example embodiment of lens system 610, the choice of lens materials are the same as in the optical prescription for the lens system 110 as listed in Tables 1A-1D. Referring to the lens system 610, the lens element L1 and L3 may be composed of a plastic material having an Abbe number of V1=56.1. The lens elements L2 and L4 may be composed of a plastic material with Abbe number V2=23.3.

Figure 12A:
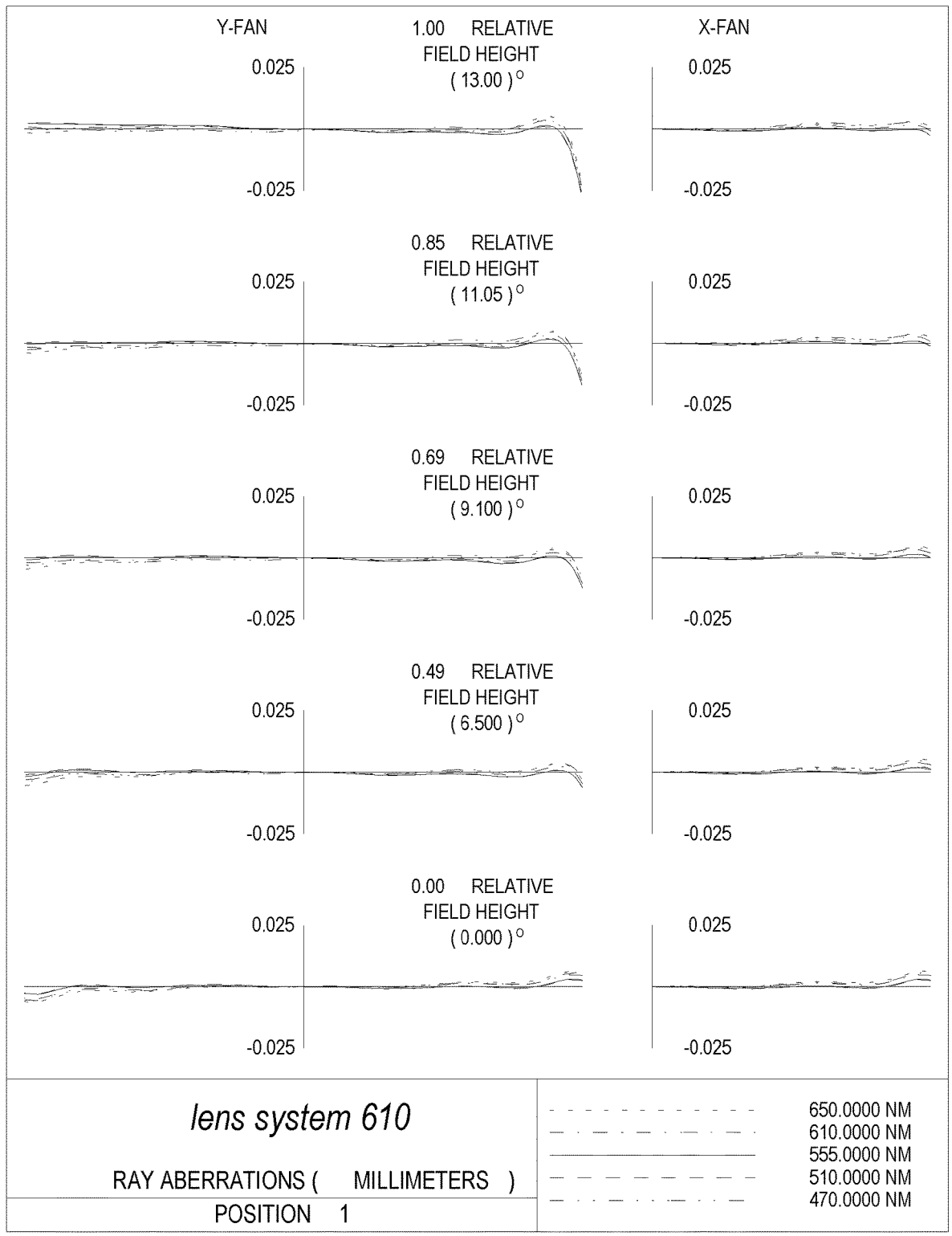
FIGS. 12A and 12B illustrate plots of the polychromatic ray aberration curves over the half field of view and over the visible spectral band ranging 470 nm to 650 nm for a folded telephoto lens system as illustrated in FIGS. 11A and 11B.
Figure 12B:
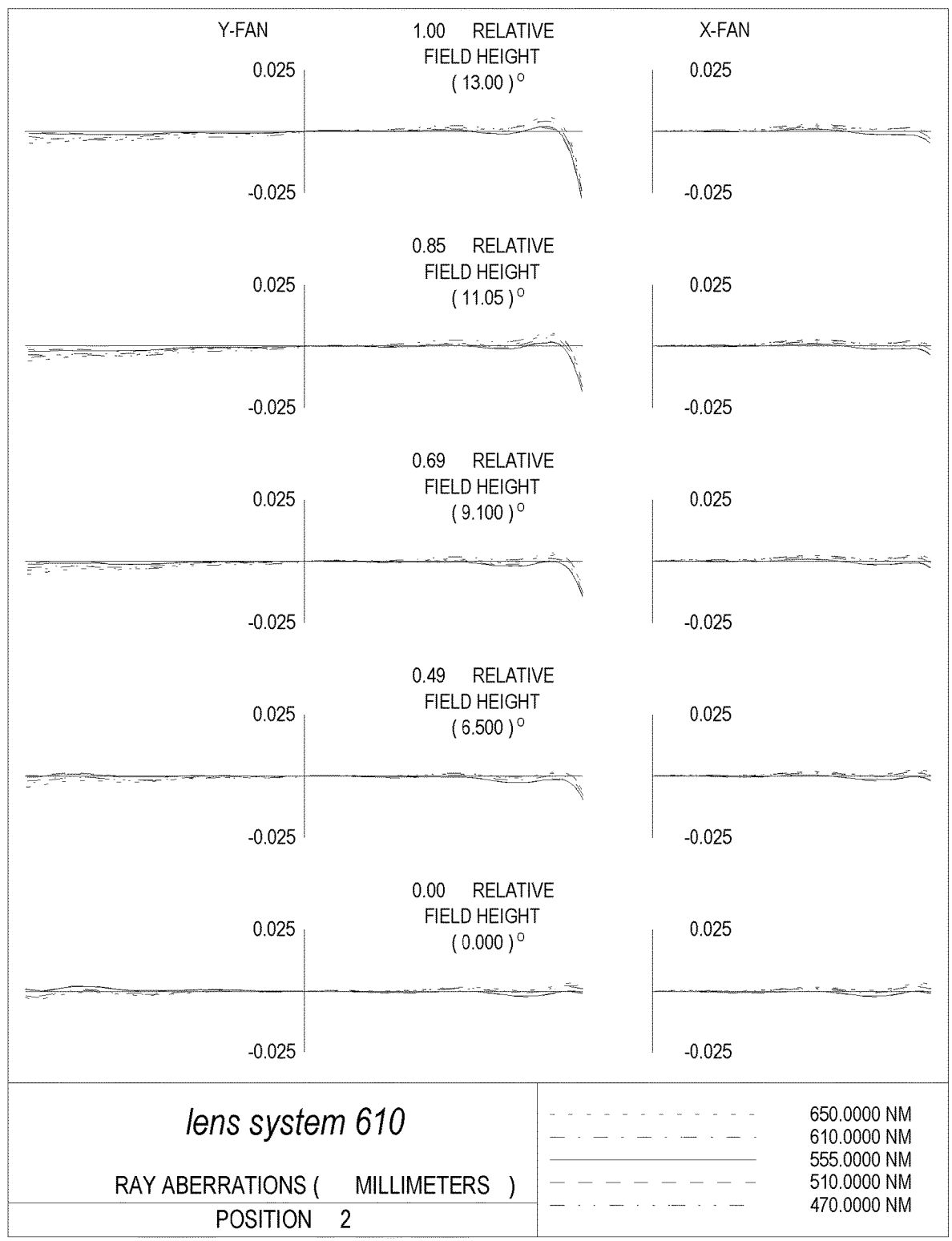

Lens system 610 as specified in Tables 6A-6E is configured to correct optical aberrations as described in reference to lens system 110 and Tables 1A-1D. FIGS. 12A and 12B illustrate plots of the polychromatic ray aberration curves over the half field of view (HFOV=13.0 degrees) for an object point on-axis (at 0 degrees) to an off-axis field point at 13.0 degrees, and over the visible band ranging from 470 nm to 650 nm for a compact folded telephoto lens system 610 as illustrated in FIGS. 11A and 11B and described in Tables 6A-6E. Note that the plots illustrated in FIGS. 12A and 12B show the well-corrected aberrations for both focus positions 1 and 2 (i.e., the optical performance of lens system 610 for an object scene located at infinity, and for an object scene located at <1000 mm distance).

The optical prescription in Tables 6A-6E describes an example embodiment of a folded telephoto lens system as illustrated in FIGS. 11A and 11B that includes four lens elements with refractive power and effective focal length f, and with refractive powers of the lens elements distributed such that the ratios of the focal lengths of the lens elements relative to the system focal length f are |f1/f|=0.446, |f2/f|=0.743, |f3/f|=0.714, and |f4/f|=2.097. Lens element L1 is a biconvex lens with vertex radii of curvature R1/R2=−0.008, and L2 is negative meniscus shape and has vertex radii of curvature R3/R4=2.408. Lens element L3 has vertex radii of curvature R5/R6=−0.386, and lens element L4 is biconvex with vertex radii of curvature R7/R8=−0.044. The aspheric coefficients for the surfaces of the lens elements in lens system 610 in the example embodiment are listed in Table 6C. Configuring lens system 610 according to the arrangement of the power distribution of the lens elements, and adjusting the radii of curvature and aspheric coefficient as shown in Tables 6A-6E, the total track length (TTL), of the lens system 610 may be reduced (e.g., to 13.80 mm as shown in Table 6A) and aberration of the system may effectively be corrected to obtain optical performance of high image quality resolution, for an object scene at infinity and for an object scene located <1000 mm distance, in a small form factor camera 600.

Figure 13B:
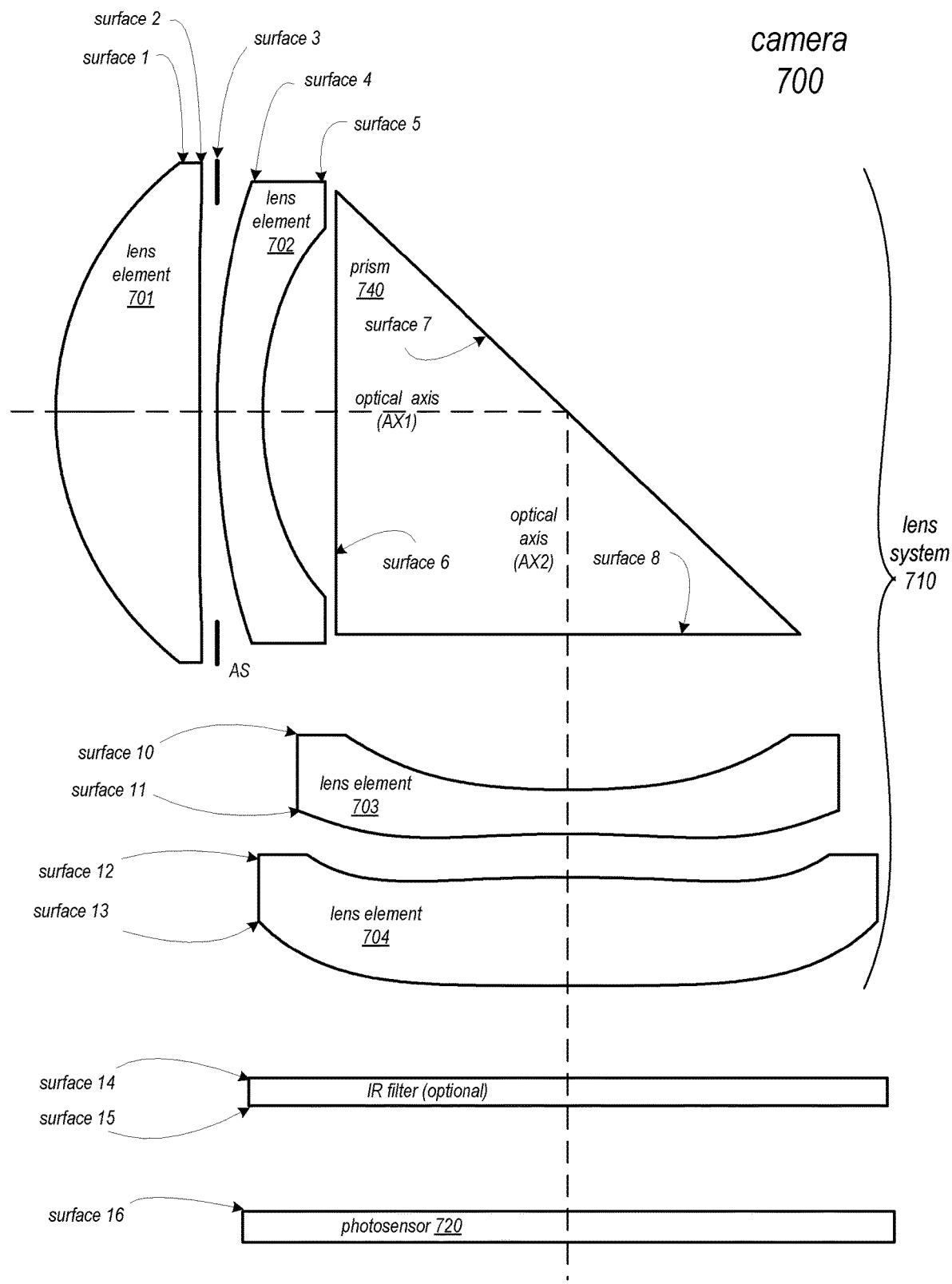

FIGS. 13A and 13B are cross-sectional illustrations of another example embodiment of a compact telephoto camera 700 including a folded telephoto lens system 710. Lens system 710 includes four lens elements (701-704) with refractive power. Lens system 710 may be viewed as a variation of lens system 610 of FIGS. 11A and 11B since the light path folding optical element is a prism 740 and the elements of the two systems 710 and 610 may be similar In lens system 710, as in system 610, the aperture stop AS is located in the air space between the first lens element L1 and second lens element L2. Moreover, in FIGS. 13A and 13B as in FIGS. 11A and 11B, the first lens group GR1 (including L1 and L2) and the second lens group GR2 (including L3 and L4) may have lens elements in close proximity that may be considered as air-spaced doublets. However, lens system 710, as illustrated in FIGS. 13A and 13B, may include a zooming mechanism for the photosensor 720 at the image plane to dynamically focus an object scene from infinity (≥20 meters) to near distance, e.g. less than a meter.

Tables 7A-7E provide example values of various optical and physical parameters of an example embodiment of a camera 700 and lens system 710 as illustrated in FIGS. 13A and 13B. In at least some embodiments, system 710 may include a zooming mechanism for dynamically focusing an object scene from infinity (object distance ≥20 meters) to near object distance, <1 meter, by translating or actuating the photosensor 720 at the image plane along the folded optical axis AX2. Tables 7A-7E may be referred to as providing an optical prescription for a zoom lens system 710. The zoom parameters for system 710 are listed in Table 7E. The zoom parameters shown in Table 7E for position 1 are the axial thickness or space separation on surface #14 (along AX2) of the photosensor at the image plane from the IR filter when the object scene distance is at infinity (the optical prescription as listed in Table 7B). The corresponding optical prescription for an object scene at 1 meter (position 2) is the same as the prescription listed in Table 7B, except that the object distance in surface #0 is replaced by 1000 mm, and the space separation of photosensor at the image plane from the IR filter on surface #14 is replaced by −1.1865 mm. As shown in Table 7E, the photosensor at the image plane moves by about 0.194 mm from its nominal position 1 to position 2 for the lens system 710 to zoom and focus object scene from >20 meters away from the camera to near object scene at <1000 mm distance.

The optical prescription in Tables 7A-7E is for a zoom lens system 710 with an effective focal length f of 14 mm at 555 nm wavelength, a focal ratio of f/2.8, with 26 degrees FOV, TTL of 13.8 mm, and with TTL/f equal to 0.986. Lens system 710 is a compact folded imaging system designed for visible spectrum covering 470 nm to 650 nm.

The lens elements L1, L2, L3, and L4 of lens system 710 may be composed of plastic materials with refractive indices and Abbe numbers as listed in Table 7B. In this example embodiment of lens system 710, the choice of lens materials are the same as in the optical prescription for the lens system 110 as listed in Tables 1A-1D. Referring to the lens system 710, the lens element L1 and L3 may be composed of a plastic material having an Abbe number of V1=56.1. The lens elements L2 and L4 may be composed of a plastic material with Abbe number V2=23.3.

Figure 14A:
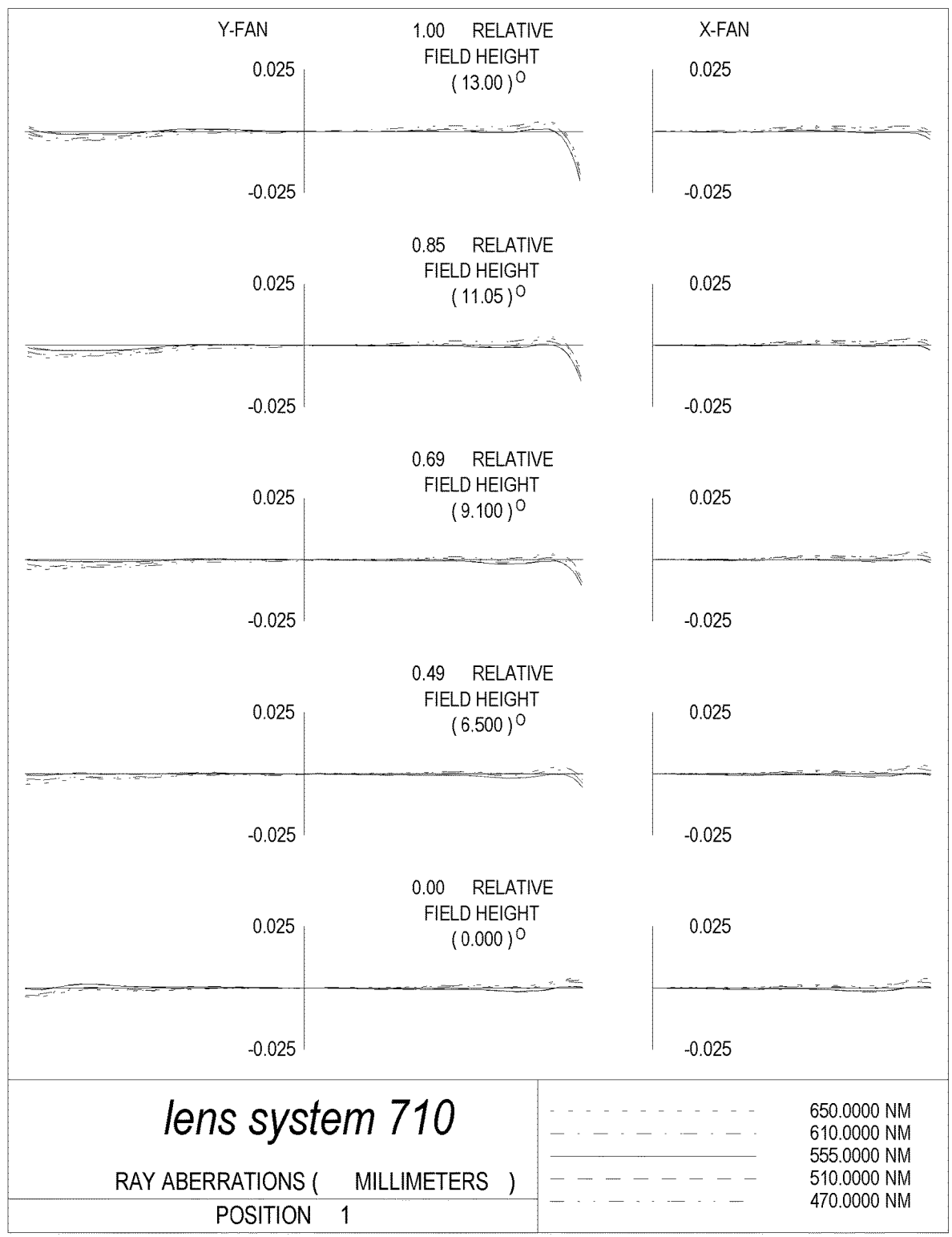
FIGS. 14A and 14B illustrate plots of the polychromatic ray aberration curves over the half field of view and over the visible spectral band ranging 470 nm to 650 nm for a folded telephoto lens system as illustrated in FIGS. 13A and 13B.
Figure 14B:
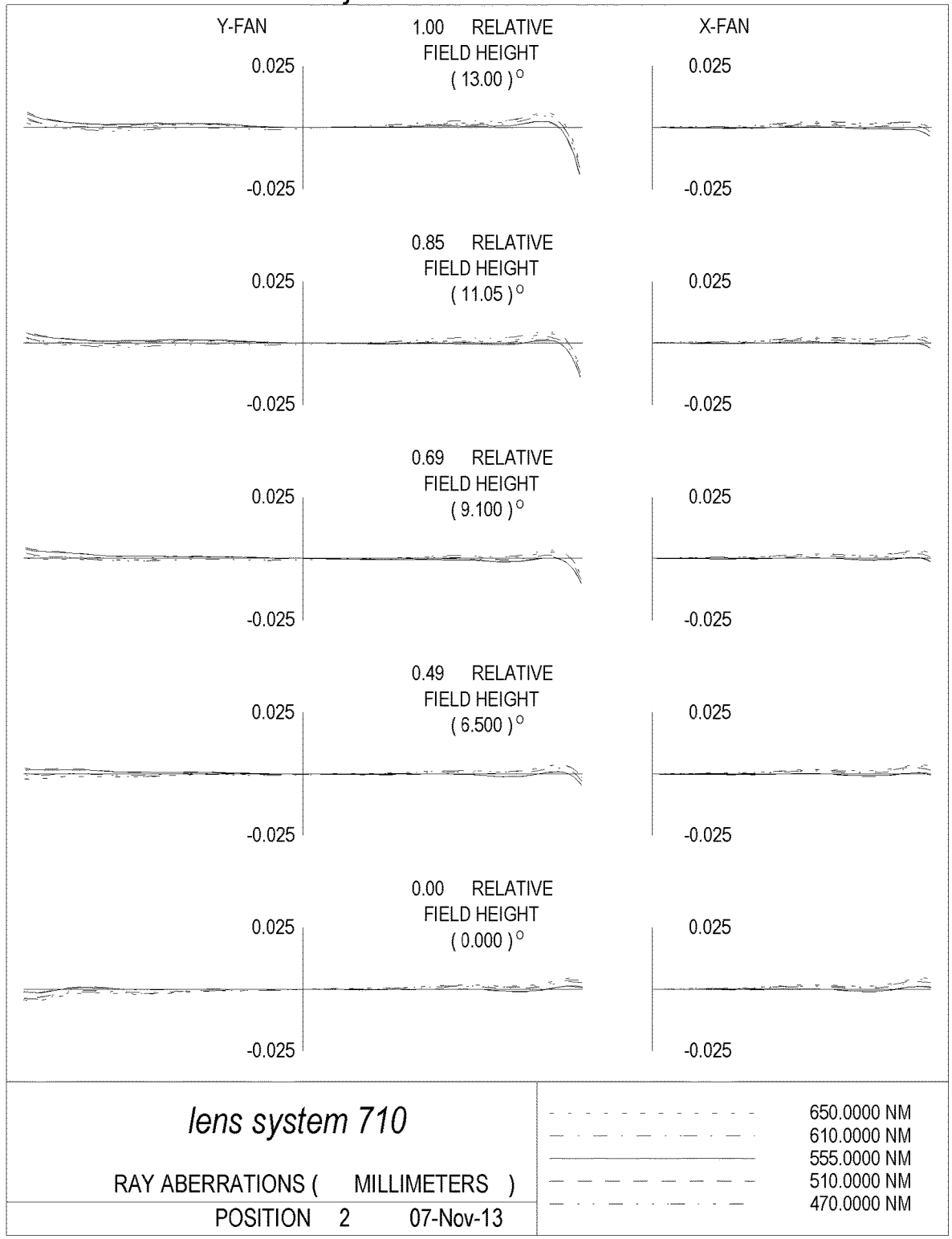

Lens system 710 as specified in Tables 7A-7E is configured to correct optical aberrations as described in reference to lens system 110 and Tables 1A-1D. FIGS. 14A and 14B illustrate plots of the polychromatic ray aberration curves over the half field of view (HFOV=13.0 degrees) for an object point on-axis (at 0 degrees) to an off-axis field point at 13.0 degrees, and over the visible band ranging from 470 nm to 650 nm for a compact folded telephoto lens system 710 as illustrated in FIGS. 13A and 13B and described in Tables 7A-7E. Note that the plots illustrated in FIGS. 14A and 14B show the well-corrected aberrations for both focus positions 1 and 2 (i.e., the optical performance of lens system 710 for an object scene located at infinity, and for an object scene located at <1000 mm distance).

The optical prescription in Tables 7A-7E describes an example embodiment of a folded telephoto lens system as illustrated in FIGS. 13A and 13B that includes four lens elements with refractive power and effective focal length f, and with refractive powers of the lens elements distributed such that the ratios of the focal lengths of the lens elements relative to the system focal length f are |f1/f|=0.446, |f2/f|=0.745, |f3/f|=0.698, and |f4/f|=1.93. Lens element L1 is a biconvex lens with vertex radii of curvature R1/R2=−0.033, and L2 is negative meniscus shape and has vertex radii of curvature R3/R4=2.604. Lens element L3 has vertex radii of curvature R5/R6=−0.755, and lens element L4 has vertex radii of curvature R7/R8=0.058. The aspheric coefficients for the surfaces of the lens elements in lens system 710 in the example embodiment are listed in Table 7C. Configuring lens system 710 according to the arrangement of the power distribution of the lens elements, and adjusting the radii of curvature and aspheric coefficient as shown in Tables 7A-7E, the total track length (TTL), of the lens system 710 may be reduced (e.g., to 13.80 mm as shown in Table 7A) and aberration of the system may effectively be corrected to obtain optical performance of high image quality resolution, for an object scene at infinity and for an object scene located <1000 mm distance, in a small form factor camera 700.

Figure 15A:
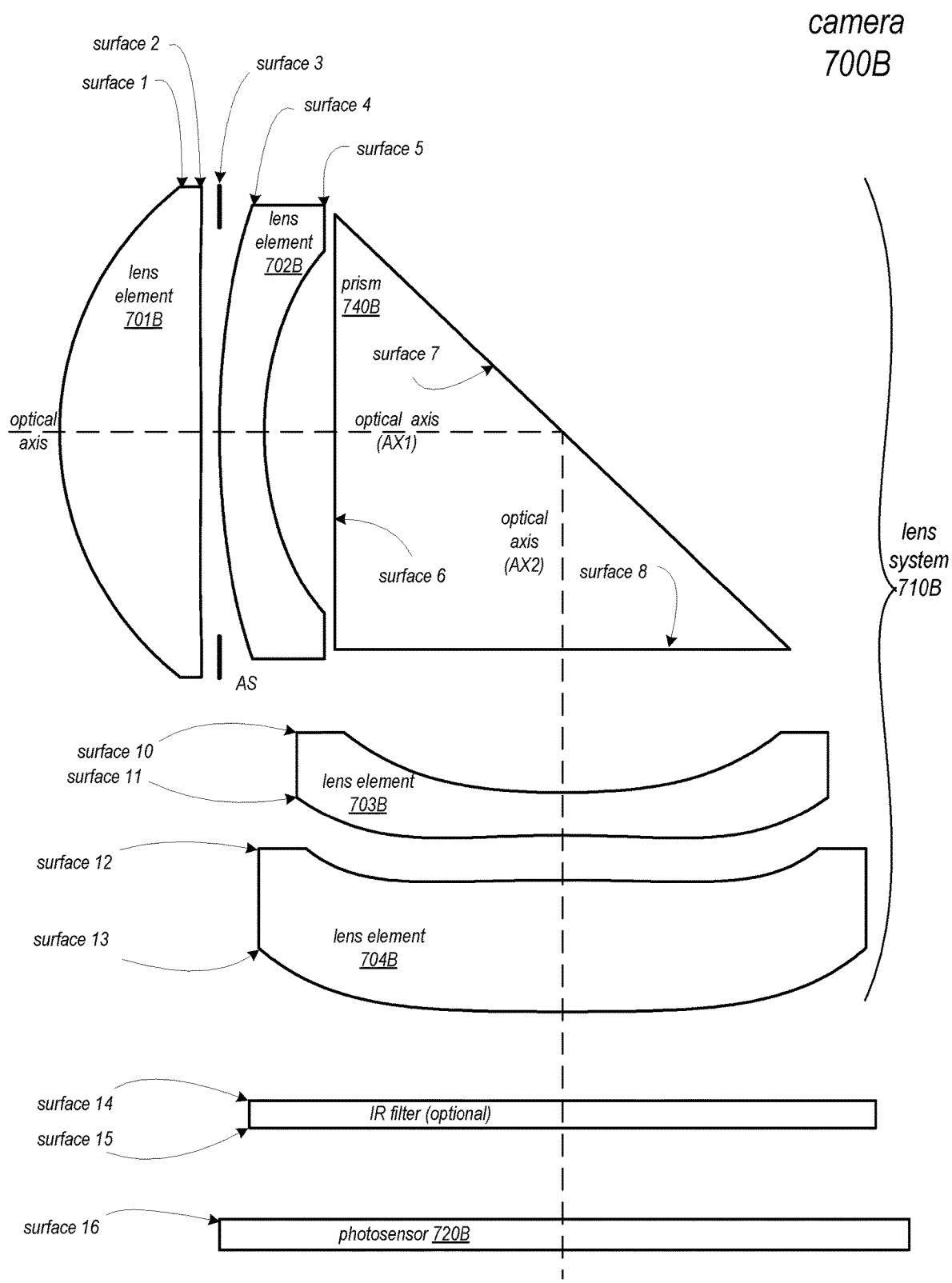
FIG. 15A is a cross-sectional illustration of a compact camera including a variation of the folded telephoto lens system of FIGS. 13A and 13B.

FIG. 15A is a cross-sectional illustration of a compact camera 700B including a variation 710B of the folded telephoto lens system 710 of FIGS. 13A and 13B. Tables 8A-8E provide example values of various optical and physical parameters of folded telephoto lens system 710B as illustrated in FIG. 15A. In at least some embodiments, system 710B may include a zooming mechanism for dynamically focusing an object scene from infinity (object distance ≥20 meters) to near object distance, <1 meter, by translating or actuating the photosensor 720 at the image plane along the folded optical axis AX2. Tables 8A-8E may be referred to as providing an optical prescription for an example variation 710B of zoom lens system 710 of FIGS. 13A and 13B. The zoom parameters for system 710B are listed in Table 8E. The zoom parameters shown in Table 8E for position 1 are the axial thickness or space separation on surface #14 (along AX2) of the photosensor at the image plane from the IR filter when the object scene distance is at infinity (the optical prescription as listed in Table 8B). The corresponding optical prescription for an object scene at 1 meter (position 2) is the same as the prescription listed in Table 8B, except that the object distance in surface #0 is replaced by 1000 mm, and the space separation of photosensor at the image plane from the IR filter on surface #14 is replaced by −1.0159 mm. As shown in Table 8E, the photosensor at the image plane moves by about 0.194 mm from its nominal position 1 to position 2 for the lens system 710B to zoom and focus object scene from >20 meters away from the camera to near object scene at <1000 mm distance.

The optical prescription in Tables 8A-8E is for a zoom lens system 710B with an effective focal length f of 14 mm at 555 nm wavelength, a focal ratio of f/2.8, with 26 degrees FOV, TTL of 13.8 mm, and with TTL/f equal to 0.986. This lens system 710B is a compact folded imaging system designed for visible spectrum covering 470 nm to 650 nm.

Figure 15B:
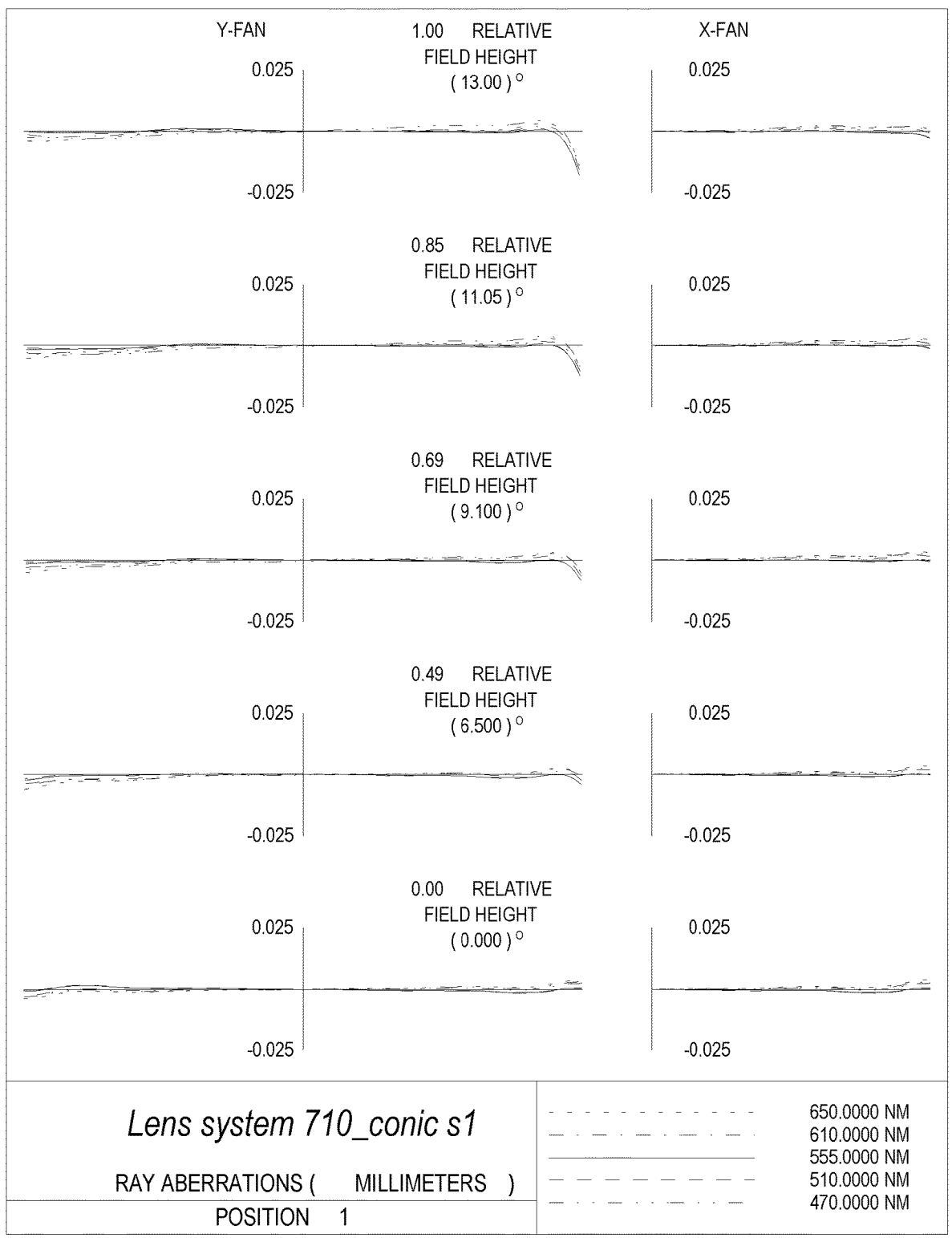
FIGS. 15B and 15C illustrate plots of the polychromatic ray aberration curves over the half field of view and over the visible spectral band ranging 470 nm to 650 nm for the folded telephoto lens system as illustrated in FIG. 15A in which the first surface of the first lens element is a conic surface.
Figure 15C:
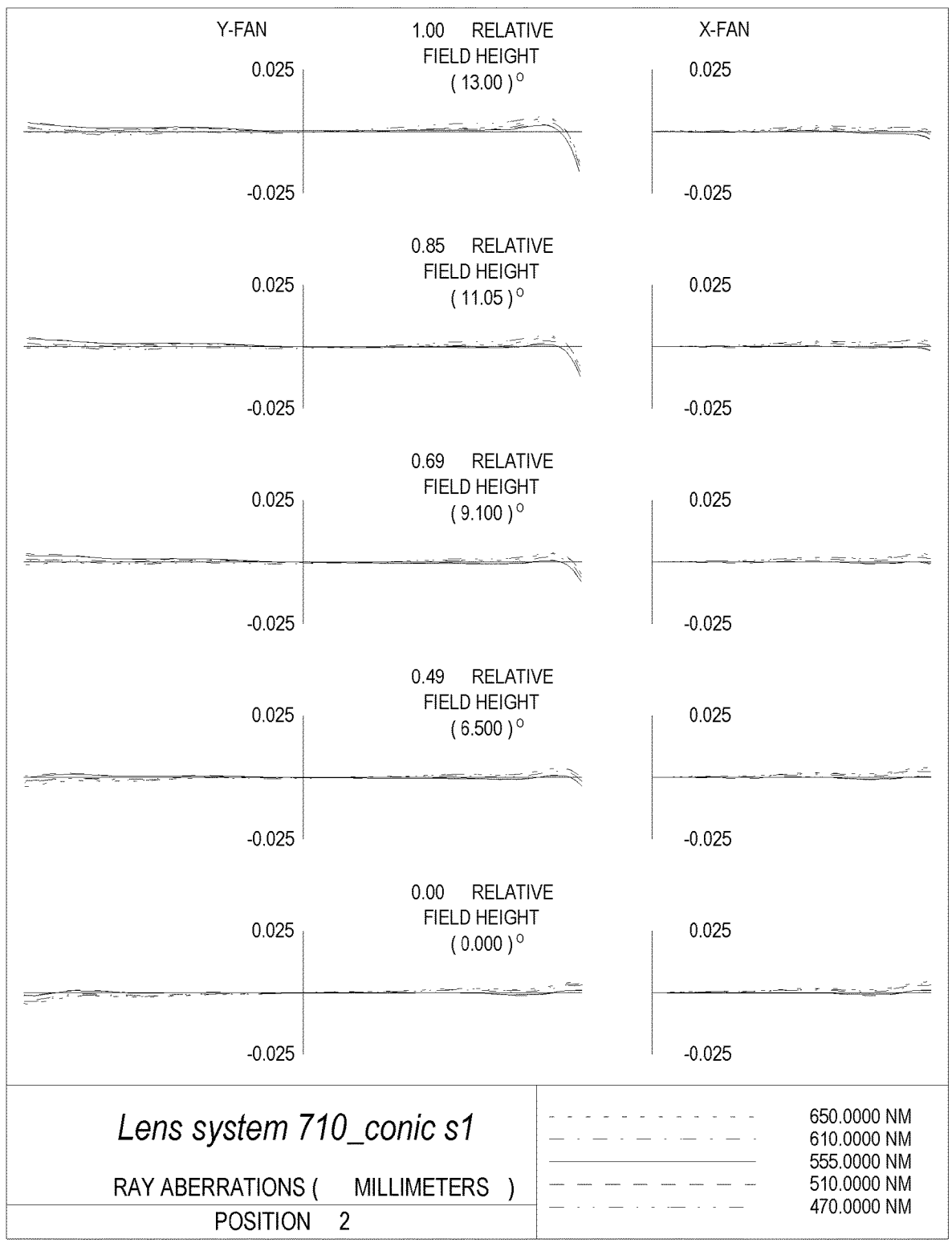

Lens system 710B as specified in Tables 8A-8E is configured to correct optical aberrations as described in reference to lens system 110 and Tables 1A-1D. FIGS. 15B and 15C illustrate plots of the polychromatic ray aberration curves over the half field of view (HFOV=13.0 degrees) for an object point on-axis (at 0 degrees) to an off-axis field point at 13.0 degrees, and over the visible band ranging from 470 nm to 650 nm for a compact folded telephoto lens system 710B as illustrated in FIG. 15A and described in Tables 8A-8E. Note that the plots illustrated in FIGS. 15B and 15C show the well-corrected aberrations for both focus positions 1 and 2 (i.e., the optical performance of lens system 710B for an object scene located at infinity, and for an object scene located at <1000 mm distance).

The optical prescription in Tables 8A-8E describes an example embodiment of a folded telephoto lens system as illustrated in FIG. 15A that includes four lens elements with refractive power and effective focal length f, and with refractive powers of the lens elements distributed such that the ratios of the focal lengths of the lens elements relative to the system focal length f are |f1/f|=0.442, |f2/f|=0.748, f3/f|=0.697, and |f4/f|=2.138. Lens element L1 is a biconvex lens having an object side surface configured to be a conic surface with conic constant value of about k=−0.00518 and with vertex radii of curvature R1/R2=−0.050, and L2 is negative meniscus shape and has vertex radii of curvature R3/R4=2.583. Lens element L3 has vertex radii of curvature R5/R6=−0.573, and lens element L4 is biconvex and has vertex radii of curvature R7/R8=−0.502. The aspheric coefficients for the surfaces of the lens elements in lens system 710B in the example embodiment are listed in Table 8C. Configuring lens system 710B according to the arrangement of the power distribution of the lens elements, and adjusting the radii of curvature and aspheric coefficient as shown in Tables 8A-8E, the total track length (TTL), of the lens system 710B may be reduced (e.g., to 13.80 mm as shown in Table 8A) and aberration of the system may effectively be corrected to obtain optical performance of high image quality resolution, for an object scene at infinity and for an object scene located <1000 mm distance, in a small form factor camera 700B.

Figure 16A:
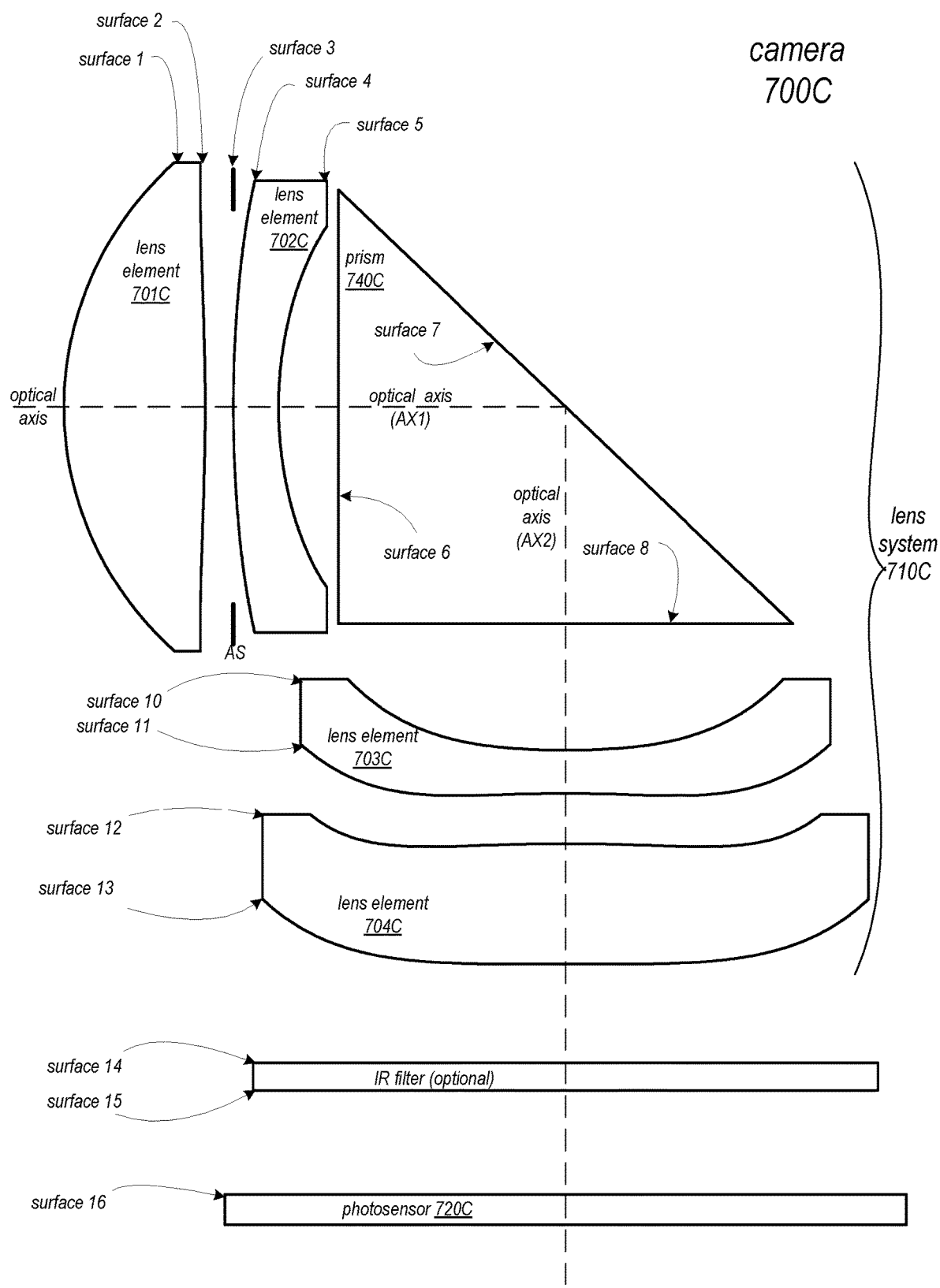
FIG. 16A is a cross-sectional illustration of a compact camera including another variation of the folded telephoto lens system of FIGS. 13A and 13B.

FIG. 16A is a cross-sectional illustration of a compact camera 700C including another variation 710C of the folded telephoto lens system 710 of FIGS. 13A and 13B. Tables 9A-9E provide example values of various optical and physical parameters of folded telephoto lens system 710C as illustrated in FIG. 16A. In at least some embodiments, system 710C may include a zooming mechanism for dynamically focusing an object scene from infinity (object distance ≥20 meters) to near object distance, <1 meter, by translating or actuating the photosensor 720 at the image plane along the folded optical axis AX2. Tables 9A-9E may be referred to as providing an optical prescription for an example variation 710C of zoom lens system 710 of FIGS. 13A and 13B. The zoom parameters for system 710C are listed in Table 9E. The zoom parameters shown in Table 9E for position 1 are the axial thickness or space separation on surface #14 (along AX2) of the photosensor at the image plane from the IR filter when the object scene distance is at infinity (the optical prescription as listed in Table 9B). The corresponding optical prescription for an object scene at 1 meter (position 2) is the same as the prescription listed in Table 9B, except that the object distance in surface #0 is replaced by 1000 mm, and the space separation of photosensor at the image plane from the IR filter on surface #14 is replaced by −1.0159 mm. As shown in Table 9E, the photosensor at the image plane moves by about 0.194 mm from its nominal position 1 to position 2 for the lens system 710C to zoom and focus object scene from >20 meters away from the camera to near object scene at <1000 mm distance.

The optical prescription in Tables 9A-9E is for a zoom lens system 710C with an effective focal length f of 14 mm at 555 nm wavelength, a focal ratio of f/2.8, with 26 degrees FOV, TTL of 13.8 mm, and with TTL/f equal to 0.986. This lens system 710C is a compact folded imaging system designed for visible spectrum covering 470 nm to 650 nm.

Figure 16B:
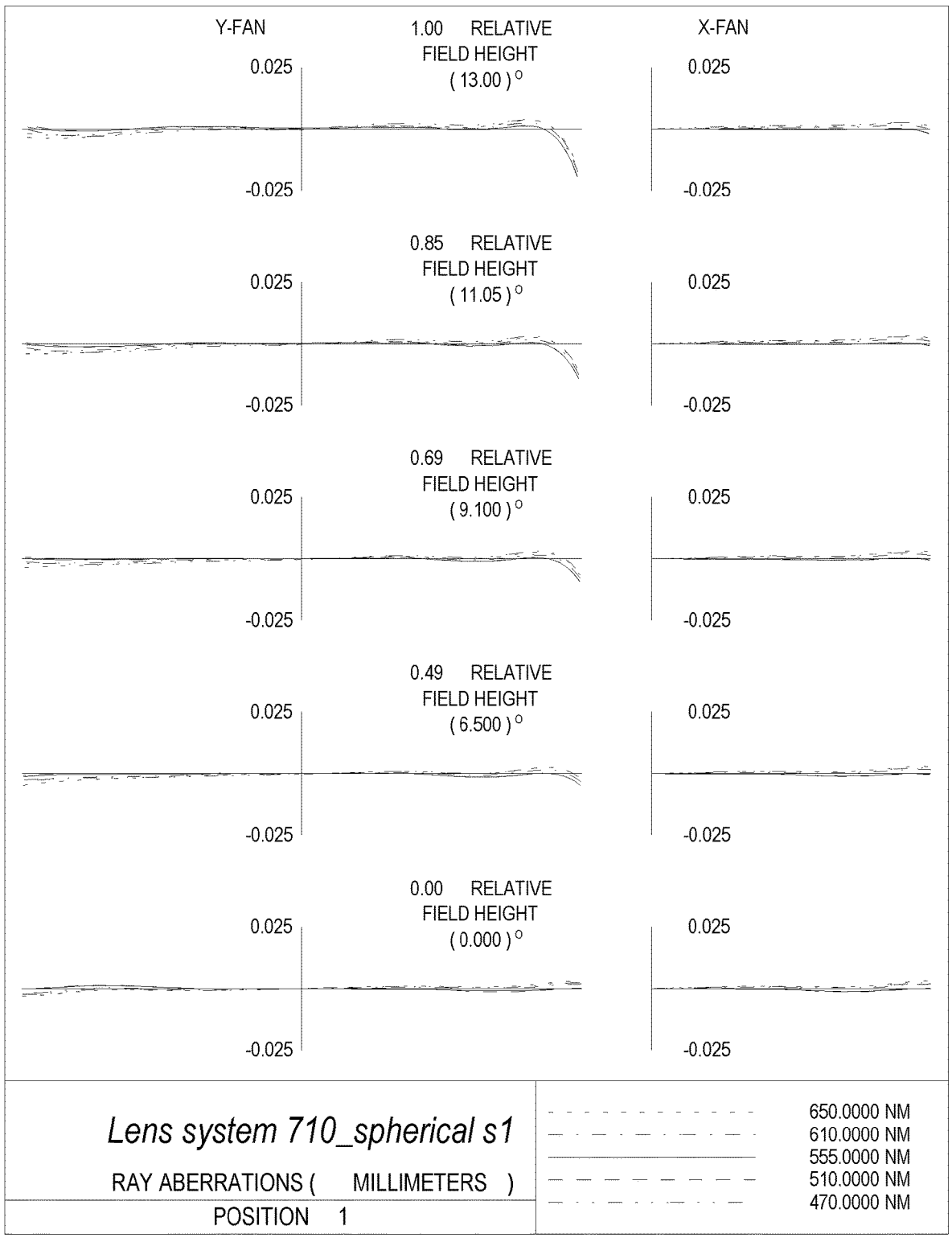
FIGS. 16B and 16C illustrate plots of the polychromatic ray aberration curves over the half field of view and over the visible spectral band ranging 470 nm to 650 nm for the folded telephoto lens system as illustrated in FIG. 16A in which the first surface of the first lens element is spherical.
Figure 16C:
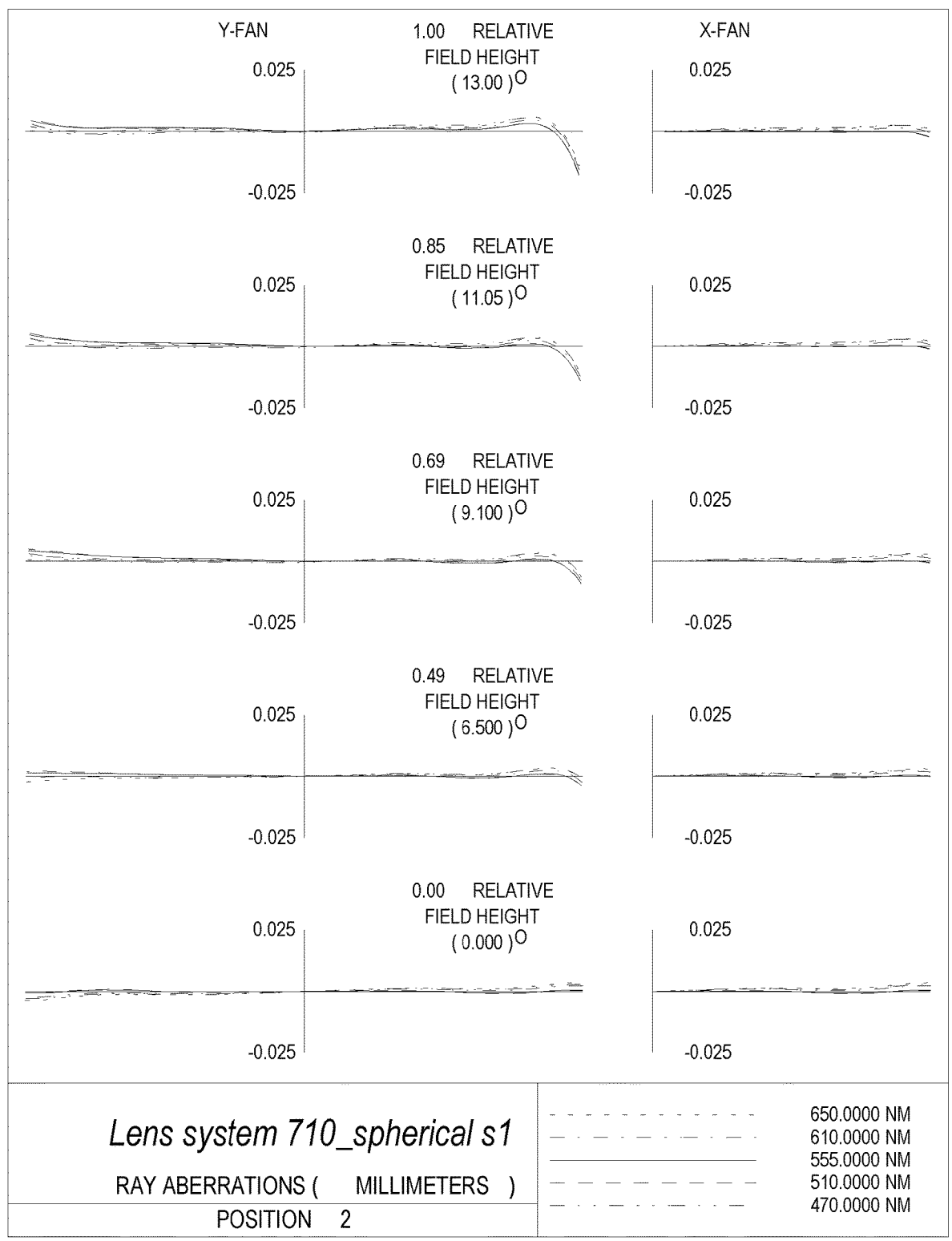

Lens system 710C as specified in Tables 9A-9E is configured to correct optical aberrations as described in reference to lens system 110 and Tables 1A-1D. FIGS. 16B and 16C illustrate plots of the polychromatic ray aberration curves over the half field of view (HFOV=13.0 degrees) for an object point on-axis (at 0 degrees) to an off-axis field point at 13.0 degrees, and over the visible band ranging from 470 nm to 650 nm for a compact folded telephoto lens system 710C as illustrated in FIG. 16A and described in Tables 9A-9E. Note that the plots illustrated in FIGS. 16B and 16C show the well-corrected aberrations for both focus positions 1 and 2 (i.e., the optical performance of lens system 710C for an object scene located at infinity, and for an object scene located at <1000 mm distance).

The optical prescription in Tables 9A-9E describes an example embodiment of a folded telephoto lens system as illustrated in FIG. 16A that includes four lens elements with refractive power and effective focal length f, and with refractive powers of the lens elements distributed such that the ratios of the focal lengths of the lens elements relative to the system focal length f are |f1/f|=0.437, |f2/f|=0.735, f3/f|=0.672, and |f4/f|=1.930. Lens element L1 is a biconvex lens having an object side surface configured to be a spherical surface and with vertex radii of curvature R1/R2=−0.134, and L2 is negative meniscus shape and has vertex radii of curvature R3/R4=3.300. Lens element L3 has vertex radii of curvature R5/R6=−0.551, and lens element L4 is biconvex and has vertex radii of curvature R7/R8=−0.050. The aspheric coefficients for the surfaces of the lens elements in this third lens system 710C in the example embodiment are listed in Table 9C. Configuring this lens system 710C according to the arrangement of the power distribution of the lens elements, and adjusting the radii of curvature and aspheric coefficient as shown in Tables 9A-9E, the total track length (TTL), of the lens system 710C may be reduced (e.g., to 13.80 mm as shown in Table 9A) and aberration of the system may effectively be corrected to obtain optical performance of high image quality resolution, for an object scene at infinity and for an object scene located <1000 mm distance, in a small form factor camera 700C.

Figure 17B:
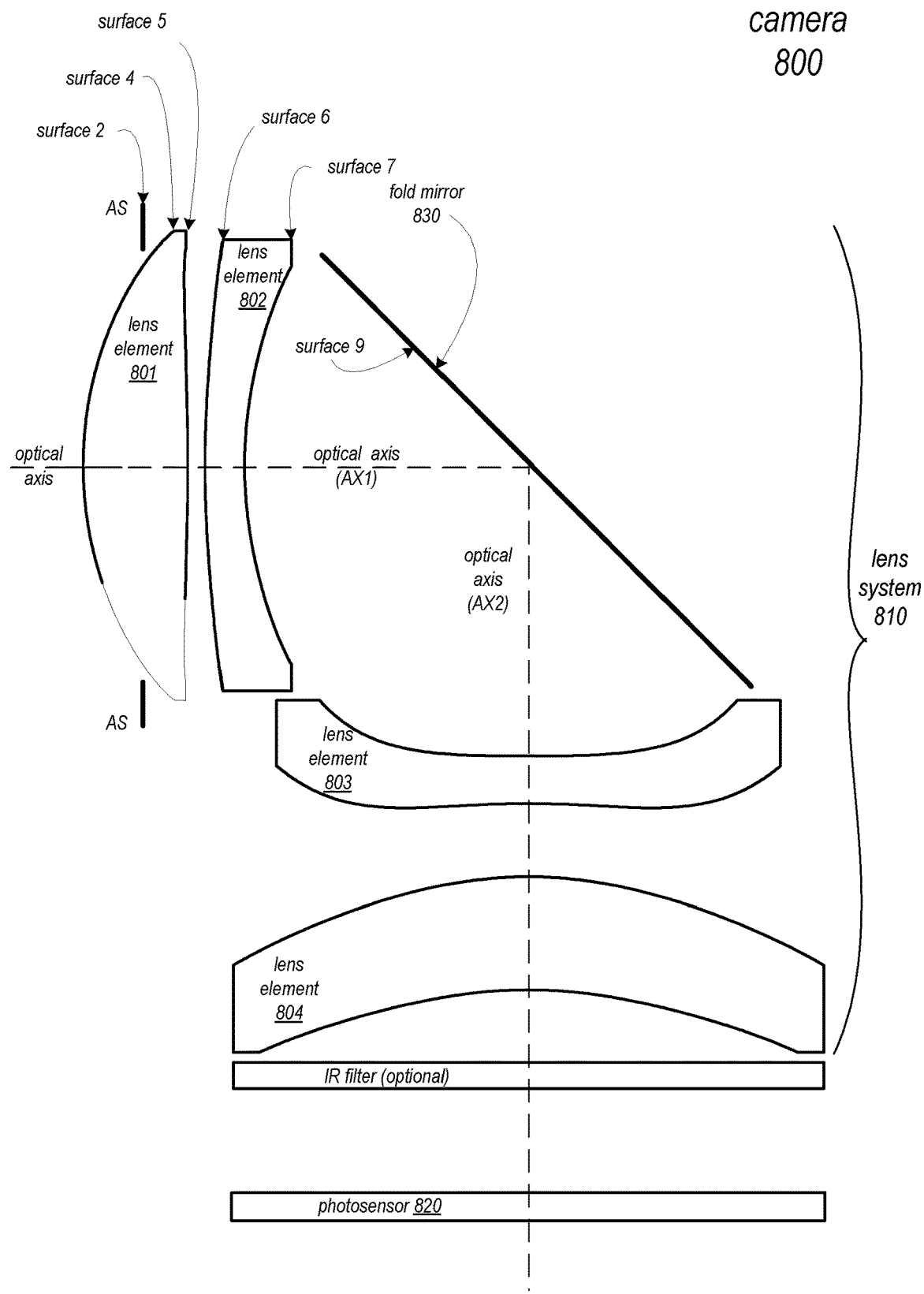

FIGS. 17A and 17B are cross-sectional illustrations of another example embodiment of a compact telephoto camera 800 including a folded telephoto lens system 810. Lens system 810 includes four lens elements (801-804) with refractive power. Lens system 810 may be viewed as a variation of lens system 410 of FIGS. 7A and 7B since the light path folding optical element is a planar fold mirror 830 and the elements of the two systems 810 and 410 may be similar. In lens system 810, as in system 410, the aperture stop AS is located in front and near the convex object side surface of the first lens element L1. However, lens system 810, as illustrated in FIGS. 17A and 17B, may include a zooming mechanism for the photosensor 820 at the image plane to dynamically focus an object scene from infinity (≥20 meters) to near distance, e.g. less than a meter. Moreover, as illustrated in FIGS. 17A and 17B, in at least some embodiments the lenses in a second lens group GR2 (including L3 (803) and L4 (804)) may be arranged to be not in close proximity with each other, and L4 (lens 804) may have a concave image side surface.

Tables 10A-10E provide example values of various optical and physical parameters of an example embodiment of a camera 800 and lens system 810 as illustrated in FIGS. 17A and 17B. In at least some embodiments, system 810 may include a zooming mechanism for dynamically focusing an object scene from infinity (object distance ≥20 meters) to near object distance, <1 meter, by translating or actuating the photosensor 820 at the image plane along the folded optical axis AX2. Tables 10A-10E may be referred to as providing an optical prescription for a zoom lens system 810. The zoom parameters for system 810 are listed in Table 10E. The zoom parameters shown in Table 10E for position 1 are the axial thickness or space separation on surface #16 (along AX2) of the photosensor at the image plane from the IR filter when the object scene distance is at infinity (the optical prescription as listed in Table 10B). The corresponding optical prescription for an object scene at 1 meter (position 2) is the same as the prescription listed in Table 10B, except that the object distance in surface #0 is replaced by 1000 mm, and the space separation of photosensor at the image plane from the IR filter on surface #16 is replaced by −1.1938 mm. As shown in Table 10E, the photosensor 820 at the image plane moves by about 0.195 mm from its nominal position 1 to position 2 for the lens system 810 to zoom and focus object scene from >20 meters away from the camera to near object scene at <1000 mm distance.

The optical prescription in Tables 10A-10E is for a zoom lens system 810 with an effective focal length f of 14 mm at 555 nm wavelength, a focal ratio of f/2.8, with 26 degrees FOV, TTL of 13.31 mm, and with TTL/f equal to 0.951. Lens system 810 is a compact folded imaging system designed for visible spectrum covering 470 nm to 650 nm.

The lens elements L1, L2, L3, and L4 of lens system 810 may be composed of plastic materials with refractive indices and Abbe numbers as listed in Table 10B. In this example embodiment of lens system 810, the choice of lens materials are the same as in the optical prescription for the lens system 110 as listed in Tables 1A-1D. Referring to the lens system 810, the lens element L1 and L3 may be composed of a plastic material having an Abbe number of V1=56.1. The lens elements L2 and L4 may be composed of a plastic material with Abbe number V2=23.3.

Figure 18A:
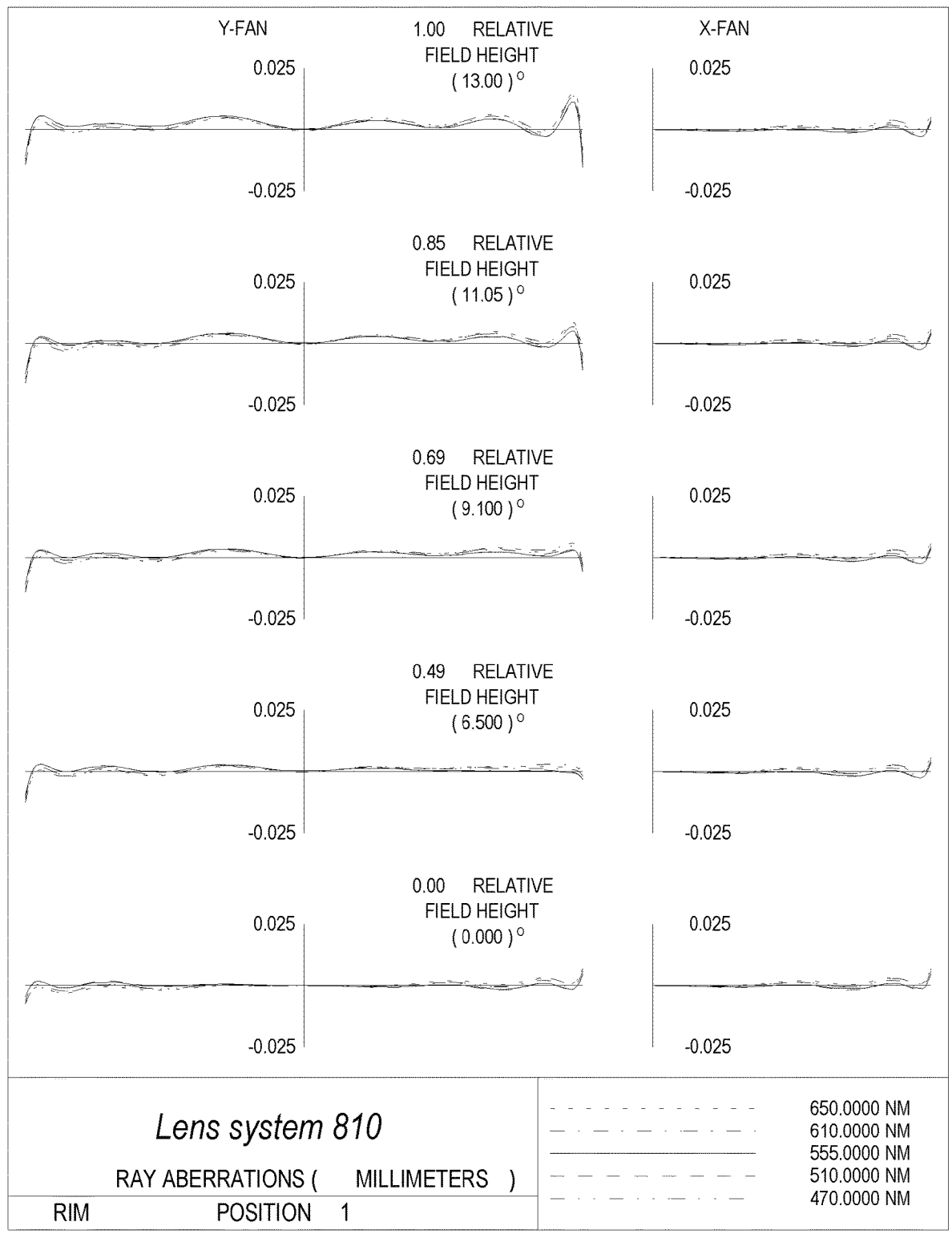
FIGS. 18A and 18B illustrate plots of the polychromatic ray aberration curves over the half field of view and over the visible spectral band ranging 470 nm to 650 nm for a folded telephoto lens system as illustrated in FIGS. 17A and 17B.
Figure 18B:
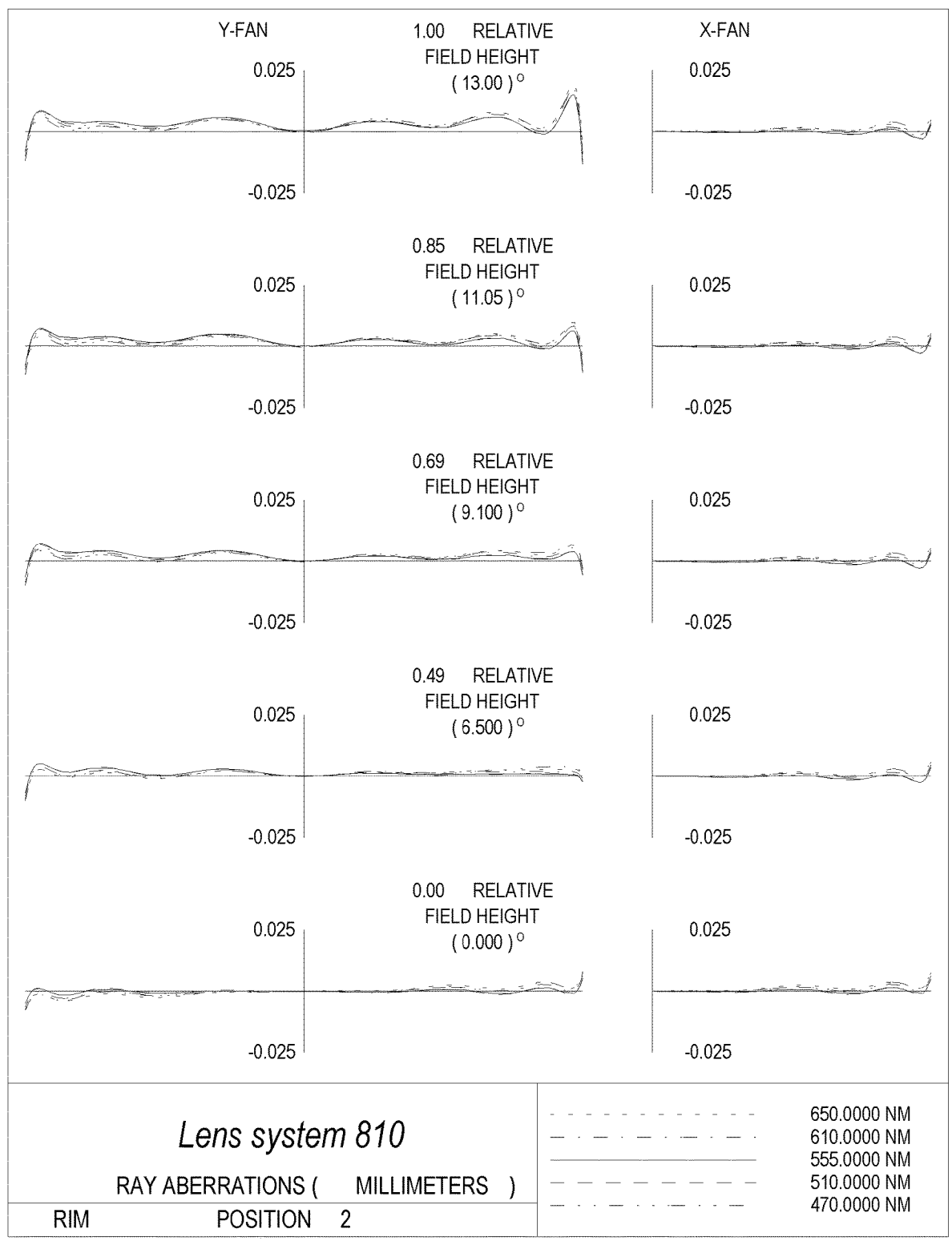

Lens system 810 as specified in Tables 10A-10E is configured to correct optical aberrations as described in reference to lens system 110 and Tables 1A-1D. FIGS. 18A and 18B illustrate plots of the polychromatic ray aberration curves over the half field of view (HFOV=13.0 degrees) for an object point on-axis (at 0 degrees) to an off-axis field point at 13.0 degrees, and over the visible band ranging from 470 nm to 650 nm for a compact folded telephoto lens system 810 as illustrated in FIGS. 17A and 17B and described in Tables 10A-10E. Note that the plots illustrated in FIGS. 18A and 18B show the well-corrected aberrations for both focus positions 1 and 2 (i.e., the optical performance of lens system 810 for an object scene located at infinity, and for an object scene located at <1000 mm distance).

The optical prescription in Tables 10A-10E describes an example embodiment of a folded telephoto lens system as illustrated in FIGS. 17A and 17B that includes four lens elements with refractive power and effective focal length f, and with refractive powers of the lens elements distributed such that the ratios of the focal lengths of the lens elements relative to the system focal length f are |f1/f|=0.491, |f2/f|=0.873, |f3/f|=1.033, and |f4/f|=3.095. Lens element L1 is a biconvex lens with vertex radii of curvature R1/R2=−0.155, and L2 is negative meniscus shape and has vertex radii of curvature R3/R4=2.711. Lens element L3 has vertex radii of curvature R5/R6=−2.611, and lens element L4 is a positive meniscus shape with a concave image side surface and has vertex radii of curvature R7/R8=0.923. The aspheric coefficients for the surfaces of the lens elements in lens system 810 in the example embodiment are listed in Table 10C. Configuring lens system 810 according to the arrangement of the power distribution of the lens elements, and adjusting the radii of curvature and aspheric coefficient as shown in Tables 10A-10E, the total track length (TTL), of the lens system 810 may be reduced (e.g., to 13.31 mm as shown in Table 10A) and aberration of the system may effectively be corrected to obtain optical performance of high image quality resolution, for an object scene at infinity and for an object scene located <1000 mm distance, in a small form factor camera 800.

Figure 19A:
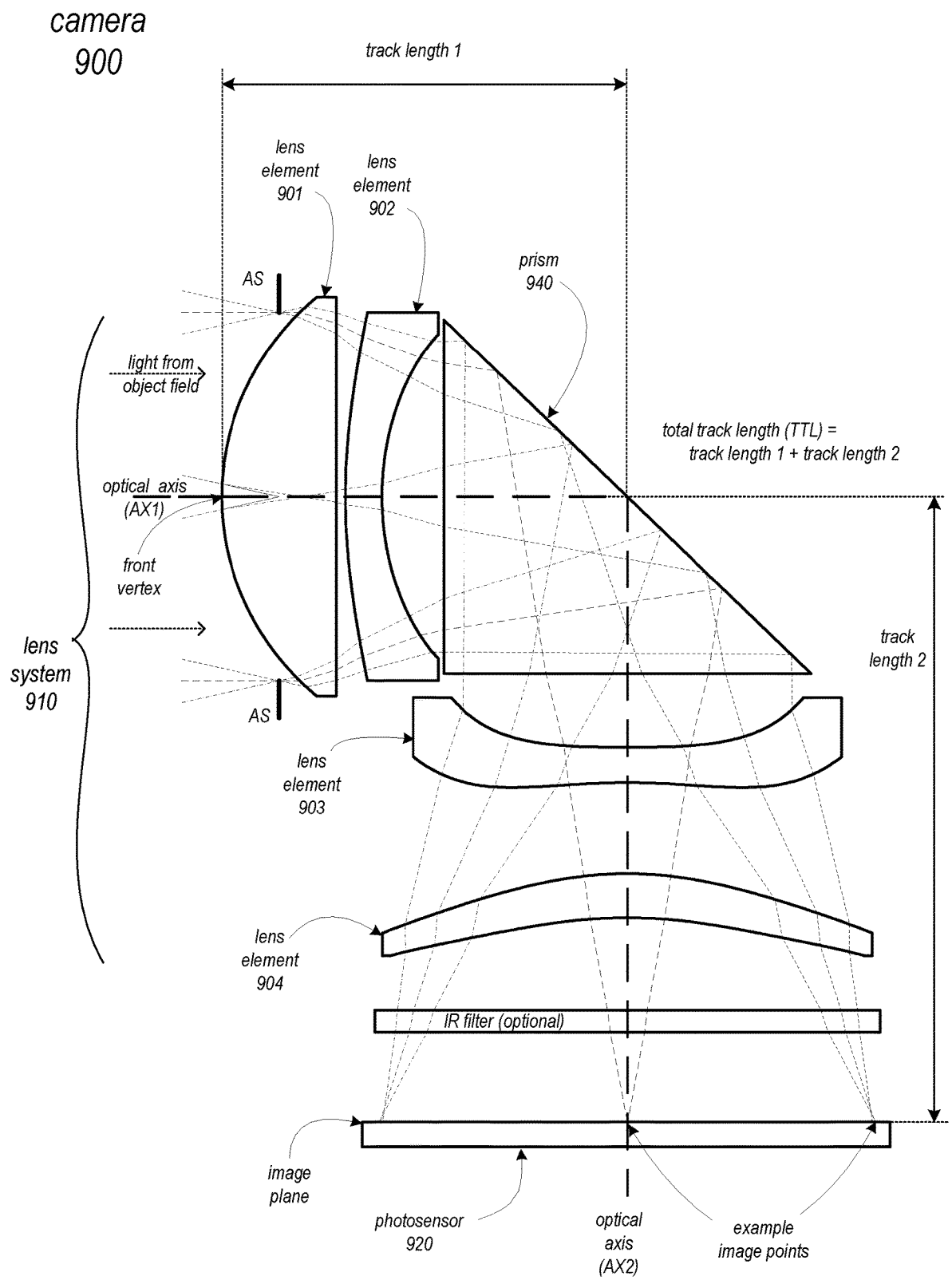
FIGS. 19A and 19B are cross-sectional illustrations of another example embodiment of a compact camera including a folded telephoto lens system that includes four lens elements with refractive power in which the first lens element is plano-convex in shape and in which the aperture stop is located at the first lens element and behind the front vertex of the lens system.
Figure 19B:
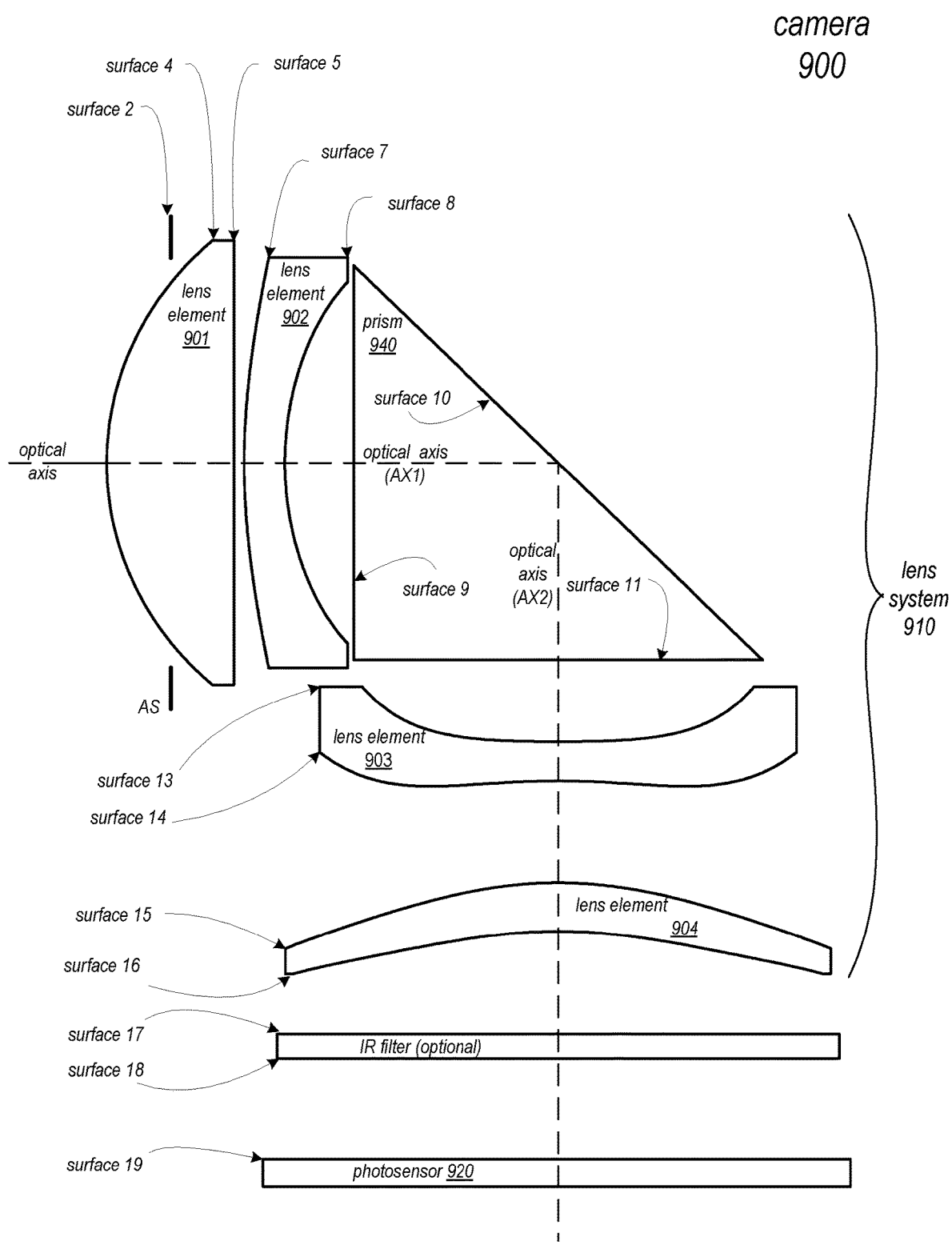

FIGS. 19A and 19B are cross-sectional illustrations of another example embodiment of a compact telephoto camera 900 including a folded telephoto lens system 910. Lens system 910 includes four lens elements (901-904) with refractive power. Lens system 910 may be viewed as a variation of lens system 510 of FIGS. 9A and 9B since the light path folding optical element is a prism 940 and the elements of the two systems 910 and 510 may be similar In lens system 910, as in system 510, the aperture stop AS is located in front and near the convex object side surface of the first lens element L1. However, lens system 910, as illustrated in FIGS. 19A and 19B, may include a zooming mechanism for the photosensor at the image plane to dynamically focus an object scene from infinity (≥20 meters) to near distance, e.g. less than a meter. Moreover, as illustrated in FIGS. 19A and 19B, in at least some embodiments, the lenses in a second lens group GR2 (including L3 (903) and L4 (904)) may be arranged along AX2 to be not in close proximity with each other, and L4 (lens 904) may have a concave image side surface. In addition, in at least some embodiments, lens system 910 may include a plano-convex lens element L1 (lens 901) with a convex object side surface.

Tables 11A-11E provide example values of various optical and physical parameters of an example embodiment of a camera 900 and lens system 910 as illustrated in FIGS. 19A and 19B. In at least some embodiments, system 910 may include a zooming mechanism for dynamically focusing an object scene from infinity (object distance ≥20 meters) to near object distance, <1 meter, by translating or actuating the photosensor 920 at the image plane along the folded optical axis AX2. Tables 11A-11E may be referred to as providing an optical prescription for a zoom lens system 910. The zoom parameters for system 910 are listed in Table 11E. The zoom parameters shown in Table 11E for position 1 are the axial thickness or space separation on surface #14 (along AX2) of the photosensor 920 at the image plane from the IR filter when the object scene distance is at infinity (the optical prescription as listed in Table 11B). The corresponding optical prescription for an object scene at 1 meter (position 2) is the same as the prescription listed in Table 11B, except that the object distance in surface #0 is replaced by 1000 mm, and the space separation of photosensor 920 at the image plane from the IR filter on surface #14 is replaced by −1.4326 mm. As shown in Table 11E, the photosensor 920 at the image plane moves by about 0.195 mm from its nominal position 1 to position 2 for the lens system 910 to zoom and focus object scene from >20 meters away from the camera to near object scene at <1000 mm distance.

The optical prescription in Tables 11A-11E is for a zoom lens system 910 with an effective focal length f of 14 mm at 555 nm wavelength, a focal ratio of f/2.8, with 26 degrees FOV, TTL of 13.80 mm, and with TTL/f equal to 0.986. Lens system 910 is a compact folded imaging system designed for visible spectrum covering 470 nm to 650 nm.

The lens elements L1, L2, L3, and L4 of lens system 910 may be composed of plastic materials with refractive indices and Abbe numbers as listed in Table 11B. In this example embodiment of lens system 910, the choice of lens materials are the same as in the optical prescription for the lens system 110 as listed in Tables 1A-1D. Referring to the lens system 910, the lens element L1 and L3 may be composed of a plastic material having an Abbe number of V1=56.1. The lens elements L2 and L4 may be composed of a plastic material with Abbe number V2=23.3.

Figure 20A:
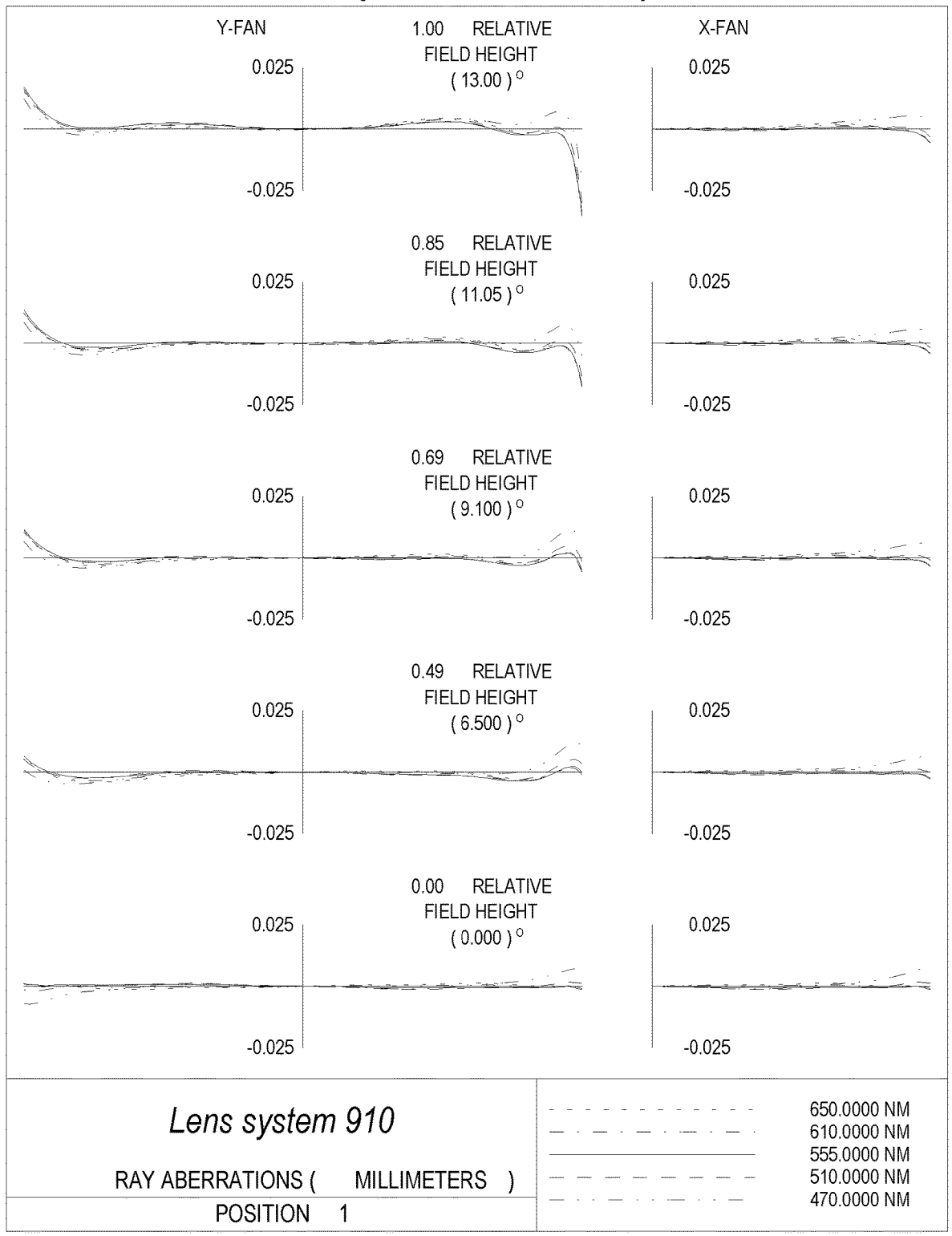
FIGS. 20A and 20B illustrate plots of the polychromatic ray aberration curves over the half field of view and over the visible spectral band ranging 470 nm to 650 nm for a folded telephoto lens system as illustrated in FIGS. 19A and 19B.
Figure 20B:
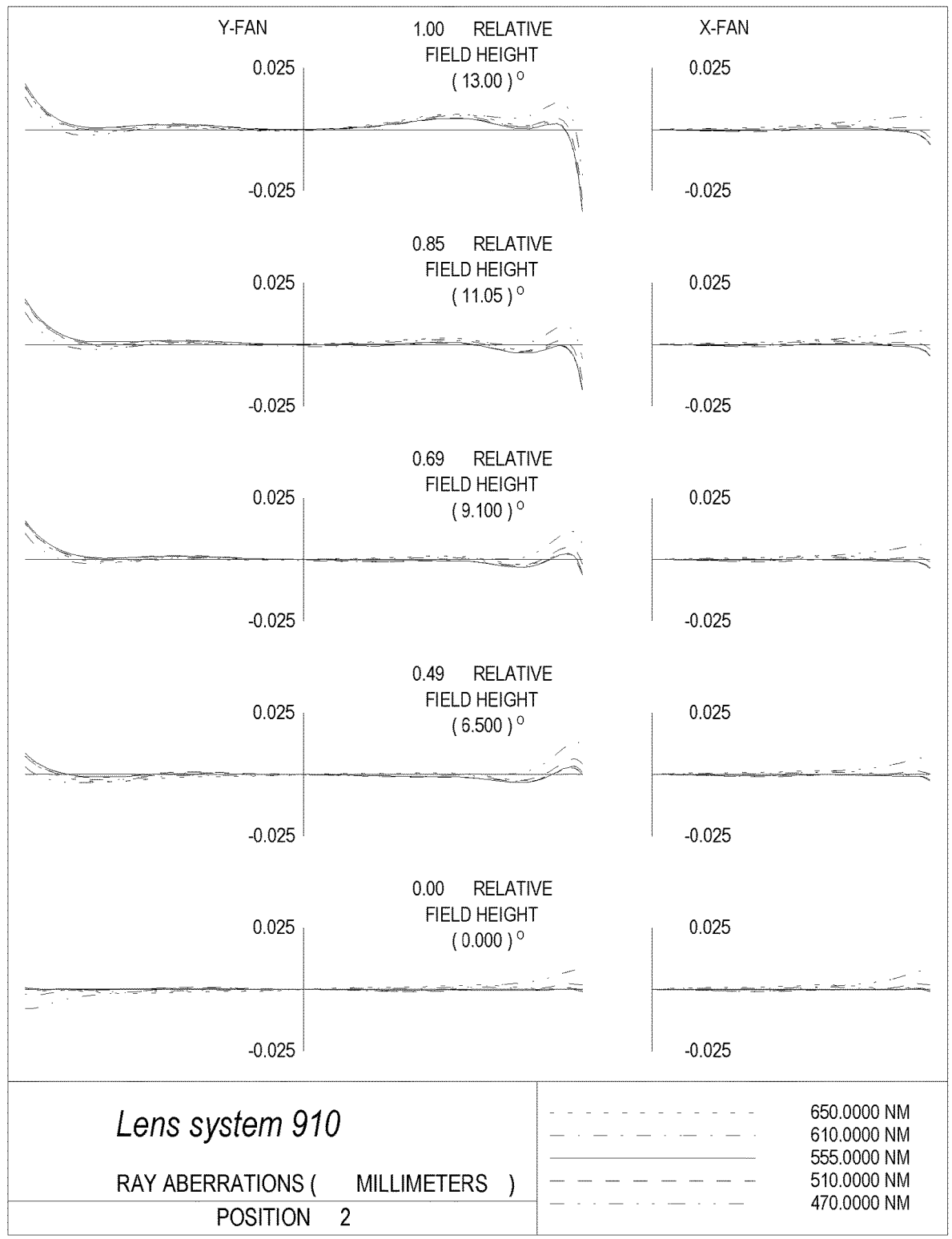

Lens system 910 as specified in Tables 11A-11E is configured to correct optical aberrations as described in reference to lens system 110 and Tables 1A-1D. FIGS. 20A and 20B illustrate plots of the polychromatic ray aberration curves over the half field of view (HFOV=13.0 degrees) for an object point on-axis (at 0 degrees) to an off-axis field point at 13.0 degrees, and over the visible band ranging from 470 nm to 650 nm for a compact folded telephoto lens system 910 as illustrated in FIGS. 19A and 19B and described in Tables 11A-11E. Note that the plots illustrated in FIGS. 20A and 20B show the well-corrected aberrations for both focus positions 1 and 2 (i.e., the optical performance of lens system 910 for an object scene located at infinity, and for an object scene located at <1000 mm distance).

The optical prescription in Tables 11A-11E describes an example embodiment of a folded telephoto lens system as illustrated in FIGS. 19A and 19B that includes four lens elements with refractive power and effective focal length f, and with refractive powers of the lens elements distributed such that the ratios of the focal lengths of the lens elements relative to the system focal length f are |f1/f|=0.465, |f2/f|=0.834, |f3/f|=0.797, and |f4/f|=2.245. Lens element L1 is a plano-convex lens element having a convex object side surface with conic constant value of about k=−0.02. Lens element L1 has vertex radii of curvature R1/R2=0. Lens element L2 is negative meniscus shape and has vertex radii of curvature R3/R4=2.246. Lens element L3 has vertex radii of curvature R5/R6=−2.251, and lens element L4 is a positive meniscus shape with a concave image side surface and has vertex radii of curvature R7/R8=0.806. The aspheric coefficients for the surfaces of the lens elements in lens system 910 in the example embodiment are listed in Table 11C. Configuring lens system 910 according to the arrangement of the power distribution of the lens elements, and adjusting the radii of curvature and aspheric coefficient as shown in Tables 11A-11E, the total track length (TTL), of the lens system 910 may be reduced (e.g., to 13.80 mm as shown in Table 11A) and aberration of the system may effectively be corrected to obtain optical performance of high image quality resolution, for an object scene at infinity and for an object scene located <1000 mm distance, in a small form factor camera 900.

Figure 21B:
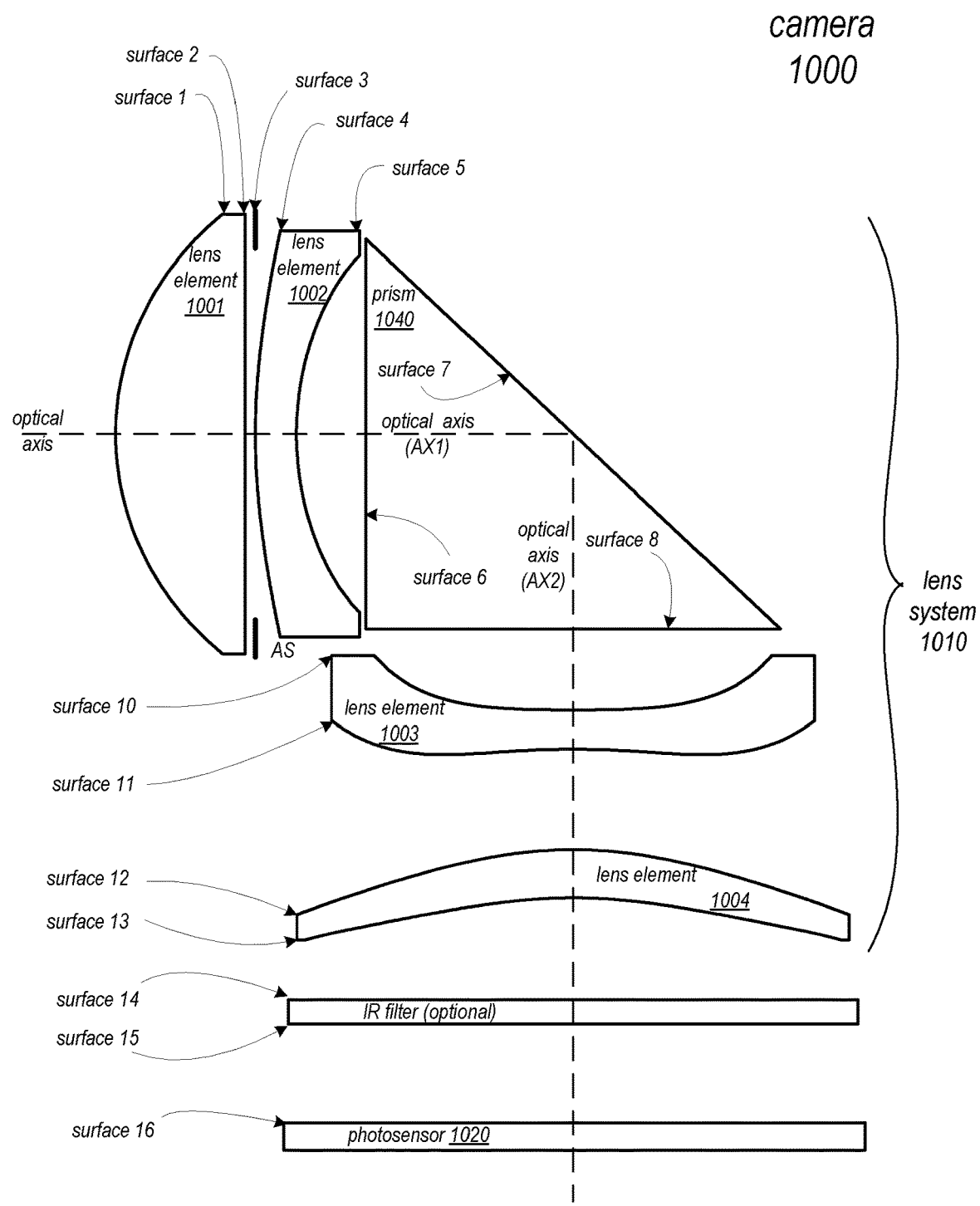

FIGS. 21A and 21B are cross-sectional illustrations of another example embodiment of a compact telephoto camera 1000 including a folded telephoto lens system 1010. Lens system 1010 includes four lens elements (1001-1004) with refractive power. Lens system 1010 may be viewed as a variation of lens system 910 of FIGS. 19A and 19B since the light path folding optical element is a prism 1040 and the elements of the two systems 1010 and 910 may be similar. In lens system 1010, the aperture stop AS is located in the space between the lens elements L1 and L2. In this example embodiment, the configuration of lens system 1010 may differ from that of lens system 910 only on the location of the aperture stop. Moreover, lens system 1010, as illustrated in FIGS. 21A and 21B, may also include a zooming mechanism for the photosensor 1020 at the image plane to dynamically focus an object scene from infinity (≥20 meters) to near distance, e.g. less than a meter. In at least some embodiments, lens system 1010 may include a plano-convex lens element L1 (lens 1001) with a convex object side surface.

Tables 12A-12E provide example values of various optical and physical parameters of an example embodiment of a camera 1000 and lens system 1010 as illustrated in FIGS. 21A and 21B. In at least some embodiments, system 1010 may include a zooming mechanism for dynamically focusing an object scene from infinity (object distance ≥20 meters) to near object distance, <1 meter, by translating or actuating the photosensor 1020 at the image plane along the folded optical axis AX2. Tables 12A-12E may be referred to as providing an optical prescription for a zoom lens system 1010. The zoom parameters for system 1010 are listed in Table 12E. The zoom parameters shown in Table 12E for position 1 are the axial thickness or space separation on surface #16 (along AX2) of the photosensor 1020 at the image plane from the IR filter when the object scene distance is at infinity (the optical prescription as listed in Table 12B). The corresponding optical prescription for an object scene at 1 meter (position 2) is the same as the prescription listed in Table 12B, except that the object distance in surface #0 is replaced by 1000 mm, and the space separation of photosensor 1020 at the image plane from the IR filter on surface #16 is replaced by −1.4326 mm. As shown in Table 12E, the photosensor 1020 at the image plane moves by about 0.195 mm from its nominal position 1 to position 2 for the lens system 1010 to zoom and focus object scene from >20 meters away from the camera to near object scene at <1000 mm distance. Note that while the parameters in optical prescription for lens system 1010 are identical to the corresponding parameters for lens system 910, the sequential numbering of the surfaces in the two prescriptions is different due to the difference in the location of the aperture stop.

The optical prescription in Tables 12A-12E is for a zoom lens system 1010 with an effective focal length f of 14 mm at 555 nm wavelength, a focal ratio of f/2.8, with 26 degrees FOV, TTL of 13.80 mm, and with TTL/f equal to 0.986. Lens system 1010 is a compact folded imaging system designed for visible spectrum covering 470 nm to 650 nm.

The lens elements L1, L2, L3, and L4 of lens system 1010 may be composed of plastic materials with refractive indices and Abbe numbers as listed in Table 12B. In this example embodiment of lens system 1010, the choice of lens materials are the same as in the optical prescription for the lens system 910 as listed in Tables 11A-11E. Referring to the lens system 1010, the lens element L1 and L3 may be composed of a plastic material having an Abbe number of V1=56.1. The lens elements L2 and L4 may be composed of a plastic material with Abbe number V2=23.3.

Figure 22A:
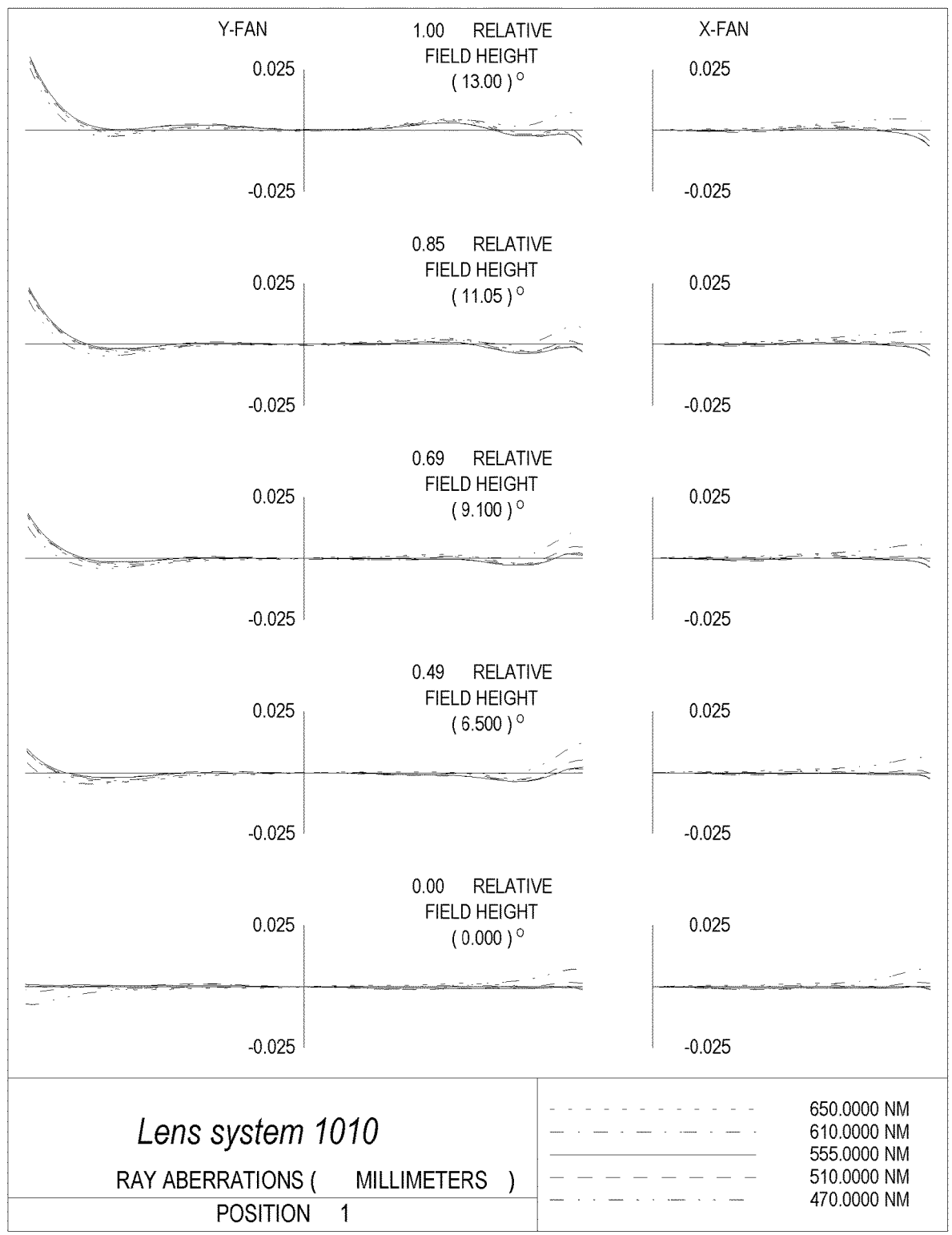
FIGS. 22A and 22B illustrate plots of the polychromatic ray aberration curves over the half field of view and over the visible spectral band ranging 470 nm to 650 nm for a folded telephoto lens system as illustrated in FIGS. 21A and 21B.
Figure 22B:
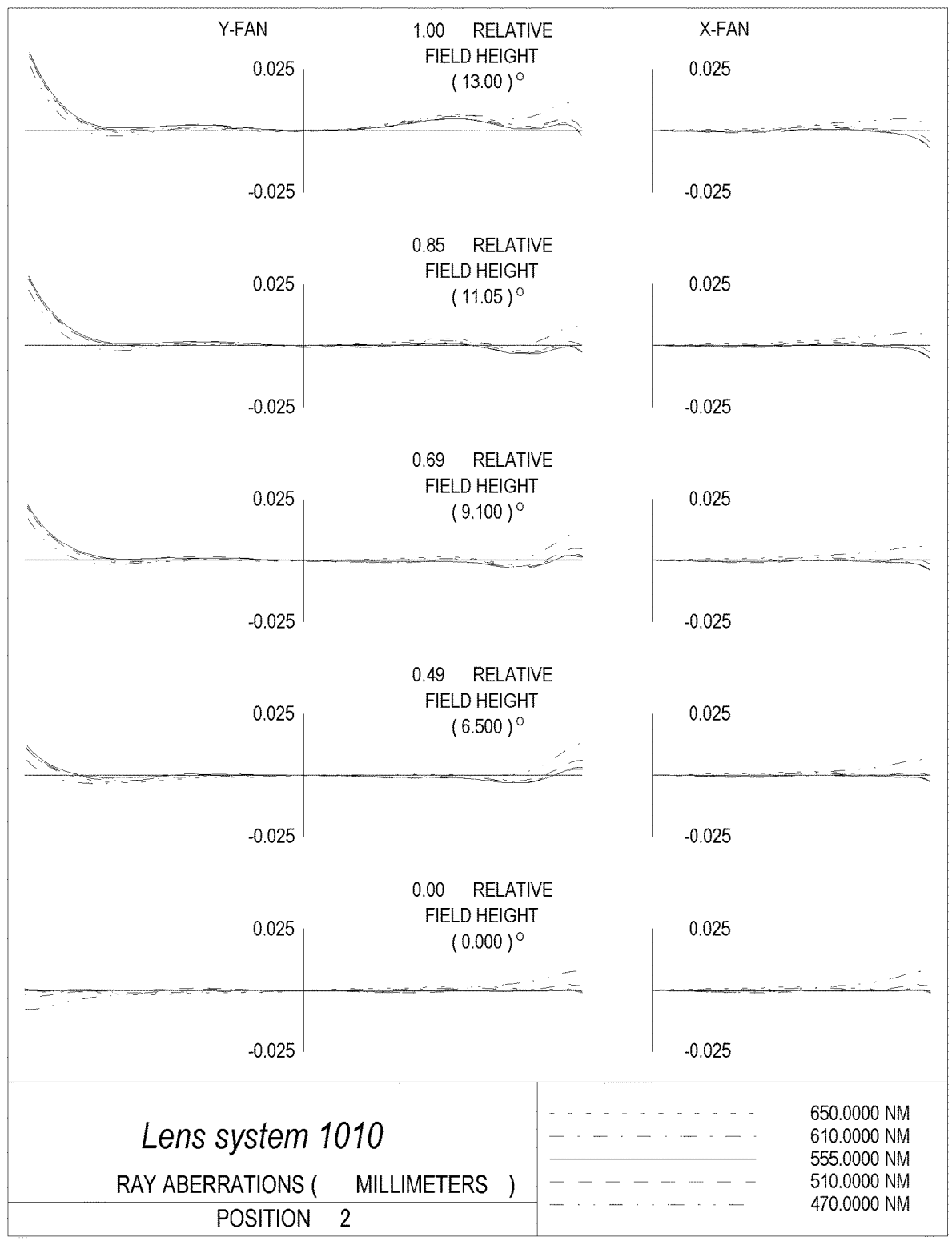

Lens system 1010 as specified in Tables 12A-12E is configured to correct optical aberrations as described in reference to lens system 910 and Tables 11A-11E. FIGS. 22A and 22B illustrate plots of the polychromatic ray aberration curves over the half field of view (HFOV=13.0 degrees) for an object point on-axis (at 0 degrees) to an off-axis field point at 13.0 degrees, and over the visible band ranging from 470 nm to 650 nm for a compact folded telephoto lens system 1010 as illustrated in FIGS. 21A and 21B and described in Tables 12A-12E. Note that the plots illustrated in FIGS. 22A and 22B show the well-corrected aberrations for both focus positions 1 and 2 (i.e., the optical performance of lens system 1010 for an object scene located at infinity, and for an object scene located at <1000 mm distance).

The optical prescription in Tables 12A-12E describes an example embodiment of a folded telephoto lens system as illustrated in FIGS. 21A and 21B that includes four lens elements with refractive power and effective focal length f, and with refractive powers of the lens elements distributed such that the ratios of the focal lengths of the lens elements relative to the system focal length f are |f1/f|=0.465, |f2/f|=0.834, |f3/f|=0.797, and |f4/f|=2.245. Lens element L1 is a plano-convex lens element having a convex object side surface with conic constant value of about k=−0.02. Lens element L1 has vertex radii of curvature R1/R2=0. Lens element L2 is negative meniscus shape and has vertex radii of curvature R3/R4=2.246. Lens element L3 has vertex radii of curvature R5/R6=−2.251, and lens element L4 is a positive meniscus shape with a concave image side surface and has vertex radii of curvature R7/R8=0.806. The aspheric coefficients for the surfaces of the lens elements in lens system 1010 in the example embodiment are listed in Table 12C. Configuring lens system 1010 according to the arrangement of the power distribution of the lens elements, and adjusting the radii of curvature and aspheric coefficient as shown in Tables 12A-12E, the total track length (TTL), of the lens system 1010 may be reduced (e.g., to 13.80 mm as shown in Table 12A) and aberration of the system may effectively be corrected to obtain optical performance of high image quality resolution, for an object scene at infinity and for an object scene located <1000 mm distance, in a small form factor camera 1000.

Figure 23:
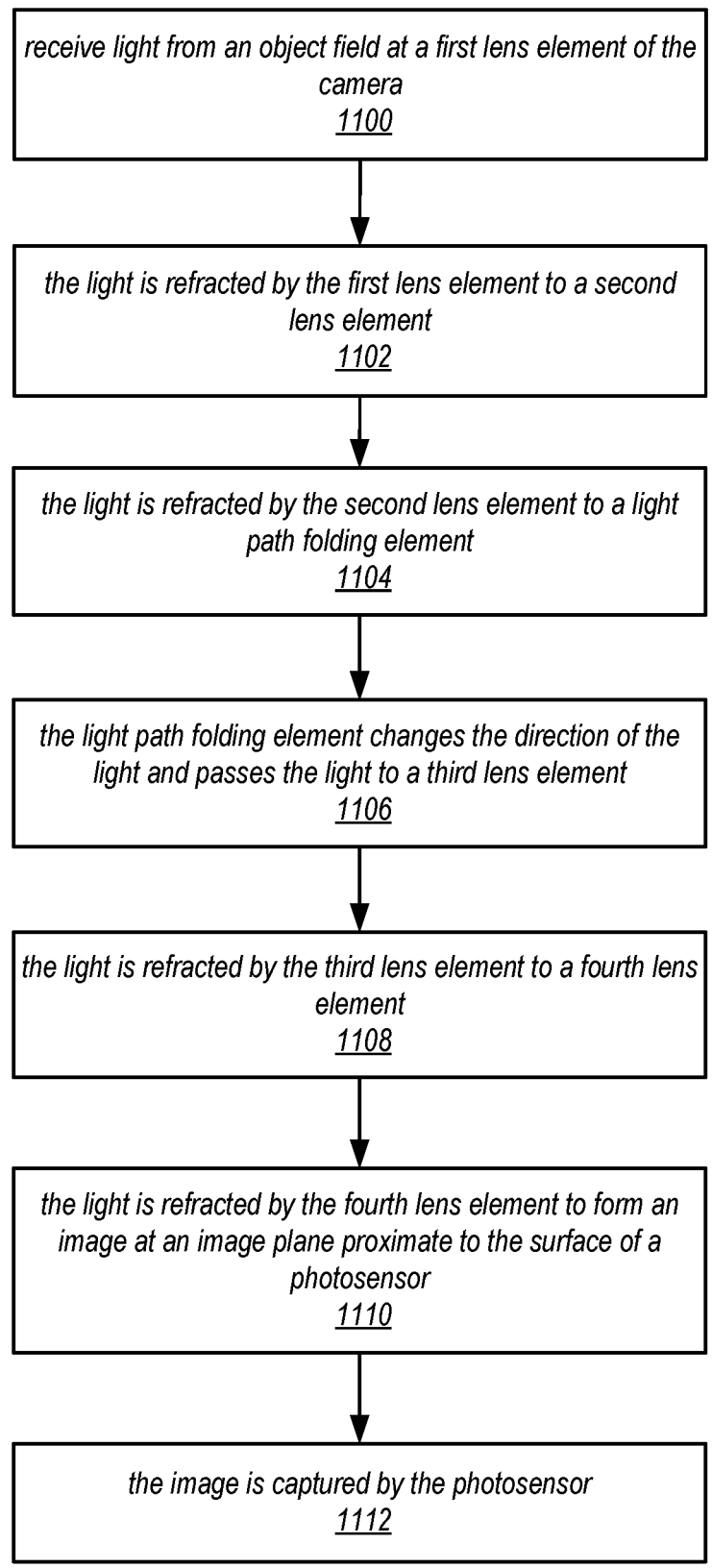
FIG. 23 is a high-level flowchart of a method for capturing images using a camera including a folded telephoto lens system as illustrated in FIGS. 1A through 22B, according to at least some embodiments.

FIG. 23 is a high-level flowchart of a method for capturing images using a camera with a folded telephoto lens system as illustrated in FIGS. 1A through 22B, according to at least some embodiments. As indicated at 1100, light from an object field in front of the camera is received at a first lens element of the camera. In some embodiments, an aperture stop may be located at the front vertex of the lens system, or between the front vertex and the object plane. Alternatively, the aperture stop may be located behind the front vertex of the lens system, for example at the first lens element, or between the first and second lens elements. As indicated at 1102, the first lens element refracts the light to a second lens element. As indicated at 1104, the light is then refracted by the second lens element to a light path folding element with a reflecting surface (e. g., a prism or plane mirror). As indicated at 1106, the light path folding element changes the direction of the light to direct the light to a third lens element. As indicated at 1108, the light is then refracted by the third lens element to a fourth lens element. As indicated at 1110, the light is refracted by the fourth lens element to form an image at an image plane at or near the surface of a photosensor. As indicated at 1112, the image may be captured by the photosensor. While not shown, in some embodiments, the light may pass through an infrared filter that may for example be located between the fourth lens element and the photosensor.

Summarizing, the incoming light from the object field passes through the refracting optical surfaces of the optical elements located on a first optical axis, AX1 (e.g., the first and second lens elements). A reflecting surface of the light path folding element changes the direction of the incoming light from the first optical axis AX1 to a second optical axis, AX2, and the incoming light on the second optical axis passes through the refracting elements (the third and fourth lens elements) to the image plane at or near the photosensor on the second optical axis.

In some embodiments, the optical elements may be configured as illustrated in FIGS. 1A and 1B and according to the optical prescription provided in Tables 1A-1D. Alternatively, the optical elements may be configured as illustrated in FIGS. 3A and 3B and according to the optical prescription provided in Tables 2A-2E. As yet another alternative, the optical elements may be configured as illustrated in FIGS. 5A and 5B and according to the optical prescription provided in Tables 3A-3E. As yet another alternative, the optical elements may be configured as illustrated in FIGS. 7A and 7B and according to the optical prescription provided in Tables 4A-4E. As yet another alternative, the optical elements may be configured as illustrated in FIGS. 9A and 9B and according to the optical prescription provided in Tables 5A-5E. As yet another alternative, the optical elements may be configured as illustrated in FIGS. 11A and 11B and according to the optical prescription provided in Tables 6A-6E. As yet another alternative, the optical elements may be configured as illustrated in FIGS. 13A and 13B and according to the optical prescription provided in Tables 7A-7E. As yet another alternative, the optical elements may be configured as illustrated in FIG. 15A and according to the optical prescription provided in Tables 8A-8E. As yet another alternative, the optical elements may be configured as illustrated in FIG. 16A and according to the optical prescription provided in Tables 9A-9E. As yet another alternative, the optical elements may be configured as illustrated in FIGS. 17A and 17B and according to the optical prescription provided in Tables 10A-10E. As yet another alternative, the optical elements may be configured as illustrated in FIGS. 19A and 19B and according to the optical prescription provided in Tables 11A-11E. As yet another alternative, the optical elements may be configured as illustrated in FIGS. 21A and 21B and according to the optical prescription provided in Tables 12A-12E. However, note that variations on the examples given in the Figures and Tables are possible while achieving similar optical results.

Example Lens System Tables

The following Tables provide example values for various optical and physical parameters of example embodiments of the folded telephoto lens systems and cameras as described herein in reference to FIGS. 1A through 21B. Tables 1A-1D correspond to an example embodiment of lens system 110 with four lens elements and fold mirror as illustrated in FIGS. 1A-1B. Tables 2A-2E provide example values of various optical and physical parameters of an example embodiment of a camera 200 and lens system 210 as illustrated in FIGS. 3A and 3B. Tables 3A-3E provide example values of various optical and physical parameters of an example embodiment of a camera 300 and lens system 310 as illustrated in FIGS. 5A and 5B. Tables 4A-4E provide example values of various optical and physical parameters of an example embodiment of a camera 400 and lens system 410 as illustrated in FIGS. 7A and 7B. Tables 5A-5E provide example values of various optical and physical parameters of an example embodiment of a camera 500 and lens system 510 as illustrated in FIGS. 9A and 9B. Tables 6A-6E provide example values of various optical and physical parameters of an example embodiment of a camera 600 and lens system 610 as illustrated in FIGS. 11A and 11B. Tables 7A-7E provide example values of various optical and physical parameters of an example embodiment of a camera 700 and lens system 710 as illustrated in FIGS. 13A and 13B. Tables 8A-8E provide example values of various optical and physical parameters of folded telephoto lens system 710B as illustrated in FIG. 15A. Tables 9A-9E provide example values of various optical and physical parameters of folded telephoto lens system 710C as illustrated in FIG. 16A. Tables 10A-10E provide example values of various optical and physical parameters of an example embodiment of a camera 800 and lens system 810 as illustrated in FIGS. 17A and 17B. Tables 11A-11E provide example values of various optical and physical parameters of an example embodiment of a camera 900 and lens system 910 as illustrated in FIGS. 19A and 19B. Tables 12A-12E provide example values of various optical and physical parameters of an example embodiment of a camera 1000 and lens system 1010 as illustrated in FIGS. 21A and 21B.

In the Tables, all dimensions are in millimeters (mm) unless otherwise specified. "S#" stands for surface number. A positive radius indicates that the center of curvature is to the right of the surface. A negative radius indicates that the center of curvature is to the left of the surface. "INF" stands for infinity (as used in optics). "ASP" indicates an aspheric surface, and "FLT" indicates a flat surface. The thickness (or separation) is the axial distance to the next surface. The design wavelengths represent wavelengths in the spectral band of the imaging optical system.

In the Tables, note the following sign convention on the optical parameters (e.g., radii of curvature and axial thickness or separation, focal lengths) when the direction of the light path change after reflecting from the mirror surface or prism surface. Following a reflecting surface element, a positive radius indicates that the center of curvature is to the left of the surface, a negative radius indicates that the center of curvature is to the right of the surface, and the thickness or axial separation has negative sign. This sign convention is well known to those skilled in the art of optical design. In the Tables the absolute value of the system focal length f is listed.

For the materials of the lens elements and IR filter, a refractive index $N_d$ at the helium d-line wavelength is provided, as well as an Abbe number $V_d$ relative to the d-line and the C- and F-lines of hydrogen. The Abbe number, $V_d$, may be defined by the equation:

$$V_d = (N_d - 1)/(N_F - N_C),$$

where $N_F$ and $N_C$ are the refractive index values of the material at the F and C lines of hydrogen, respectively.

Referring to the Tables of aspheric constants (Tables 1C, 2C, 3C, 4C, 5C, 6C, 7C, 8C, 9C, 10C, 11C, and 12C), the aspheric equation describing an aspherical surface may be given by:

$$Z = \frac{cr^2}{1 + \sqrt{1 - (1+K)c^2 r^2}} + Ar^4 + Br^6 + Cr^8 + Dr^{10} + Er^{12} + Fr^{14} + Gr^{16} + Hr^{18} + \ldots$$

where Z is the sag of the surface parallel to the Z-axis (for all embodiments the Z-axis coincide with the optical axis), c is the curvature of the surface (the reciprocal of the radius of curvature of the surface), K is the conic constant, and A, B, C, D, E, F, G, and H are the aspheric coefficients. In the Tables "E" denotes exponential notation (powers of 10).

In Tables (1D-12D), the decentering constants of the reflecting surface in the fold mirror or prism element are listed for the example embodiments. As shown in Tables 1D-12D, the reflecting surface of the fold mirror or prism is oriented 45 degrees relative to the optical axis of L1 and L2 and thus the folded optical axis of L3 and L4 is configured to be 90 degrees relative to the optical axis of L1 and L2. However, the angular orientation of the reflecting surface of the fold mirror or prism element may be configured to a desired value to suit a desired light path direction and lens system packaging requirements.

Note that the values given in the following Tables for the various parameters in the various embodiments of the folded telephoto lens system are given by way of example and are not intended to be limiting. For example, one or more of the parameters for one or more of the surfaces of one or more of the lens elements in the example embodiments, as well as parameters for the materials of which the elements are composed, may be given different values while still providing similar performance for the lens system. In particular, note that some of the values in the Tables may be scaled up or down for larger or smaller implementations of a camera using an embodiment of a folded telephoto lens system as described herein.

Further note that the surface numbers (S#) of the elements in the various embodiments of the folded telephoto lens system as shown in the Tables are listed from the first surface 0 at the object plane to the last surface at the image plane. Since number and location of element may vary in embodiments, the surface number(s) that correspond to some elements may vary in the different Tables. For example, in the first sets of Tables (e.g., Tables 1B, 6B, 7B, 8B, 9B, 11B), the aperture stop is surface 3, and the first lens element (L1) has surfaces 1 and 2. However, in Tables 2B, 3B, 4B, 5B, 10B, and 12B, the location of the aperture stop is different, and thus the surface numbers are different in the Tables. For example, in Tables 2B, 3B, 4B, 5B, 10B, and 12B, the aperture stop is surface 2, and the first lens element (L1) has surfaces 4 and 5. In particular, note that where reference is given to the radius of curvature (R#) of the surfaces of the lens element (L#) in this document, the reference (R#) used (e.g., R1 and R2 for the surfaces of lens element L1) are the same for all of the embodiments, and may but do not necessarily correspond to the surface numbers of the lens elements as given in the Tables.

In some embodiments the folded telephoto lens system is a zoom system equipped and configured with a moving lens group or element for focusing. Further note that the zoom parameters of the example embodiments are denoted by an asterisk (*) in Tables 2B-12B and also listed in the Tables for zoom parameters (i.e., Tables 2E-12E). The zoom parameters are the axial separation or space separation that changes when the lens system is zoomed to focus from an object scene at infinity (object distance ≥20 meters) to a nearby object scene located at <1 meter from the camera. In some embodiments (e.g., Tables 2B, 3B, 4B, 5B, and 6B) the focusing lens group, (GR1), includes the lens elements L1 and L2 and the aperture stop. The axial position of GR1 when the folded telephoto lens system is focused at infinity is denoted by position 1 and the corresponding axial position of GR1 when the lens system is focused at nearby object scene is denoted by position 2. Example embodiments of a folded telephoto lens system in which the lens system may include a rail and mechanism to translate or actuate the axial position of GR1 for focusing are illustrated in FIGS. 3A, 5A, 7A, 9A, and 11A, and the corresponding zoom parameters are shown in Tables 2E, 3E, 4E, 5E, and 6E. For example in the embodiment as illustrated in FIG. 5A, GR1 may be displaced or translated from its axial position 1 (i.e., its focus position for an object scene at infinity) by about 0.215 mm to position 2 (as shown in Table 3E) for the telephoto system to focus a nearby object scene located 500 mm from the camera. In another example embodiment as illustrated in FIG. 9A, GR1 may be displaced or translated from its axial position 1 (i.e., its focus position for an object scene at infinity) by about 0.12 mm to position 2 (as shown in Table 5E) for the telephoto system to focus a nearby object located 500 mm from the camera.

Note that the choice of GR1 as a movable or focusing group for the various embodiments of the folded telephoto lens systems in Tables 2B-E, 3B-E, 4B-E, 5B-E, and 6B-E are given by way of example and are not intended to be limiting. For example, a focusing group, GR2, including the lens elements L3 and L4 in the folded axis may be used while still providing similar performance for the folded telephoto lens system. Moreover, the object distance or focus displacement range of the focusing lens group may be scaled up or down for larger or smaller implementations of a camera using an embodiment of a folded telephoto lens system as described herein.

In some embodiments the folded telephoto lens system is a zoom system in which the photosensor may be moved or translated for focusing an object scene from infinity (object distance ≥20 meters) to a near distance, e.g. less than a meter. Example embodiments of folded telephoto lens systems in which the photosensor is the focusing element are illustrated in FIGS. 13A, 17A, 19A, and 21A, with corresponding optical design prescriptions given in Tables 7A-7E, 8A-8E, 9A-9E, 10A-10E, 11A-11E, and 12A-12E. Further note that the zoom parameters of the example embodiments are denoted by an asterisk (*) in these Tables. The zoom parameters are the axial separation or space separation of the photosensor at the image plane that changes when the lens system is zoomed to focus from an object scene at infinity (object distance ≥20 meters, denoted by zoom position 1) to a nearby object scene located at <1 meter (denoted by zoom position 2) from the camera. For example in the embodiment as illustrated in FIG. 13A, a particular example of a telephoto lens system with optical axis folded using a prism with lens design prescription given in Table 9A-9E, the photosensor at the image plane may be displaced or translated or actuated from its axial position 1 (i. e., its focus position for an object scene at infinity) by about 0.194 mm to position 2 (as shown by the zoom parameters in Table 9E) for the telephoto system to focus a nearby object scene located 1 meter away from the camera. In another example embodiment as illustrated in FIG. 17A, a particular example of a telephoto lens system with optical axis folded using a plane mirror with lens design prescription given in Tables 10A-10E, the photosensor at the image plane may be displaced or translated or actuated from its axial position 1 by about 0.195 mm to position 2 (as shown by the zoom parameters in Table 10E) for the telephoto system to focus a nearby object located 1 meter distance from the camera.

TABLE 1A

| | |
|---|---|
| Focal length (f) | 10.0 mm |
| F-Number | 2.8 |
| Half FOV | 12_° |
| Total track length TTL | 8.8 |
| Telephoto ratio (TTL/f) | 0.880 |
| Design wavelengths | 650 nm, 610 nm, 555 nm, 510 nm, 470 nm |

TABLE 1B

| Element | Surface (S#) | Radius R | Shape | Thickness Or Separation | Material | Refractive Index $N_d$ | Abbe Number $V_d$ |
|---|---|---|---|---|---|---|---|
| Object plane | 0 | INF | FLT | INF | | | |
| L1 | 1 | 2.489 | ASP | 1.1892 | Plastic | 1.544 | 56.1 |
| | 2 | −33.023 | ASP | 0.1023 | | | |
| Aperture Stop | 3 | INF | FLT | 0.1286 | | | |
| L2 | 4 | 6.517 | ASP | 0.4155 | Plastic | 1.632 | 23.3 |
| | 5 | 2.275 | ASP | 2.1916 | | | |
| | Decenter(1) | | | | | | |
| Mirror | 6 | INF | FLT | −2.1916 | Refl | | |
| | Bend(1) | | | | | | |
| L3 | 7 | −28.082 | ASP | −0.5675 | Plastic | 1.544 | 56.1 |
| | 8 | −2.339 | ASP | −0.1236 | | | |
| L4 | 9 | −6.571 | ASP | −0.7883 | Plastic | 1.632 | 23.3 |
| | 10 | 11.711 | ASP | −0.2073 | | | |
| IR filter | 11 | INF | FLT | −0.3000 | Glass | 1.516 | 64.1 |
| | 12 | INF | FLT | −0.5852 | | | |
| Image plane | 13 | INF | FLT | | | | |

TABLE 1C

ASPHERIC CONSTANTS

| S# | Curvature (c) | K | A / E | B / F | C / G | D / H |
|---|---|---|---|---|---|---|
| 1 | 0.40170668 | 0.47210442 | −1.19980E−03 | −4.55996E−03 | 2.22996E−03 | −7.51167E−04 |
| | | | 7.45241E−05 | 0.00000E+09 | 0.00000E+00 | 0.00000E+00 |
| 2 | −0.03028212 | 0.00000000 | 8.85341E−03 | −3.00683E−03 | 2.03529E−04 | 3.78264E−04 |
| | | | −1.52828E−04 | 2.93711E−05 | 0.00000E+00 | 0.00000E+00 |
| 4 | 0.15343691 | −2.47026832 | −6.02965E−03 | 3.72173E−03 | −5.06520E−03 | 2.81896E−03 |
| | | | −4.62047E−04 | 0.00000E+00 | 0.00000E+00 | 0.00000E+00 |
| 5 | 0.43958924 | −5.00998338 | 4.66655E−02 | −1.23712E−02 | 1.13551E−02 | −8.65658E−03 |
| | | | 5.07613E−03 | −1.05505E−03 | 0.00000E+00 | 0.00000E+00 |
| 7 | −0.03561002 | 0.00000000 | 7.58585E−02 | −8.42664E−03 | −2.48418E−03 | 6.75744E−04 |
| | | | 1.02719E−04 | −3.89598E−05 | 0.00000E+00 | 0.00000E+00 |
| 8 | −0.42753025 | 0.00000000 | 8.62773E−02 | −1.20125E−02 | 3.12257E−04 | 4.60730E−04 |
| | | | −6.26149E−05 | 0.00000E+00 | 0.00000E+00 | 0.00000E+00 |
| 9 | −0.15219201 | 0.00000000 | 9.93244E−03 | −3.33689E−03 | 1.53672E−04 | 1.37639E−04 |
| | | | 0.00000E+00 | 0.00000E+00 | 0.00000E+00 | 0.00000E+00 |
| 10 | 0.08539012 | 0.00000000 | 2.25546E−02 | −1.19528E−02 | 1.78162E−03 | 2.54279E−05 |
| | | | 0.00000E+00 | 0.00000E+00 | 0.00000E+00 | 0.00000E+00 |

TABLE 1D

DECENTERING CONSTANTS

| Decenter | X | Y | Z | Alpha (degrees) | Beta (degrees) | Gamma (degrees) |
|---|---|---|---|---|---|---|
| D(1) and Bend (1) | 0.000 | 0.000 | 0.000 | 45.000 | 0.000 | 0.000 |

TABLE 2A

| | |
|---|---|
| Focal length (f) | 14.0 mm |
| F-Number | 2.8 |
| Half FOV | 9.5]° |
| Total track length TTL | 13.6 |
| Telephoto ratio (TTL/f) | 0.971 |
| Design wavelengths | 650 nm, 610 nm, 555 nm, 510 nm, 470 nm |

TABLE 2B

| Element | Surface (S#) | Radius R | Shape | Thickness Or Separation | Material | Refractive Index $N_d$ | Abbe Number $V_d$ |
|---|---|---|---|---|---|---|---|
| Object plane | 0 | INF | FLT | INF *1 | | | |
| | 1 | INF | FLT | 0.7500 | | | |
| Aperture Stop | 2 | INF | FLT | −0.7500 | | | |
| | 3 | INF | FLT | 0.0000 | | | |
| L1 | 4 | 4.482 | ASP | 1.2406 | Plastic | 1.544 | 56.1 |
| | 5 | −30.806 | ASP | 0.1000 | | | |
| L2 | 6 | −9.962 | ASP | 0.3000 | Plastic | 1.632 | 23.3 |
| | 7 | 387.112 | ASP | 0.4594 *2 | | | |
| | 8 | INF | | 2.500 | | | |
| Decenter (1) | | | | | | | |

TABLE 2B-continued

| Element | Surface (S#) | Radius R | Thickness Or Shape Separation | | Material | Refractive Index $N_d$ | Abbe Number $V_d$ |
|---|---|---|---|---|---|---|---|
| Fold Mirror | 9 | INF | FLT | −2.500 | Refl | | |
| Bend (1) | | | | | | | |
| | 10 | INF | FLT | −1.2921 | | | |
| L3 | 11 | −4.391 | ASP | −0.4600 | Plastic | 1.544 | 56.1 |
| | 12 | −2.870 | ASP | −1.8939 | | | |
| L4 | 13 | −4.509 | ASP | −1.0328 | Plastic | 1.632 | 23.3 |
| | 14 | −4.336 | ASP | −0.6616 | | | |
| IR filter | 15 | INF | FLT | −0.3000 | Glass | 1.516 | 64.1 |
| | 16 | INF | FLT | −0.8596 | | | |
| Image plane | 17 | INF | FLT | | | | |

TABLE 2C

ASPHERIC CONSTANTS

| S# | Curvature (c) | K | A<br>E | B<br>F | C<br>G | D<br>H |
|---|---|---|---|---|---|---|
| 4 | 0.22313714 | 1.20747815 | 2.18925E−03<br>1.25335E−06 | −4.15897E−04<br>0.00000E+00 | 1.57623E−04<br>0.00000E+00 | −2.25930E−05<br>0.00000E+00 |
| 5 | −0.03246104 | 0.00000000 | −7.43087E−05<br>7.10947E−06 | 8.40447E−04<br>−3.45484E−07 | −3.24246E−05<br>0.00000E+00 | −4.07050E−05<br>0.00000E+00 |
| 6 | −0.10038639 | 0.00000000 | 1.69399E−02<br>0.00000E+00 | −1.79418E−03<br>0.00000E+00 | 7.82291E−05<br>0.00000E+00 | 5.06342E−07<br>0.00000E+00 |
| 7 | 0.258323E−02 | 0.00000000 | 1.88597E−02<br>3.39851E−07 | −2.90690E−03<br>0.00000E+00 | 3.47662E−04<br>0.00000E+00 | −1.97174E−05<br>0.00000E+00 |
| 11 | −0.22774223 | 0.00000000 | 1.01087E−02<br>0.00000E+00 | 1.11881E−03<br>0.00000E+00 | −7.70792E−05<br>0.00000E+00 | 0.00000E+00<br>0.00000E+00 |
| 12 | −0.34846896 | 0.00000000 | 1.39314E−02<br>0.00000E+00 | 1.23303E−03<br>0.00000E+00 | −3.71598E−05<br>0.00000E+00 | 0.00000E+00<br>0.00000E+00 |
| 13 | −0.22177011 | 0.00000000 | 1.27671E−02<br>0.00000E+00 | −1.14186E−04<br>0.00000E+00 | 3.59233E−05<br>0.00000E+00 | 0.00000E+00<br>0.00000E+00 |
| 14 | −0.23061022 | 0.00000000 | 1.85383E−02<br>0.00000E+00 | −1.75209E−04<br>0.00000E+00 | 0.00000E+00<br>0.00000E+00 | 0.00000E+00<br>0.00000E+00 |

TABLE 2D

DECENTERING CONSTANTS

| Decenter | X | Y | Z | Alpha (degrees) | Beta (degrees) | Gamma (degrees) |
|---|---|---|---|---|---|---|
| D(1) and Bend (1) | 0.000 | 0.000 | 0.000 | 45.000 | 0.000 | 0.000 |

TABLE 2E

ZOOM PARAMETERS

| *Zoom Parameters | Position-1 | Position-2 |
|---|---|---|
| *1 | INF | 500.0000 mm |
| *2 | 0.4594 mm | 0.7756 mm |

TABLE 3A

| | |
|---|---|
| Focal length (f) | 14.0 mm |
| F-Number | 2.8 |
| Half FOV | 9.5]° |
| Total track length TTL | 14.0 |
| Telephoto ratio (TTL/f) | 1.0 |
| Design wavelengths | 650 nm, 610 nm, 555 nm, 510 nm, 470 nm |

TABLE 3B

| Element | Surface (S#) | Radius R | Shape | Thickness Or Separation | Material | Refractive Index $N_d$ | Abbe Number $V_d$ |
|---|---|---|---|---|---|---|---|
| Object plane | 0 | INF | FLT | INF *1 | | | |
| | 1 | INF | FLT | 0.7500 | | | |
| Aperture Stop | 2 | INF | FLT | −0.7500 | | | |
| | 3 | INF | FLT | 0.0000 | | | |
| L1 | 4 | 4.338 | ASP | 1.2309 | Plastic | 1.544 | 56.1 |
| | 5 | −18.372 | ASP | 0.1001 | | | |
| L2 | 6 | −7.831 | ASP | 0.3003 | Plastic | 1.632 | 23.3 |
| | 7 | −41.341 | ASP | 0.3687 *2 | | | |
| | 8 | INF | | 2.500 | Glass | 1.516 | 64.1 |
| | Decenter (1) | | | | | | |
| Prism | 9 | INF | FLT | −2.500 | Refl | | |
| | Bend (1) | | | | | | |
| | 10 | INF | FLT | −2.2538 | | | |
| L3 | 11 | −24.767 | ASP | −0.3000 | Plastic | 1.544 | 56.1 |
| | 12 | −4.726 | ASP | −2.3748 | | | |
| L4 | 13 | −3.280 | ASP | −0.4299 | Plastic | 1.632 | 23.3 |
| | 14 | −3.249 | ASP | −0.6499 | | | |
| IR filter | 15 | INF | FLT | −0.3000 | Glass | 1.516 | 64.1 |
| | 16 | INF | FLT | −0.6913 | | | |
| Image plane | 17 | INF | FLT | | | | |

TABLE 3C

ASPHERIC CONSTANTS

| S# | Curvature (c) | K | A / E | B / F | C / G | D / H |
|---|---|---|---|---|---|---|
| 4 | 0.23052084 | −1.14413857 | 2.25289E−03 | −4.35985E−04 | 1.58126E−04 | −2.19956E−05 |
| | | | 1.26707E−06 | 0.00000E+00 | 0.00000E+00 | 0.00000E+00 |
| 5 | −0.05443033 | 0.00000000 | −1.44949E−04 | 8.53033E−04 | −2.98583E−05 | −4.00958E−05 |
| | | | 6.97172E−06 | −3.43148E−07 | 0.00000E+00 | 0.00000E+00 |
| 6 | −0.12769868 | 0.00000000 | 1.69726E−02 | −1.80031E−03 | 7.69661E−05 | 2.47266E−07 |
| | | | 0.00000E+00 | 0.00000E+00 | 0.00000E+00 | 0.00000E+00 |
| 7 | −0.02418909 | −7.00000000 | 1.84888E−02 | −2.91139E−03 | 3.37520E−04 | −2.07874E−05 |
| | | | 6.34032E−07 | 0.00000E+00 | 0.00000E+00 | 0.00000E+00 |
| 11 | −0.04037587 | 0.00000000 | 1.90995E−02 | 3.44071E−04 | −1.04565E−04 | 0.00000E+00 |
| | | | 0.00000E+00 | 0.00000E+00 | 0.00000E+00 | 0.00000E+00 |
| 12 | −0.21161332 | 0.00000000 | 1.63295E−02 | 4.10809E−05 | −1.16671E−04 | 0.00000E+00 |
| | | | 0.00000E+00 | 0.00000E+00 | 0.00000E+00 | 0.00000E+00 |
| 13 | −0.30488896 | 0.00000000 | 9.69672E−03 | 5.27266E−05 | 5.46157E−06 | 0.00000E+00 |
| | | | 0.00000E+00 | 0.00000E+00 | 0.00000E+00 | 0.00000E+00 |
| 14 | −0.30780162 | 0.00000000 | 1.39980E−02 | 1.30106E−04 | 0.00000E+00 | 0.00000E+00 |
| | | | 0.00000E+00 | 0.00000E+00 | 0.00000E+00 | 0.00000E+00 |

TABLE 3D

DECENTERING CONSTANTS

| Decenter | X | Y | Z | Alpha (degrees) | Beta (degrees) | Gamma (degrees) |
|---|---|---|---|---|---|---|
| D(1) and Bend (1) | 0.000 | 0.000 | 0.000 | 45.000 | 0.000 | 0.000 |

TABLE 3E

ZOOM PARAMETERS

| *Zoom Parameters | Position-1 | Position-2 |
|---|---|---|
| *1 | INF | 500.0000 mm |
| *2 | 0.3687 mm | 0.5841 mm |

TABLE 4A

| | |
|---|---|
| Focal length (f) | 14.0 mm |
| F-Number | 2.8 |
| Half FOV | 13.0 ° |
| Total track length TTL | 13.65 |
| Telephoto ratio ( TTL/f) | 0.975 |
| Design wavelengths | 650 nm, 610 nm, 555 nm, 510 nm, 470 nm |

TABLE 4B

| Element | Surface (S#) | Radius R | Shape | Thickness Or Separation | Material | Refractive Index $N_d$ | Abbe Number $V_d$ |
|---|---|---|---|---|---|---|---|
| Object plane | 0 | INF | FLT | INF *1 | | | |
| | 1 | INF | FLT | 0.9500 | | | |
| Aperture Stop | 2 | INF | FLT | −0.9500 | | | |
| | 3 | INF | FLT | 0.0000 | | | |
| L1 | 4 | 3.546 | ASP | 1.2116 | Plastic | 1.544 | 56.1 |
| | 5 | 34.706 | ASP | 0.1000 | | | |
| L2 | 6 | 4.185 | ASP | 0.3304 | Plastic | 1.632 | 23.3 |
| | 7 | 2.570 | ASP | 1.058 *2 | | | |
| | 8 | INF | | 2.600 | | | |
| Decenter (1) | | | | | | | |
| Fold Mirror | 9 | INF | FLT | −2.600 | Refl | | |
| Bend (1) | | | | | | | |
| | 10 | INF | FLT | −1.1685 | | | |
| L3 | 11 | −6.125 | ASP | −0.8000 | Plastic | 1.544 | 56.1 |
| | 12 | −3.838 | ASP | −0.605 | | | |
| L4 | 13 | −6.139 | ASP | −1.2406 | Plastic | 1.632 | 23.3 |
| | 14 | −7.239 | ASP | −0.2353 | | | |
| IR filter | 15 | INF | FLT | −0.3000 | Glass | 1.516 | 64.1 |
| | 16 | INF | FLT | −1.4007 | | | |
| Image plane | 17 | INF | FLT | | | | |

TABLE 4C

ASPHERIC CONSTANTS

| S# | Curvature (c) | K | A / E | B / F | C / G | D / H |
|---|---|---|---|---|---|---|
| 4 | 0.28198896 | 0.54385086 | −8.97071E−04 | −9.60216E−04 | 2.36450E−04 | −3.98644E−05 |
| | | | 1.86235E−06 | 0.00000E+00 | 0.00000E+00 | 0.00000E+00 |
| 5 | 0.02881363 | 0.00000000 | 1.91639E−03 | −4.30535E−04 | 2.98399E−05 | 1.79192E−05 |
| | | | −5.17362E−06 | 4.63950E−07 | 0.00000E+00 | 0.00000E+00 |
| 6 | 0.23892744 | 0.00000000 | −4.17807E−03 | 1.73786E−04 | 8.87137E−06 | 0.00000E+00 |
| | | | 0.00000E+00 | 0.00000E+00 | 0.00000E+00 | 0.00000E+00 |
| 7 | 0.38917309 | 0.00000000 | −5.31055E−03 | −9.65246E−04 | 5.62061E−04 | −1.21186E−04 |
| | | | 8.07452E−06 | 0.00000E+00 | 0.00000E+00 | 0.00000E+00 |
| 11 | −0.16325655 | 0.00000000 | 3.50794E−03 | 3.67081E−04 | −3.26907E−05 | 1.51614E−07 |
| | | | 0.00000E+00 | 0.00000E+00 | 0.00000E+00 | 0.00000E+00 |
| 12 | −0.26056890 | 0.00000000 | 4.52217E−03 | 3.96480E−04 | −1.67156E−05 | 0.00000E+00 |
| | | | 0.00000E+00 | 0.00000E+00 | 0.00000E+00 | 0.00000E+00 |
| 13 | −0.16288652 | 0.00000000 | 5.45284E−03 | −2.82832E−04 | 3.06431E−05 | 0.00000E+00 |
| | | | 0.00000E+00 | 0.00000E+00 | 0.00000E+00 | 0.00000E+00 |
| 14 | −0.13813978 | 0.00000000 | 7.80530E−03 | −2.50679E−04 | 1.58616E−05 | 0.00000E+00 |
| | | | 0.00000E+00 | 0.00000E+00 | 0.00000E+00 | 0.00000E+00 |

TABLE 4D

DECENTERING CONSTANTS

| Decenter | X | Y | Z | Alpha (degrees) | Beta (degrees) | Gamma (degrees) |
|---|---|---|---|---|---|---|
| D(1) and Bend (1) | 0.000 | 0.000 | 0.000 | 45.000 | 0.000 | 0.000 |

TABLE 4E

ZOOM PARAMETERS

| *Zoom Parameters | Position-1 | Position-2 |
|---|---|---|
| *1 | INF | 1000.0000 mm |
| *2 | 1.0580 mm | 1.2608 mm |

TABLE 5A

| | |
|---|---|
| Focal length (f) | 14.0 mm |
| F-Number | 2.8 |
| Half FOV | 13.0]° |
| Total track length TTL | 13.8 |
| Telephoto ratio ( TTL/f) | 0.986 |
| Design wavelengths | 650 nm, 610 nm, 555 nm, 510 nm, 470 nm |

TABLE 5B

| Element | Surface (S#) | Radius R | Shape | Thickness Or Separation | Material | Refractive Index $N_d$ | Abbe Number $V_d$ |
|---|---|---|---|---|---|---|---|
| Object plane | 0 | INF | FLT | INF *1 | | | |
| | 1 | INF | FLT | 0.7500 | | | |
| Aperture Stop | 2 | INF | FLT | −0.7500 | | | |
| | 3 | INF | FLT | 0.0000 | | | |
| L1 | 4 | 3.618 | ASP | 1.4878 | Plastic | 1.544 | 56.1 |
| | 5 | −59.628 | ASP | 0.1219 | | | |
| L2 | 6 | 11.979 | ASP | 0.4773 | Plastic | 1.632 | 23.3 |
| | 7 | 4.374 | ASP | 0.8130 *2 | | | |
| | 8 | INF | | 2.400 | Glass | 1.516 | 64.1 |
| Decenter (1) | | | | | | | |
| Prism | 9 | INF | FLT | −2.400 | Refl | | |
| Bend (1) | | | | | | | |
| | 10 | INF | FLT | −2.1507 | | | |
| L3 | 11 | 5.178 | ASP | −0.4773 | Plastic | 1.544 | 56.1 |
| | 12 | −101.937 | ASP | −0.1496 | | | |
| L4 | 13 | −26.534 | ASP | −1.2293 | Plastic | 1.632 | 23.3 |
| | 14 | 58.901 | ASP | −0.9645 | | | |
| IR filter | 15 | INF | FLT | −0.3000 | Glass | 1.516 | 64.1 |
| | 16 | INF | FLT | −0.8287 | | | |
| Image plane | 17 | INF | FLT | | | | |

TABLE 5C

ASPHERIC CONSTANTS

| S# | Curvature (c) | K | A E | B F | C G | D H |
|---|---|---|---|---|---|---|
| 4 | 0.27640302 | 0.00000000 | −5.63077E−05 | 0.00000E+00 | 0.00000E+00 | 0.00000E+00 |
| | | | 0.00000E+00 | 0.00000E+00 | 0.00000E+00 | 0.00000E+00 |
| 5 | −0.01677063 | 0.00000000 | 1.93942E−03 | −6.28480E−05 | 0.00000E+00 | 0.00000E+00 |
| | | | 0.00000E+00 | 0.00000E+00 | 0.00000E+00 | 0.00000E+00 |
| 6 | 0.08347616 | 0.00000000 | 1.49766E−03 | 1.64055E−04 | −1.58262E−05 | 0.00000E+00 |
| | | | 0.00000E+00 | 0.00000E+00 | 0.00000E+00 | 0.00000E+00 |
| 7 | 0.22862733 | 0.00000000 | 2.65386E−03 | 8.18076E−04 | −9.40594E−05 | 2.29745E−05 |
| | | | 0.00000E+00 | 0.00000E+00 | 0.00000E+00 | 0.00000E+00 |
| 11 | 0.19312010 | 0.00000000 | 6.76209E−03 | 1.89354E−04 | −3.63715E−05 | 0.00000E+00 |
| | | | 0.00000E+00 | 0.00000E+00 | 0.00000E+00 | 0.00000E+00 |

TABLE 5C-continued

ASPHERIC CONSTANTS

| S# | Curvature (c) | K | A E | B F | C G | D H |
|---|---|---|---|---|---|---|
| 12 | −0.980997E−02 | 0.00000000 | 6.07998E−03 | 5.81915E−04 | −6.05979E−05 | 0.00000E+00 |
| | | | 0.00000E+00 | 0.00000E+00 | 0.00000E+00 | 0.00000E+00 |
| 13 | −0.03768697 | 0.00000000 | 6.93739E−03 | 3.61496E−04 | 0.00000E+00 | 0.00000E+00 |
| | | | 0.00000E+00 | 0.00000E+00 | 0.00000E+00 | 0.00000E+00 |
| 14 | 0.01697772 | 0.00000000 | 6.85996E−03 | −1.64325E−04 | 1.49222E−05 | 0.00000E+00 |
| | | | 0.00000E+00 | 0.00000E+00 | 0.00000E+00 | 0.00000E+00 |

TABLE 5D

DECENTERING CONSTANTS

| Decenter | X | Y | Z | Alpha (degrees) | Beta (degrees) | Gamma (degrees) |
|---|---|---|---|---|---|---|
| D(1) and Bend (1) | 0.000 | 0.000 | 0.000 | 45.000 | 0.000 | 0.000 |

TABLE 5E

ZOOM PARAMETERS

| *Zoom Parameters | Position-1 | Position-2 |
|---|---|---|
| *1 | INF | 1000.0000 mm |
| *2 | 0.8130 mm | 0.9337 mm |

TABLE 6A

| Focal length (f) | 14.0 mm |
|---|---|
| F-Number | 2.8 |
| Half FOV | 13.0_|° |
| Total track length TTL | 13.80 |
| Telephoto ratio (TTL/f) | 0.986 |
| Design wavelengths | 650 nm, |
| | 610 nm, |
| | 555 nm, |
| | 510 nm, |
| | 470 nm |

TABLE 6B

| Element | Surface (S#) | Radius R | Shape | Thickness Or Separation | Material | Refractive Index $N_d$ | Abbe Number $V_d$ |
|---|---|---|---|---|---|---|---|
| Object plane | 0 | INF | FLT | INF *1 | | | |
| L1 | 1 | 3.432 | ASP | 1.4878 | Plastic | 1.544 | 56.1 |
| | 2 | −427.795 | ASP | 0.1249 | | | |
| Aperture Stop | 3 | INF | FLT | 0.0000 | | | |
| L2 | 4 | 9.016 | ASP | 0.4773 | Plastic | 1.632 | 23.3 |
| | 5 | 3.744 | ASP | 0.8101 *2 | | | |
| Prism | 6 | INF | FLT | 2.4000 | Glass | 1.516 | 64.1 |
| Decenter(1) | | | | | | | |
| | 7 | INF | FLT | −2.4000 | Refl | | |
| Bend (1) | | | | | | | |
| | 8 | INF | FLT | −1.8069 | | | |
| L3 | 9 | 7.617 | ASP | −0.4773 | Plastic | 1.544 | 56.1 |
| | 10 | −19.736 | ASP | −0.2735 | | | |
| L4 | 11 | −19.527 | ASP | −1.2163 | Plastic | 1.632 | 23.3 |
| | 12 | 442.388 | ASP | −1.0074 | | | |
| IR filter | 13 | INF | FLT | −0.3000 | Glass | 1.516 | 64.1 |
| | 14 | INF | FLT | −1.0185 | | | |
| Image plane | 15 | INF | FLT | | | | |

TABLE 6C

ASPHERIC CONSTANTS

| S# | Curvature (c) | K | A E | B F | C G | D H |
|---|---|---|---|---|---|---|
| 1 | 0.29138806 | 0.00000000 | −1.44067E−04 | 0.00000E+00 | 0.00000E+00 | 0.00000E+00 |
| | | | 0.00000E+00 | 0.00000E+00 | 0.00000E+00 | 0.00000E+00 |
| 2 | −0.233757E−02 | 0.00000000 | 1.89869E−03 | −7.02580E−05 | 0.00000E+00 | 0.00000E+00 |
| | | | 0.00000E+00 | 0.00000E+00 | 0.00000E+00 | 0.00000E+00 |
| 4 | 0.11090854 | 0.00000000 | 1.59436E−03 | 1.21991E−04 | −1.96237E−05 | 0.00000E+00 |
| | | | 0.00000E+00 | 0.00000E+00 | 0.00000E+00 | 0.00000E+00 |
| 5 | 0.26712423 | 0.00000000 | 3.13985E−03 | 1.08838E−03 | −1.76427E−04 | 4.61768E−05 |
| | | | 0.00000E+00 | 0.00000E+00 | 0.00000E+00 | 0.00000E+00 |

TABLE 6C-continued

ASPHERIC CONSTANTS

| S# | Curvature (c) | K | A<br>E | B<br>F | C<br>G | D<br>H |
|---|---|---|---|---|---|---|
| 9 | 0.13128307 | 0.00000000 | 8.00460E−03<br>0.00000E+00 | 7.61401E−05<br>0.00000E+00 | −6.72293E−05<br>0.00000E+00 | 0.00000E+00<br>0.00000E+00 |
| 10 | −0.05066791 | 0.00000000 | 5.50266E−03<br>0.00000E+00 | 6.81569E−04<br>0.00000E+00 | −8.35284E−05<br>0.00000E+00 | 0.00000E+00<br>0.00000E+00 |
| 11 | −0.05121242 | 0.00000000 | 4.86978E−03<br>0.00000E+00 | 5.07665E−04<br>0.00000E+00 | 0.00000E+00<br>0.00000E+00 | 0.00000E+00<br>0.00000E+00 |
| 12 | 0.226046E−02 | 0.00000000 | 6.31481E−03<br>0.00000E+00 | −1.61244E−04<br>0.00000E+00 | 1.96753E−05<br>0.00000E+00 | 0.00000E+00<br>0.00000E+00 |

TABLE 6D

DECENTERING CONSTANTS

| Decenter | X | Y | Z | Alpha (degrees) | Beta (degrees) | Gamma (degrees) |
|---|---|---|---|---|---|---|
| D(1) and Bend (1) | 0.000 | 0.000 | 0.000 | 45.000 | 0.000 | 0.000 |

TABLE 6E

ZOOM PARAMETERS

| *Zoom Parameters | Position-1 | Position-2 |
|---|---|---|
| *1 | INF | 1000.0000 mm |
| *2 | 0.8101 mm | 0.9353 mm |

TABLE 7A

| | |
|---|---|
| Focal length (f) | 14.0 mm |
| F-Number | 2.8 |
| Half FOV | 13.0_|° |
| Total track length TTL | 13.80 |
| Telephoto ratio (TTL/f) | 0.986 |
| Design wavelengths | 650 nm, |
| | 610 nm, |
| | 555 nm, |
| | 510 nm, |
| | 470 nm |

TABLE 7B

| Element | Surface (S#) | Radius R | Shape | Thickness Or Separation | Material | Refractive Index $N_d$ | Abbe Number $V_d$ |
|---|---|---|---|---|---|---|---|
| Object plane | 0 | INF | FLT | INF *1 | | | |
| L1 | 1 | 3.499 | ASP | 1.4878 | Plastic | 1.544 | 56.1 |
| | 2 | −107.676 | ASP | 0.1781 | | | |
| Aperture Stop | 3 | INF | FLT | 0.0000 | | | |
| L2 | 4 | 10.358 | ASP | 0.4773 | Plastic | 1.632 | 23.3 |
| | 5 | 3.977 | ASP | 0.7568 | | | |
| Prism | 6 | INF | FLT | 2.4000 | Glass | 1.516 | 64.1 |
| Decenter(1) | | | | | | | |
| | 7 | INF | FLT | −2.4000 | Refl | | |
| Bend (1) | | | | | | | |
| | 8 | INF | FLT | −1.6868 | | | |
| L3 | 9 | 9.441 | ASP | −0.4773 | Plastic | 1.544 | 56.1 |
| | 10 | −12.500 | ASP | −0.4665 | | | |
| L4 | 11 | −16.258 | ASP | −1.1784 | Plastic | 1.632 | 23.3 |
| | 12 | −279.920 | ASP | −0.9981 | | | |
| IR filter | 13 | INF | FLT | −0.3000 | Glass | 1.516 | 64.1 |
| | 14 | INF | FLT | −0.9929 *2 | | | |
| Image plane | 15 | INF | FLT | | | | |

TABLE 7C

ASPHERIC CONSTANTS

| S# | Curvature (c) | K | A<br>E | B<br>F | C<br>G | D<br>H |
|---|---|---|---|---|---|---|
| 1 | 0.28583608 | 0.00000000 | −1.19539E−05<br>0.00000E+00 | 0.00000E+00<br>0.00000E+00 | 0.00000E+00<br>0.00000E+00 | 0.00000E+00<br>0.00000E+00 |
| 2 | −0.928709E−02 | 0.00000000 | 1.95937E−03<br>0.00000E+00 | −7.07338E−05<br>0.00000E+00 | 0.00000E+00<br>0.00000E+00 | 0.00000E+00<br>0.00000E+00 |
| 4 | 0.09654674 | 0.00000000 | 9.13450E−04<br>0.00000E+00 | 2.40771E−04<br>0.00000E+00 | −2.37733E−05<br>0.00000E+00 | 0.00000E+00<br>0.00000E+00 |

TABLE 7C-continued

ASPHERIC CONSTANTS

| S# | Curvature (c) | K | A<br>E | B<br>F | C<br>G | D<br>H |
|---|---|---|---|---|---|---|
| 5 | 0.25144903 | 0.00000000 | 2.39937E−03<br>0.00000E+00 | 9.75313E−04<br>0.00000E+00 | −1.00714E−04<br>0.00000E+00 | 3.16440E−05<br>0.00000E+00 |
| 9 | 0.10592131 | 0.00000000 | 1.26288E−02<br>0.00000E+00 | 6.63474E−05<br>0.00000E+00 | −7.62897E−05<br>0.00000E+00 | 0.00000E+00<br>0.00000E+00 |
| 10 | −0.07999826 | 0.00000000 | 8.98375E−03<br>0.00000E+00 | 6.82970E−04<br>0.00000E+00 | −8.21604E−05<br>0.00000E+00 | 0.00000E+00<br>0.00000E+00 |
| 11 | −0.06150852 | 0.00000000 | 3.11410E−03<br>0.00000E+00 | 7.80267E−04<br>0.00000E+00 | 0.00000E+00<br>0.00000E+00 | 0.00000E+00<br>0.00000E+00 |
| 12 | −0.357245E−02 | 0.00000000 | 5.27002E−03<br>0.00000E+00 | 3.43482E−05<br>0.00000E+00 | 1.19644E−05<br>0.00000E+00 | 0.00000E+00<br>0.00000E+00 |

TABLE 7D

DECENTERING CONSTANTS

| Decenter | X | Y | Z | Alpha (degrees) | Beta (degrees) | Gamma (degrees) |
|---|---|---|---|---|---|---|
| D(1) and Bend (1) | 0.000 | 0.000 | 0.000 | 45.000 | 0.000 | 0.000 |

TABLE 7E

ZOOM PARAMETERS

| *Zoom Parameters | Position-1 | Position-2 |
|---|---|---|
| *1 | INF | 1000.0000 mm |
| *2 | −0.9929 mm | −1.1865 mm |

TABLE 8A

| | |
|---|---|
| Focal length (f) | 14.0 mm |
| F-Number | 2.8 |
| Half FOV | 13.0_!° |
| Total track length TTL | 13.80 |
| Telephoto ratio (TTL/f) | 0.986 |
| Design wavelengths | 650 nm, 610 nm, 555 nm, 510 nm, 470 nm |

TABLE 8B

| Element | Surface (S#) | Radius R | Shape | Thickness Or Separation | Material | Refractive Index $N_d$ | Abbe Number $V_d$ |
|---|---|---|---|---|---|---|---|
| Object plane | 0 | INF | FLT | INF *1 | | | |
| L1 | 1 | 3.522 | ASP | 1.4878 | Plastic | 1.544 | 56.1 |
| | 2 | −71.013 | ASP | 0.1940 | | | |
| Aperture Stop | 3 | INF | FLT | 0.0000 | | | |
| L2 | 4 | 10.256 | ASP | 0.4773 | Plastic | 1.632 | 23.3 |
| | 5 | 3.971 | ASP | 0.7409 | | | |
| Prism | 6 | INF | FLT | 2.4000 | Glass | 1.516 | 64.1 |
| Decenter (1) | | | | | | | |
| | 7 | INF | FLT | −2.4000 | Refl | | |
| Bend (1) | | | | | | | |
| | 8 | INF | FLT | −1.5751 | | | |
| L3 | 9 | 8.434 | ASP | −0.4773 | Plastic | 1.544 | 56.1 |
| | 10 | −14.716 | ASP | −0.4940 | | | |
| L4 | 11 | −28.490 | ASP | −1.4485 | Plastic | 1.632 | 23.3 |
| | 12 | 56.728 | ASP | −0.9833 | | | |
| IR filter | 13 | INF | FLT | −0.3000 | Glass | 1.516 | 64.1 |
| | 14 | INF | FLT | −0.8218 *2 | | | |
| Image plane | 15 | INF | FLT | | | | |

TABLE 8C

ASPHERIC CONSTANTS

| S# | Curvature (c) | K | A<br>E | B<br>F | C<br>G | D<br>H |
|---|---|---|---|---|---|---|
| 1 | 0.28395906 | −0.517598E−02 | 0.00000E+00<br>0.00000E+00 | 0.00000E+00<br>0.00000E+00 | 0.00000E+00<br>0.00000E+00 | 0.00000E+00<br>0.00000E+00 |
| 2 | −0.01408199 | 0.00000000 | 1.81178E−03<br>0.00000E+00 | −5.54784E−05<br>0.00000E+00 | 0.00000E+00<br>0.00000E+00 | 0.00000E+00<br>0.00000E+00 |
| 4 | 0.09749985 | 0.00000000 | −2.69337E−05<br>0.00000E+00 | 3.33931E−04<br>0.00000E+00 | −2.58978E−05<br>0.00000E+00 | 0.00000E+00<br>0.00000E+00 |
| 5 | 0.25181927 | 0.00000000 | 1.36407E−03<br>0.00000E+00 | 9.87870E−04<br>0.00000E+00 | −8.43651E−05<br>0.00000E+00 | 2.77159E−05<br>0.00000E+00 |
| 9 | 0.11856531 | 0.00000000 | 1.33108E−02<br>0.00000E+00 | −1.79246E−05<br>0.00000E+00 | −3.95551E−05<br>0.00000E+00 | 0.00000E+00<br>0.00000E+00 |
| 10 | −0.06795318 | 0.00000000 | 9.73642E−03<br>0.00000E+00 | 5.65860E−04<br>0.00000E+00 | −4.72380E−05<br>0.00000E+00 | 0.00000E+00<br>0.00000E+00 |

TABLE 8C-continued

ASPHERIC CONSTANTS

| S # | Curvature (c) | K | A E | B F | C G | D H |
|---|---|---|---|---|---|---|
| 11 | −0.03509973 | 0.00000000 | 2.69371E−03 | 8.57758E−04 | 0.00000E+00 | 0.00000E+00 |
|  |  |  | 0.00000E+00 | 0.00000E+00 | 0.00000E+00 | 0.00000E+00 |
| 12 | 0.01762783 | 0.00000000 | 4.46700E−03 | 1.34739E−04 | 0.00000E+00 | 0.00000E+00 |
|  |  |  | 0.00000E+00 | 0.00000E+00 | 0.00000E+00 | 0.00000E+00 |

TABLE 8D

DECENTERING CONSTANTS

| Decenter | X | Y | Z | Alpha (degrees) | Beta (degrees) | Gamma (degrees) |
|---|---|---|---|---|---|---|
| D(1) and Bend (1) | 0.000 | 0.000 | 0.000 | 45.000 | 0.000 | 0.000 |

TABLE 8E

ZOOM PARAMETERS

| *Zoom Parameters | Position-1 | Position-2 |
|---|---|---|
| *1 | INF | 1000.0000 mm |
| *2 | −0.8218 mm | −1.0159 mm |

TABLE 9A

| Focal length (f) | 14.0 mm |
|---|---|
| F-Number | 2.8 |
| Half FOV | 13.0_|° |
| Total track length TTL | 13.80 |
| Telephoto ratio (TTL/f) | 0.986 |
| Design wavelengths | 650 nm, |
|  | 610 nm, |
|  | 555 nm, |
|  | 510 nm, |
|  | 470 nm |

TABLE 9B

| Element | Surface (S#) | Radius R | Shape | Thickness Or Separation | Material | Refractive Index $N_d$ | Abbe Number $V_d$ |
|---|---|---|---|---|---|---|---|
| Object plane | 0 | INF | FLT | INF *1 |  |  |  |
| L1 | 1 | 3.721 | SPH | 1.4878 | Plastic | 1.544 | 56.1 |
|  | 2 | −27.760 | ASP | 0.3032 |  |  |  |
| Aperture Stop | 3 | INF | FLT | 0.0000 |  |  |  |
| L2 | 4 | 14.817 | ASP | 0.4773 | Plastic | 1.632 | 23.3 |
|  | 5 | 4.489 | ASP | 0.6317 |  |  |  |
| Prism | 6 | INF | FLT | 2.4000 | Glass | 1.516 | 64.1 |
| Decenter (1) |  |  |  |  |  |  |  |
|  | 7 | INF | FLT | −2.4000 | Refl |  |  |
| Bend (1) |  |  |  |  |  |  |  |
|  | 8 | INF | FLT | −1.3966 |  |  |  |
| L3 | 9 | 8.022 | ASP | −0.4773 | Plastic | 1.544 | 56.1 |
|  | 10 | −14.550 | ASP | −0.5606 |  |  |  |
| L4 | 11 | −18.050 | ASP | −1.3308 | Plastic | 1.632 | 23.3 |
|  | 12 | 368.617 | ASP | −1.0966 |  |  |  |
| IR filter | 13 | INF | FLT | −0.3000 | Glass | 1.516 | 64.1 |
|  | 14 | INF | FLT | −0.9381 *2 |  |  |  |
| Image plane | 15 | INF | FLT |  |  |  |  |

TABLE 9C

ASPHERIC CONSTANTS

| S # | Curvature (c) | K | A E | B F | C G | D H |
|---|---|---|---|---|---|---|
| 2 | −0.03602272 | 0.00000000 | 1.91094E−03 | −5.17947E−05 | 0.00000E+00 | 0.00000E+00 |
|  |  |  | 0.00000E+00 | 0.00000E+00 | 0.00000E+00 | 0.00000E+00 |
| 4 | 0.06748787 | 0.00000000 | −1.65783E−03 | 5.49257E−04 | −3.70457E−05 | 0.00000E+00 |
|  |  |  | 0.00000E+00 | 0.00000E+00 | 0.00000E+00 | 0.00000E+00 |
| 5 | 0.22275500 | 0.00000000 | −1.04395E−03 | 7.46179E−04 | 3.78305E−05 | 0.00000E+00 |
|  |  |  | 0.00000E+00 | 0.00000E+00 | 0.00000E+00 | 0.00000E+00 |
| 9 | 0.12466179 | 0.00000000 | 1.55699E−02 | 6.84117E−05 | 0.00000E+00 | 0.00000E+00 |
|  |  |  | 0.00000E+00 | 0.00000E+00 | 0.00000E+00 | 0.00000E+00 |
| 10 | −0.06872911 | 0.00000000 | 1.21357E−02 | 4.42811E−04 | −3.81887E−05 | 0.00000E+00 |
|  |  |  | 0.00000E+00 | 0.00000E+00 | 0.00000E+00 | 0.00000E+00 |
| 11 | −0.05540271 | 0.00000000 | 4.16689E−03 | 7.89754E−04 | 0.00000E+00 | 0.00000E+00 |
|  |  |  | 0.00000E+00 | 0.00000E+00 | 0.00000E+00 | 0.00000E+00 |
| 12 | 0.271284E−02 | 0.00000000 | 5.29754E−03 | 1.38400E−04 | 0.00000E+00 | 0.00000E+00 |
|  |  |  | 0.00000E+00 | 0.00000E+00 | 0.00000E+00 | 0.00000E+00 |

TABLE 9D

DECENTERING CONSTANTS

| Decenter | X | Y | Z | Alpha (degrees) | Beta (degrees) | Gamma (degrees) |
|---|---|---|---|---|---|---|
| D(1) and Bend (1) | 0.000 | 0.000 | 0.000 | 45.000 | 0.000 | 0.000 |

TABLE 9E

ZOOM PARAMETERS

| *Zoom Parameters | Position-1 | Position-2 |
|---|---|---|
| *1 | INF | 1000.0000 mm |
| *2 | −0.8218 mm | −1.0159 mm |

TABLE 10A

| | |
|---|---|
| Focal length (f) | 14.0 mm |
| F-Number | 2.8 |
| Half FOV | 13.0_|° |
| Total track length TTL | 13.31 |
| Telephoto ratio (TTL/f) | 0.951 |
| Design wavelengths | 650 nm, 610 nm, 555 nm, 510 nm, 470 nm |

TABLE 10B

| Element | Surface (S#) | Radius R | Shape | Thickness Or Separation | Material | Refractive Index $N_d$ | Abbe Number $V_d$ |
|---|---|---|---|---|---|---|---|
| Object plane | 0 | INF | FLT | INF *1 | | | |
| | 1 | INF | FLT | 0.6900 | | | |
| Aperture Stop | 2 | INF | FLT | −0.6900 | | | |
| | 3 | INF | FLT | 0.0000 | | | |
| L1 | 4 | 4.277 | ASP | 1.2058 | Plastic | 1.544 | 56.1 |
| | 5 | −27.570 | ASP | 0.2000 | | | |
| L2 | 6 | 13.055 | ASP | 0.4500 | Plastic | 1.632 | 23.3 |
| | 7 | 4.815 | ASP | 0.6684 | | | |
| | 8 | INF | | 2.600 | | | |
| Decenter (1) | | | | | | | |
| Fold Mirror | 9 | INF | FLT | −2.600 | Refl | | |
| Bend (1) | | | | | | | |
| | 10 | INF | FLT | −0.7500 | | | |
| L3 | 11 | 28.651 | ASP | −0.5500 | Plastic | 1.544 | 56.1 |
| | 12 | −10.973 | ASP | −0.8447 | | | |
| L4 | 13 | −4.812 | ASP | −1.3000 | Plastic | 1.632 | 23.3 |
| | 14 | −5.215 | ASP | −0.8403 | | | |
| IR filter | 15 | INF | FLT | −0.3000 | Glass | 1.516 | 64.1 |
| | 16 | INF | FLT | −0.9992 *2 | | | |
| Image plane | 17 | INF | FLT | | | | |

TABLE 10C

ASPHERIC CONSTANTS

| S# | Curvature (c) | K | A | B | C | D |
|---|---|---|---|---|---|---|
| | | | E | F | G | H |
| 4 | 0.23380693 | 1.17051019 | −8.65800E−04 | −6.87900E−04 | 1.88217E−04 | −3.48494E−05 |
| | | | 2.00098E−06 | 0.00000E+00 | 0.00000E+00 | 0.00000E+00 |
| 5 | −0.03627133 | 0.00000000 | 2.95689E−03 | −2.62826E−04 | −1.54736E−05 | 1.50074E−05 |
| | | | −3.12495E−06 | 2.81509E−07 | 0.00000E+00 | 0.00000E+00 |
| 6 | 0.07659706 | 0.00000000 | −2.95054E−03 | 2.89846E−04 | −6.59856E−06 | 0.00000E+00 |
| | | | 0.00000E+00 | 0.00000E+00 | 0.00000E+00 | 0.00000E+00 |
| 7 | 0.20768752 | 0.00000000 | −3.78752E−03 | −3.68603E−04 | 4.42156E−04 | −9.03606E−05 |
| | | | 6.61024E−06 | 0.00000E+00 | 0.00000E+00 | 0.00000E+00 |
| 11 | 0.03490279 | 0.00000000 | 1.25192E−02 | 4.22790E−04 | 4.19747E−05 | 0.00000E+00 |
| | | | 0.00000E+00 | 0.00000E+00 | 0.00000E+00 | 0.00000E+00 |
| 12 | −0.09113098 | 0.00000000 | 1.05552E−02 | 3.05385E−04 | −2.00649E−05 | 0.00000E+00 |
| | | | 0.00000E+00 | 0.00000E+00 | 0.00000E+00 | 0.00000E+00 |
| 13 | −0.20779716 | 0.00000000 | 3.96238E−03 | −1.35200E−04 | 3.91503E−06 | 0.00000E+00 |
| | | | 0.00000E+00 | 0.00000E+00 | 0.00000E+00 | 0.00000E+00 |
| 14 | −0.19177105 | 0.00000000 | 5.72695E−03 | −3.44193E−04 | 8.76331E−06 | 0.00000E+00 |
| | | | 0.00000E+00 | 0.00000E+00 | 0.00000E+00 | 0.00000E+00 |

TABLE 10D

DECENTERING CONSTANTS

| Decenter | X | Y | Z | Alpha (degrees) | Beta (degrees) | Gamma (degrees) |
|---|---|---|---|---|---|---|
| D(1) and Bend (1) | 0.000 | 0.000 | 0.000 | 45.000 | 0.000 | 0.000 |

TABLE 10E

ZOOM PARAMETERS

*Zoom

| Parameters | Position-1 | Position-2 |
|---|---|---|
| *1 | INF | 1000.0000 mm |
| *2 | −0.9992 mm | −1.1938 mm |

TABLE 11A

| | |
|---|---|
| Focal length (f) | 14.0 mm |
| F-Number | 2.8 |
| Half FOV | 13.0_|° |

TABLE 11A-continued

| | |
|---|---|
| Total track length TTL | 13.80 |
| Telephoto ratio (TTL/f) | 0.986 |
| Design wavelengths | 650 nm, |
| | 610 nm, |
| | 555 nm, |
| | 510 nm, |
| | 470 nm |

TABLE 11B

| Element | Surface (S#) | Radius R | Shape | Thickness Or Separation | Material | Refractive Index $N_d$ | Abbe Number $V_d$ |
|---|---|---|---|---|---|---|---|
| Object plane | 0 | INF | FLT | INF *1 | | | |
| L1 | 1 | 3.556 | ASP | 1.4952 | Plastic | 1.544 | 56.1 |
| | 2 | INF | FLT | 0.1209 | | | |

TABLE 11B-continued

| Element | Surface (S#) | Radius R | Shape | Thickness Or Separation | Material | Refractive Index $N_d$ | Abbe Number $V_d$ |
|---|---|---|---|---|---|---|---|
| Aperture Stop | 3 | INF | FLT | 0.0000 | | | |
| L2 | 4 | 8.933 | ASP | 0.4773 | Plastic | 1.632 | 23.3 |
| | 5 | 3.977 | ASP | 0.8067 | | | |
| Prism | 6 | INF | FLT | 2.4000 | Glass | 1.516 | 64.1 |
| Decenter (1) | | | | | | | |
| | 7 | INF | FLT | −2.4000 | Refl | | |
| Bend (1) | | | | | | | |
| | 8 | INF | FLT | −1.0007 | | | |
| L3 | 9 | 19.925 | ASP | −0.4773 | Plastic | 1.544 | 56.1 |
| | 10 | −8.852 | ASP | −1.2389 | | | |
| L4 | 11 | −4.679 | ASP | −0.5946 | Plastic | 1.632 | 23.3 |
| | 12 | −5.802 | ASP | −1.2507 | | | |
| IR filter | 13 | INF | FLT | −0.3000 | Glass | 1.516 | 64.1 |
| | 14 | INF | FLT | −1.2378 *2 | | | |
| Image plane | 15 | INF | FLT | | | | |

TABLE 11C

ASPHERIC CONSTANTS

| S# | Curvature (c) | K | A E | B F | C G | D H |
|---|---|---|---|---|---|---|
| 1 | 0.28123926 | −0.01993120 | 0.00000E+00 | 0.00000E+00 | 0.00000E+00 | 0.00000E+00 |
| | | | 0.00000E+00 | 0.00000E+00 | 0.00000E+00 | 0.00000E+00 |
| 4 | 0.11193957 | 0.00000000 | −2.27240E−03 | 8.19742E−05 | 0.00000E+00 | 0.00000E+00 |
| | | | 0.00000E+00 | 0.00000E+00 | 0.00000E+00 | 0.00000E+00 |
| 5 | 0.25145987 | 0.00000000 | −4.85039E−05 | 5.29461E−04 | −7.64021E−05 | 2.05357E−05 |
| | | | 0.00000E+00 | 0.00000E+00 | 0.00000E+00 | 0.00000E+00 |
| 9 | 0.05018867 | 0.00000000 | 1.43044E−02 | 5.94240E−04 | 6.49751E−05 | 0.00000E+00 |
| | | | 0.00000E+00 | 0.00000E+00 | 0.00000E+00 | 0.00000E+00 |
| 10 | −0.11296963 | 0.00000000 | 1.15308E−02 | 4.31319E−04 | −2.96326E−05 | 0.00000E+00 |
| | | | 0.00000E+00 | 0.00000E+00 | 0.00000E+00 | 0.00000E+00 |
| 11 | −0.21373168 | 0.00000000 | 5.26380E−03 | −8.40412E−05 | 0.00000E+00 | 0.00000E+00 |
| | | | 0.00000E+00 | 0.00000E+00 | 0.00000E+00 | 0.00000E+00 |
| 12 | −0.17236676 | 0.00000000 | 6.58069E−03 | −2.54870E−04 | 0.00000E+00 | 0.00000E+00 |
| | | | 0.00000E+00 | 0.00000E+00 | 0.00000E+00 | 0.00000E+00 |

TABLE 11D

DECENTERING CONSTANTS

| Decenter | X | Y | Z | Alpha (degrees) | Beta (degrees) | Gamma (degrees) |
|---|---|---|---|---|---|---|
| D(1) and Bend (1) | 0.000 | 0.000 | 0.000 | 45.000 | 0.000 | 0.000 |

TABLE 11E

ZOOM PARAMETERS

*Zoom

| Parameters | Position-1 | Position-2 |
|---|---|---|
| *1 | INF | 1000.0000 mm |
| *2 | −1.2378 mm | −1.4326 mm |

TABLE 12A

| | |
|---|---|
| Focal length (f) | 14.0 mm |
| F-Number | 2.8 |
| Half FOV | 13.0_|° |
| Total track length TTL | 13.8 |
| Telephoto ratio (TTL/f) | 0.986 |
| Design wavelengths | 650 nm, |
| | 610 nm, |
| | 555 nm, |
| | 510 nm, |
| | 470 nm |

TABLE 12B

| Element | Surface (S#) | Radius R | Shape | Thickness Or Separation | Material | Refractive Index $N_d$ | Abbe Number $V_d$ |
|---|---|---|---|---|---|---|---|
| Object plane | 0 | INF | FLT | INF *1 | | | |
| | 1 | INF | FLT | 0.7500 | | | |
| Aperture Stop | 2 | INF | FLT | −0.7500 | | | |
| | 3 | INF | FLT | 0.0000 | | | |
| L1 | 4 | 3.556 | ASP | 1.4952 | Plastic | 1.544 | 56.1 |
| | 5 | INF | FLT | 0.1209 | | | |
| L2 | 6 | 8.933 | ASP | 0.4773 | Plastic | 1.632 | 23.3 |
| | 7 | 3.977 | ASP | 0.8067 | | | |
| | 8 | INF | | 2.400 | Glass | 1.516 | 64.1 |
| Decenter (1) | | | | | | | |
| Prism | 9 | INF | FLT | −2.400 | Refl | | |
| Bend (1) | | | | | | | |
| | 10 | INF | FLT | −1.0007 | | | |
| L3 | 11 | 19.925 | ASP | −0.4773 | Plastic | 1.544 | 56.1 |
| | 12 | −8.852 | ASP | −1.2389 | | | |
| L4 | 13 | −4.679 | ASP | −0.5946 | Plastic | 1.632 | 23.3 |
| | 14 | −5.802 | ASP | −1.2507 | | | |
| IR filter | 15 | INF | FLT | −0.3000 | Glass | 1.516 | 64.1 |
| | 16 | INF | FLT | −1.2378 *2 | | | |
| Image plane | 17 | INF | FLT | | | | |

TABLE 12C

ASPHERIC CONSTANTS

| S# | Curvature (c) | K | A / E | B / F | C / G | D / H |
|---|---|---|---|---|---|---|
| 4 | 0.28123926 | −0.01993120 | 0.00000E+00 | 0.00000E+00 | 0.00000E+00 | 0.00000E+00 |
| | | | 0.00000E+00 | 0.00000E+00 | 0.00000E+00 | 0.00000E+00 |
| 6 | 0.11193957 | 0.00000000 | −2.27240E−03 | 8.19742E−05 | 0.00000E+00 | 0.00000E+00 |
| | | | 0.00000E+00 | 0.00000E+00 | 0.00000E+00 | 0.00000E+00 |
| 7 | 0.25145987 | 0.00000000 | −4.85039E−05 | 5.29461E−04 | −7.64021E−05 | 2.05357E−05 |
| | | | 0.00000E+00 | 0.00000E+00 | 0.00000E+00 | 0.00000E+00 |
| 11 | 0.05018867 | 0.00000000 | 1.43044E−02 | 5.94240E−04 | 6.49751E−05 | 0.00000E+00 |
| | | | 0.00000E+00 | 0.00000E+00 | 0.00000E+00 | 0.00000E+00 |
| 12 | −0.11296963 | 0.00000000 | 1.15308E−02 | 4.31319E−04 | −2.96326E−05 | 0.00000E+00 |
| | | | 0.00000E+00 | 0.00000E+00 | 0.00000E+00 | 0.00000E+00 |
| 13 | −0.21373168 | 0.00000000 | 5.26380E−03 | −8.40412E−05 | 0.00000E+00 | 0.00000E+00 |
| | | | 0.00000E+00 | 0.00000E+00 | 0.00000E+00 | 0.00000E+00 |
| 14 | −0.17236676 | 0.00000000 | 6.58069E−03 | −2.54870E−04 | 0.00000E+00 | 0.00000E+00 |
| | | | 0.00000E+00 | 0.00000E+00 | 0.00000E+00 | 0.00000E+00 |

TABLE 12D

DECENTERING CONSTANTS

| Decenter | X | Y | Z | Alpha (degrees) | Beta (degrees) | Gamma (degrees) |
|---|---|---|---|---|---|---|
| D(1) and Bend (1) | 0.000 | 0.000 | 0.000 | 45.000 | 0.000 | 0.000 |

TABLE 12E

ZOOM PARAMETERS

| *Zoom Parameters | Position-1 | Position-2 |
|---|---|---|
| *1 | INF | 1000.0000 mm |
| *2 | −1.2378 mm | −1.4326 mm |

Example Computing Device

Figure 24:
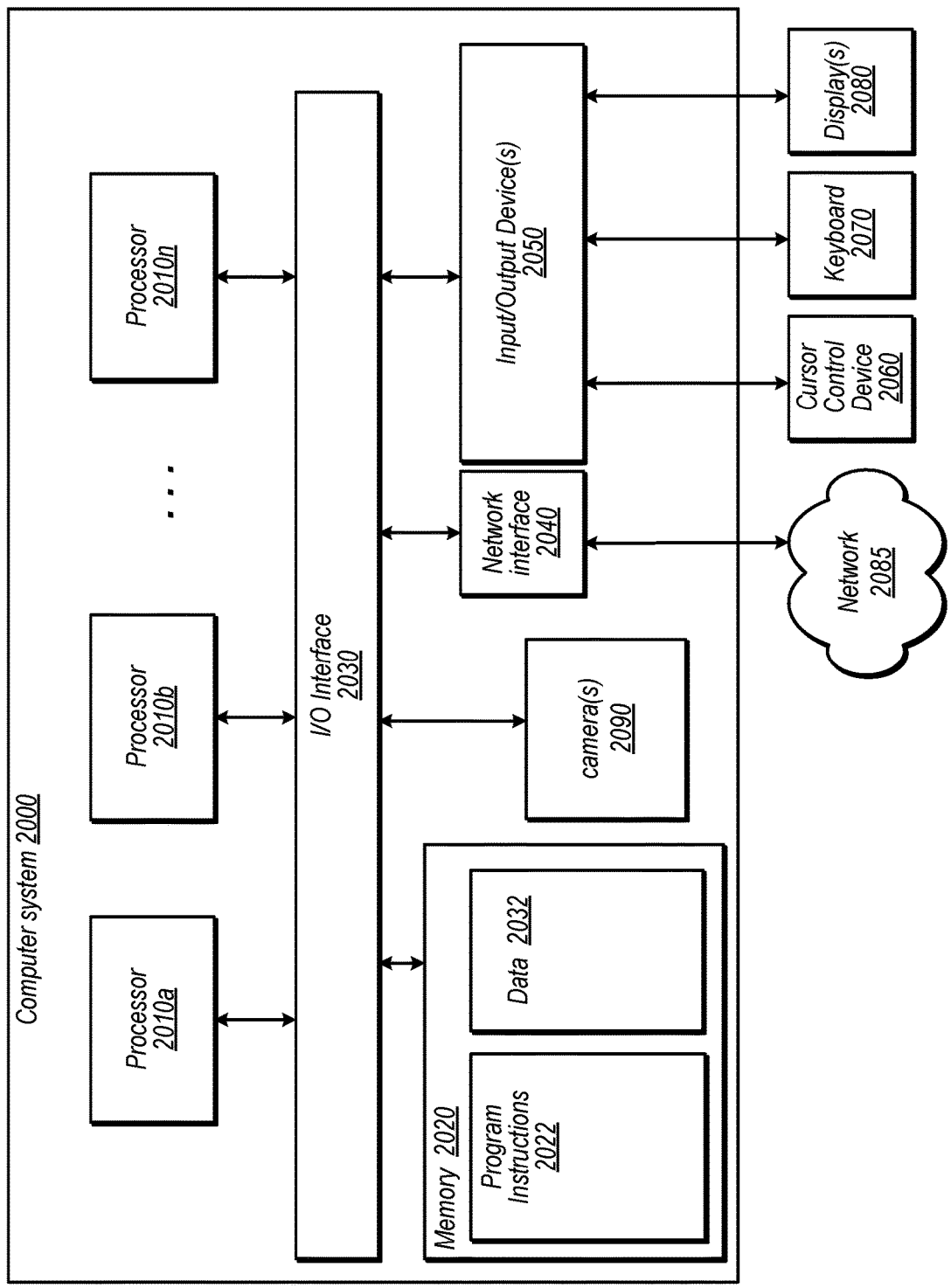
FIG. 24 illustrates an example computer system that may be used in embodiments.

FIG. 24 illustrates an example computing device, referred to as computer system 2000, that may include or host embodiments of the camera as illustrated in FIGS. 1A through 23. In addition, computer system 2000 may implement methods for controlling operations of the camera and/or for performing image processing of images captured with the camera. In different embodiments, computer system 2000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more cameras 2090, for example one or more telephoto cameras as described above with respect to FIGS. 1A through 23, which may also be coupled to I/O interface 2030, or one or more telephoto cameras as described above with respect to FIGS. 1A through 23 along with one or more other cameras such as wide-field cameras.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data for controlling operations of camera 2090 and for capturing and processing images with integrated camera 2090 or other methods or data, for example interfaces and methods for capturing, displaying, processing, and storing images captured with camera 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 24, memory 2020 may include program instructions 2022, which may be processor-executable to implement any element or action to support integrated camera 2090, including but not limited to image processing software and interface software for controlling camera 2090. In at least some embodiments, images captured by camera 2090 may be stored to memory 2020. In addition, metadata for images captured by camera 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The following clauses describe various examples embodiments consistent with the description provided herein.

Clause 1. A camera, comprising:
a photosensor configured to capture light projected onto a surface of the photosensor; and
a folded telephoto lens system comprising a plurality of optical elements arranged along a first optical axis and a second optical axis of the camera and configured to:
refract light from an object field located in front of the camera along the first optical axis;
redirect the light on to the second optical axis; and
refract the light on the second optical axis to form an image of a scene at an image plane at or near the surface of the photosensor.

Clause 2. The camera as recited in clause 1, wherein, to redirect the light on to the second optical axis, the lens system includes a light path folding element configured to reflect the light from the first optical axis on to the second optical axis.

Clause 3. The camera as recited in clause 1, wherein the plurality of optical elements includes a plurality of refractive lenses, wherein at least one surface of at least one of the plurality of refractive lenses is aspheric.

Clause 4. The camera as recited in clause 1, wherein at least one of the plurality of optical elements is composed of a first plastic material, and wherein at least one other of the plurality of optical elements is composed of a second plastic material with different optical characteristics than the first plastic material.

Clause 5. The camera as recited in clause 1, wherein at least one of the plurality of optical elements is configured to translate or move along a respective optical axis to adjust focus of the image of the scene at the photosensor.

Clause 6. The camera as recited in clause 1, wherein the photosensor is configured to translate or move along a respective optical axis to adjust focus of the image of the scene at the photosensor.

Clause 7. The camera as recited in clause 1, wherein the lens system has effective focal length f, wherein total track length (TTL) of the lens system is 14 millimeters or less, and wherein telephoto ratio (TTL/f) of the lens system is within a range of 0.8 to 1.0.

Clause 8. The camera as recited in clause 1, wherein effective focal length f of the lens system is within a range of 8 millimeters to 14 millimeters, and wherein focal ratio of the lens system is within a range of 2.4 to 10.

Clause 9. The camera as recited in clause 1, wherein effective focal length f of the lens system is 14 millimeters, and wherein focal ratio of the lens system is 2.8.

Clause 10. The camera as recited in clause 1, wherein the plurality of optical elements includes, in order along the first and second optical axes from an object side of the camera to an image side of the camera:
one or more lens elements on the first optical axis;
a light path folding element configured to redirect the light from the first optical axis on to the second optical axis; and
one or more lens elements on the second optical axis.

Clause 11. The camera as recited in clause 10, wherein the first optical axis includes a first lens element and a second lens element, wherein the telephoto lens system further includes an aperture stop located at or in front of the first lens element, between the first lens element and the second lens element, or between the second lens element and a reflecting surface of the light path folding element.

Clause 12. The camera as recited in clause 11, wherein the aperture stop is adjustable to provide a focal ratio within a range of 2.4 to 10.

Clause 13. The camera as recited in clause 1, wherein the plurality of optical elements includes, in order along the first and second optical axes from an object side of the camera to an image side of the camera:
a first lens element with positive refractive power having a convex object side surface;
a second lens element with negative refractive power;
a third lens element with negative refractive power; and
a fourth lens element with positive refractive power.

Clause 14. The camera as recited in clause 13, wherein the lens system has effective focal length f, wherein the first lens element is a biconvex lens, and wherein focal length f1 of the first lens element satisfies the condition:

$$0.4 < |f1/f| < 0.8.$$

Clause 15. The camera as recited in clause 13, wherein the lens system has effective focal length f, and wherein the first lens element has vertex radii of curvature R1 and R2 and satisfies the condition:

$$0 \le |R1/R2| < 6.1.$$

Clause 16. The camera as recited in clause 13, wherein the lens system has effective focal length f, and wherein the second lens element has negative focal length f2, vertex radii of curvature R3 and R4, and satisfies the conditions:

$$(0.5 < |f2/f| < 3.3) \text{ and } (|R3/R4| < 3.3).$$

Clause 17. The camera as recited in clause 13, wherein the plurality of optical elements further includes a light path folding element located between the second lens element and the third lens element that reflects the light from the first optical axis on to the second optical axis, wherein the light path folding element is one of a mirror or a prism.

Clause 18. A folded telephoto lens system, comprising:
a plurality of refractive lens elements arranged along a folded optical axis of the telephoto lens system, wherein at least one surface of at least one of the plurality of lens elements is aspheric;
wherein the telephoto lens system has effective focal length f within a range of 10.0 millimeters to 14 millimeters, wherein total track length (TTL) of the telephoto lens system is 14 millimeters or less, and wherein the telephoto ratio (TTL/f of the lens system is within a range of 0.8 to 1.0; and
wherein at least one of the plurality of lens elements is composed of a first material, and wherein at least one other of the plurality of lens elements is composed of a second material with different optical characteristics than the first material.

Clause 19. The folded telephoto lens system as recited in clause 18, wherein the plurality of lens elements includes, in order along the folded optical axis from an object side of the telephoto lens system to an image side of the telephoto lens system:

a first lens element with positive refractive power having a convex object side surface;
a second lens element with negative refractive power;
a light path folding element configured to redirect light from a first optical path of the folded optical axis on to a second optical path of the folded optical axis;
a third lens element with negative refractive power; and
a fourth lens element with positive refractive power.

Clause 20. The folded telephoto lens system as recited in clause 19, wherein the second lens element is negative meniscus shape and has a concave image side surface.

Clause 21. The folded telephoto lens system as recited in clause 19, wherein the fourth lens element is positive meniscus shape and has a concave image side surface.

Clause 22. The folded telephoto lens system as recited in clause 19, wherein the fourth lens element is a biconvex lens.

Clause 23. A device, comprising:

one or more processors;
one or more cameras; and
a memory comprising program instructions executable by at least one of the one or more processors to control operations of the one or more cameras;
wherein at least one of the one or more cameras is a small form factor telephoto camera comprising:
a photosensor configured to capture light projected onto a surface of the photosensor; and
a folded telephoto lens system configured to:
refract light from an object field located in front of the camera along a first optical axis;
redirect the light on to a second optical axis; and
refract the light on the second optical axis to form an image of a scene at an image plane at or near the surface of the photosensor; and
wherein the folded telephoto lens system has effective focal length f, wherein the total track length (TTL) of the lens system is 14.0 millimeters or less, and wherein telephoto ratio (TTL/f) of the lens system is within a range of 0.8 to 1.0.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
a photosensor configured to capture light projected onto a surface of the photosensor; and
a folded telephoto lens system comprising a plurality of optical elements arranged along a first optical axis and a second optical axis of the camera and configured to refract the light to form an image of a scene at an image plane at or near the surface of the photosensor, the plurality of optical elements comprising, in order along the first and second optical axes from an object side of the camera to an image side of the camera:
a first lens element and a second lens element configured to refract light from an object field located in front of the camera along the first optical axis;
a light path folding element configured to redirect the light from the first optical axis on to the second optical axis; and
a third lens element and a fourth lens element on the second optical axis, wherein the fourth lens element is a positive meniscus lens with a concave image side surface.

2. The camera as recited in claim 1, wherein at least one surface of at least one of the first lens element, the second lens element, the third lens element, or the fourth lens element is aspheric.

3. The camera as recited in claim 1, wherein at least one of the lens elements is composed of a first plastic material, and wherein at least one other of the lens elements is composed of a second plastic material with different optical characteristics than the first plastic material.

4. The camera as recited in claim 1, wherein at least one of the plurality of optical elements is configured to translate or move along a respective optical axis to adjust focus of the image at the image plane.

5. The camera as recited in claim 1, wherein telephoto ratio (TTL/f) of the lens system is within a range of 0.8 to 1.0, where f is effective focal length of the lens system and TTL is total track length of the lens system.

6. The camera as recited in claim 1, wherein effective focal length f of the lens system is within a range of 8 millimeters to 14 millimeters, and wherein focal ratio of the lens system is within a range of 2.4 to 10.

7. The camera as recited in claim 1, further comprising an aperture stop located at or in front of the first lens element.

8. The camera as recited in claim 1, further comprising an aperture stop located between the first lens element and the second lens element.

9. The camera as recited in claim 1, further comprising an aperture stop located between the second lens element and a reflecting surface of the light path folding element.

10. The camera as recited in claim 1, further comprising an adjustable aperture stop.

11. The camera as recited in claim 10, wherein the adjustable aperture stop is adjustable to dynamically vary a focal ratio across a range of 2.4 to 10.

12. The camera as recited in claim 10, wherein the adjustable aperture stop is located at or in front of the first lens element, between the first lens element and the second lens element, or between the second lens element and a reflecting surface of the light path folding element.

13. The camera as recited in claim 1, wherein the lens system has effective focal length f, wherein the first lens element is a biconvex lens, and wherein focal length f1 of the first lens element satisfies the condition:

$$0.4 < |f1|/f < 0.8.$$

14. The camera as recited in claim 1, wherein the lens system has effective focal length f, and wherein the first lens element has vertex radii of curvature R1 and R2 and satisfies the condition:

$$0 \le |R1/R2| < 6.1.$$

15. The camera as recited in claim 1, wherein the lens system has effective focal length f, and wherein the second lens element has negative focal length f2, vertex radii of curvature R3 and R4, and satisfies the conditions:

$$(0.5 < |f2/f| < 3.3) \text{ and } (|R3/R4| < 3.3).$$

16. The camera as recited in claim 1, wherein the light path folding element is one of a mirror or a prism.

17. A lens system, comprising:
- a plurality of optical elements arranged along a first optical axis and a second optical axis and configured to refract light to form an image at an image plane, the plurality of optical elements comprising, in order along the first and second optical axes from an object side to an image side:
  - a first lens element and a second lens element configured to refract light along the first optical axis;
  - a light path folding element configured to redirect the light from the first optical axis on to the second optical axis; and
  - a third lens element and a fourth lens element on the second optical axis, wherein the fourth lens element is a positive meniscus lens with a concave image side surface.

18. The lens system as recited in claim 17, wherein an effective focal length f of the lens system is within a range of 8 millimeters to 14 millimeters, and wherein focal ratio of the lens system is within a range of 2.4 to 10.

19. The lens system as recited in claim 17, wherein at least one of the lens elements is configured to translate or move along a respective optical axis to adjust focus of the lens system.

20. The lens system as recited in claim 17, further comprising an aperture stop located between the first lens element and a reflecting surface of the light path folding element.

* * * * *